US011330591B2

(12) United States Patent
Raghothaman et al.

(10) Patent No.: US 11,330,591 B2
(45) Date of Patent: May 10, 2022

(54) CLOUD RADIO ACCESS NETWORK IMPLEMENTING A CITIZENS BROADBAND RADIO SERVICE SYSTEM

(71) Applicant: CommScope Technologies LLC, Hickory, NC (US)

(72) Inventors: Balaji B Raghothaman, Chester Springs, PA (US); Shanthakumar Ramakrishnan, Westford, MA (US); Irfaan Ahamed Salahuddeen, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 175 days.

(21) Appl. No.: 16/823,186

(22) Filed: Mar. 18, 2020

(65) Prior Publication Data

US 2020/0305159 A1    Sep. 24, 2020

Related U.S. Application Data

(60) Provisional application No. 62/821,285, filed on Mar. 20, 2019.

(51) Int. Cl.
*H04W 72/04* (2009.01)
*H04W 72/08* (2009.01)
*H04W 16/14* (2009.01)

(52) U.S. Cl.
CPC ....... *H04W 72/0453* (2013.01); *H04W 16/14* (2013.01); *H04W 72/082* (2013.01)

(58) Field of Classification Search
CPC ............ H04W 72/0453; H04W 16/14; H04W 72/082
See application file for complete search history.

(56) References Cited

U.S. PATENT DOCUMENTS

| 2016/0330743 | A1 | 11/2016 | Das et al. |
| 2019/0069187 | A1 | 2/2019 | Ashrafi |
| 2019/0394678 | A1* | 12/2019 | Syed ................... H04L 41/0896 |
| 2020/0187133 | A1* | 6/2020 | Syed ................... H04W 52/365 |
| 2021/0127346 | A1* | 4/2021 | Hmimy ................ H04W 72/14 |

OTHER PUBLICATIONS

CBRS, "CBRS Coexistence Technical Report: GAA Coexistence Principles", CBRSA-TR-2001 V1.0.0, Jul. 25, 2017, pp. 1-22, CBRS Alliance.

(Continued)

*Primary Examiner* — Joshua L Schwartz
(74) *Attorney, Agent, or Firm* — Fogg & Powers LLC

(57) ABSTRACT

A Citizens Broadband Radio Service (CBRS) communication system is provided. The CBRS communication system includes at least one baseband controller communicatively coupled to a spectrum access system (SAS) that allocates radio frequency (RF) channels in the CBRS communication system. The at least one baseband controller is communicatively coupled to at least one radio point (RP) using a switched ETHERNET network. Each of the at least one RP implements at least one Citizens Broadband Radio Service device (CBSD) that is communicatively coupled to the SAS and configured to provide wireless service to user equipment (UEs) using one or more of the RF channels allocated by the SAS.

62 Claims, 25 Drawing Sheets

(56) References Cited

OTHER PUBLICATIONS

CBRS, "CBRS Network Service Technical Specifications", CBRSA-TS-1002 V1.0.0, Feb. 1, 2018, pp. 1-26, CBRS Alliance.
CBRS, "CBRS Network Services Technical Specification", CBRSA-TS-1001 V 1.0.0, Feb. 1, 2018, pp. 1-19, CBRS Alliance.
CBRS, "Release 1 Technical Webinar", CBRS Alliance, May 30, 2018, pp. 1-30.
Mun, "CBRS: New Shared Spectrum Enables Flexible Indoor and Outdoor Mobile Solutions and New Business Models", CBRS White Paper, CBRS: New Spectrum and Flexible Indoor and Outdoor Mobile Solution, Mar. 2017, pp. 1-9, Mobile Experts LLC.
Wireless Innovation Forum, "Requirements for Commercial Operation in the U.S. 3500-3700 MHz Citizens Broadband Radio Service Band", WINNF-15-S-0112 Version V2.5.8, May 11, 2017, pp. 1-86, CBRS WInnForum Standards, The Software Defined Radio Forum Inc.
Wireless Innovation Forum, "Signaling Protocols and Procedures for Citizens Broadband Radio Service (CBRS): WInnForum Recognized CBRS Air Interfaces and Measurements", WINNF-17-SSC-0002 Version 2.0.2, Sep. 6, 2017, pp. 1-8, CBRS WInnForum Standards, The Software Defined Radio Forum Inc.
Wireless Innovation Forum, "Signaling Protocols and Procedures for Citizens Broadband Radio Services (CBRS): Spectrum Access System (SAS)—Citizens Broadband Radio Service Device (CBSD) Interface Technical Specification", WINNF-16-S-0016 Version 2.0.0, Jun. 14, 2017, pp. 1-60, CBRS WInnForum Standards, The Software Defined Radio Forum Inc.
Wireless Innovation Forum, "Test and Certification for Citizens Broadband Radio Service (CBRS); Conformance and Performance Test Technical Specification; CBSD/DP as Unit Under Test (UUT)", WINNF-TS-0122 Version 1.0.0, Dec. 19, 2017, pp. 1-83, CBRS WInnForum Standards, The Software Defined Radio Forum.
CBRS Alliance, "CBRS Coexistence Technical Specifications", CBRSA-TS-2001, V2.0.0, Jan. 6, 2019, pp. 1 through 27.
HTNG, "Citizen's Broadband Radio Service (CBRS) White Paper", Hospitality Technology Next Generation, Version 1.00, Sep. 30, 2018, pp. 1 through 35.
International Searching Authority, "International Search Report and Written Opinion from PCT Application No. PCT/US2020/023429", from Foreign Counterpart to U.S. Appl. No. 16/823,186, dated Jul. 13, 2020, pp. 1 through 16, Published: WO.
Verma, "Multi-operator, in-building 5G gives building owners flexibility", Sep. 5, 2018, pp. 1 through 3, https://inbuildingtech.com/wireless/connectivity-small-cells-commscope/.

* cited by examiner

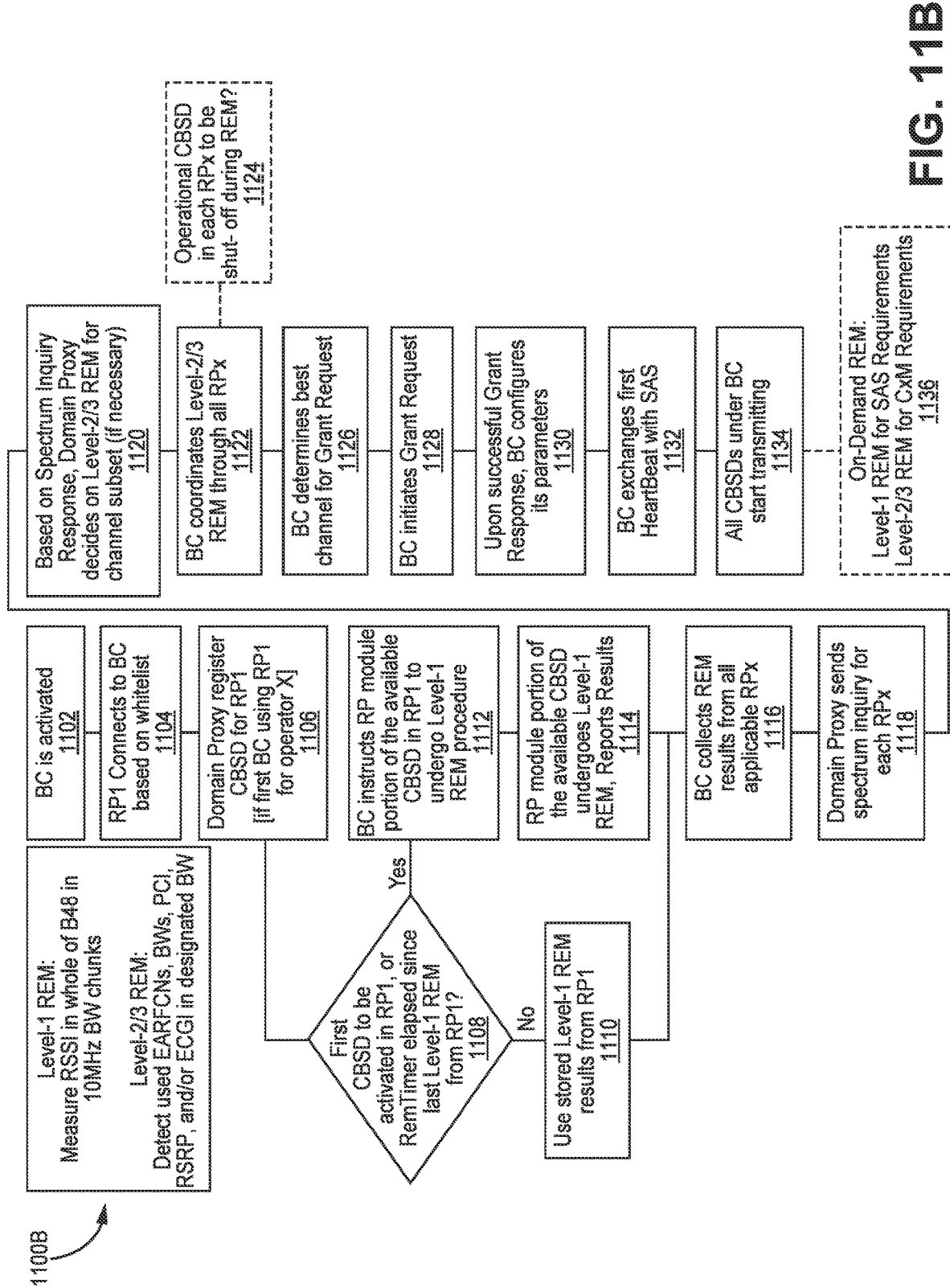

CLOUD RADIO ACCESS NETWORK IMPLEMENTING A CITIZENS BROADBAND RADIO SERVICE SYSTEM

CROSS-REFERENCE TO RELATED APPLICATIONS

This application claims the benefit of U.S. Provisional Patent Application Ser. No. 62/821,285 filed on Mar. 20, 2019, entitled "CLOUD RADIO ACCESS NETWORK IMPLEMENTING A CITIZENS BROADBAND RADIO SERVICE SYSTEM", the entirety of which is incorporated herein by reference.

BACKGROUND

Due to the explosive growth in mobile broadband traffic and its concomitant strain on limited spectrum resources, the Federal Communications Commission has adopted rules to allow commercial shared use of 150 MHz of spectrum in the 3550-3700 MHz (3.5 GHz) band for licensed and unlicensed use of the 3.5 GHz band for a wide variety of devices. CBRS (Citizen Broadband Radio Service) is the name given to the 3.5 GHz band (3550-3700 MHz) that was opened by FCC for use by commercial services.

SUMMARY

A Citizens Broadband Radio Service (CBRS) communication system is provided. The CBRS communication system includes at least one baseband controller communicatively coupled to a spectrum access system (SAS) that allocates radio frequency (RF) channels in the CBRS communication system. The at least one baseband controller is communicatively coupled to at least one radio point (RP) using a switched ETHERNET network. Each of the at least one RP implements at least one Citizens Broadband Radio Service device (CBSD) that is communicatively coupled to the SAS and configured to provide wireless service to user equipment (UEs) using one or more of the RF channels allocated by the SAS Another Citizens Broadband Radio Service (CBRS) communication system is also provided. The CBRS communication system includes a spectrum access system (SAS) configured to allocate radio frequency (RF) channels in the CBRS communication system. The CBRS communication system also includes a radio point (RP) implementing at least one Citizens Broadband Radio Service device (CBSD). The CBRS communication system also includes a baseband controller communicatively coupled to the SAS and the RPs. The baseband controller is configured to determine Level-1 remote environment monitoring (REM) measurements for each of the CBSDs; send a spectrum inquiry, for each of the at least one CBSD, to the SAS based on the Level-1 REM measurements; and determine whether to perform Level-2 REM or Level-3 REM based on a spectrum inquiry response, for each of the at least one CBSD, from the SAS.

Another Citizens Broadband Radio Service (CBRS) communication system is also provided. The CBRS communication system includes a spectrum access system (SAS) configured to allocate radio frequency (RF) channels in the CBRS communication system. The CBRS communication system also includes a plurality of radio points (RPs), each implementing at least one Citizens Broadband Radio Service device (CBSD). The CBRS communication system also includes a baseband controller communicatively coupled to the SAS and the RPs. The baseband controller is configured to send a spectrum inquiry to the SAS for each CBSD in a set of the CBSDs; and send, for each CBSD in the set of the CBSDs, a grant request to the SAS that indicates a best channel based on a spectrum inquiry response and an REM measurement report for each CBSD in the set of the CBSDs.

DRAWINGS

Understanding that the drawings depict only exemplary configurations and are not therefore to be considered limiting in scope, the exemplary configurations will be described with additional specificity and detail through the use of the accompanying drawings, in which.

Figure 6A:
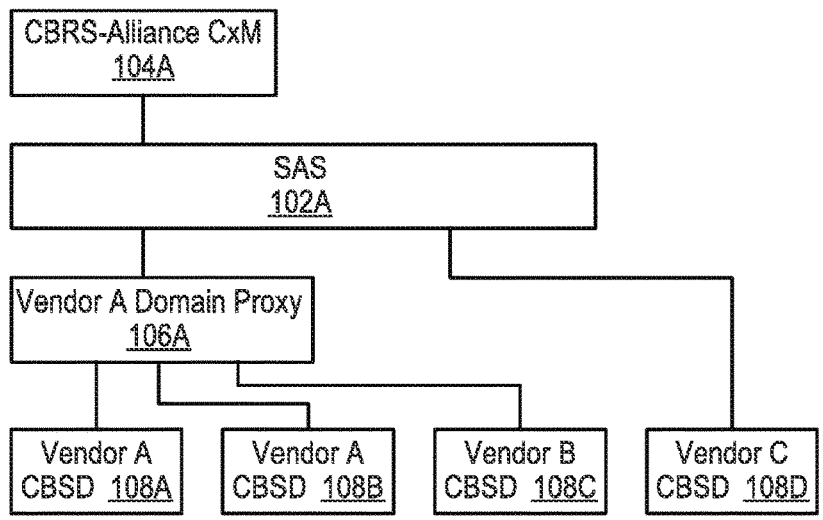
Figure 6B:
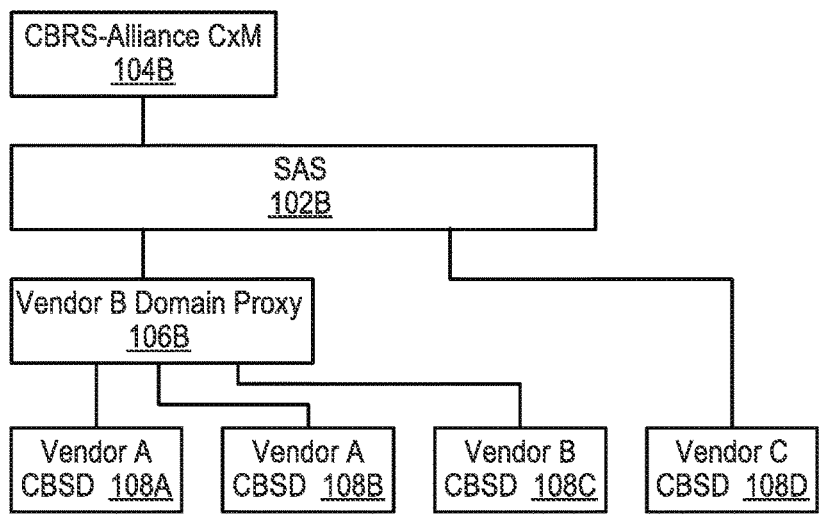
Figure 6C:
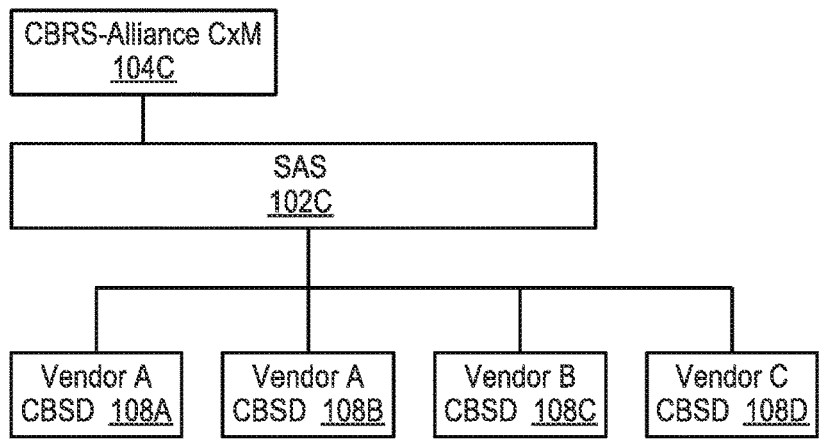
Figure 7:
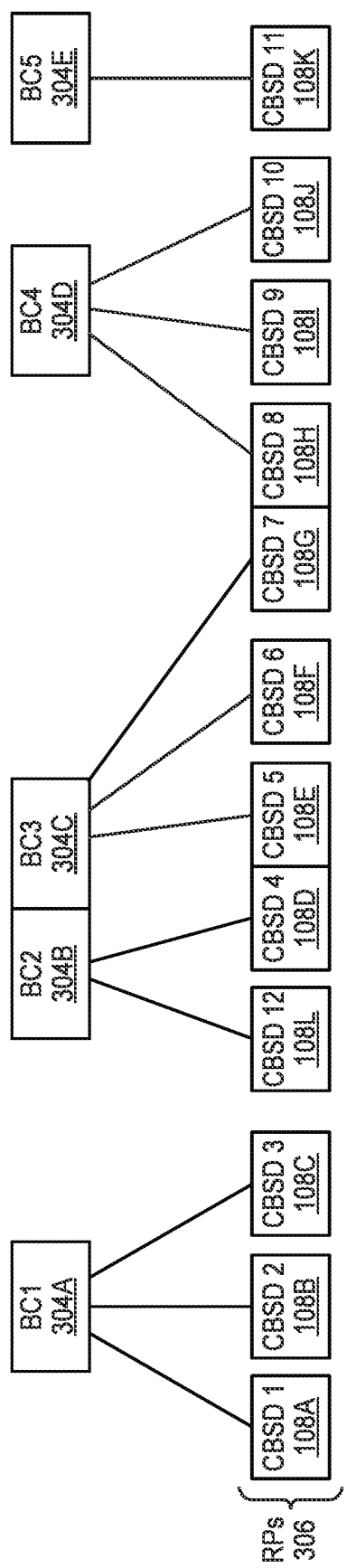
Figure 8:
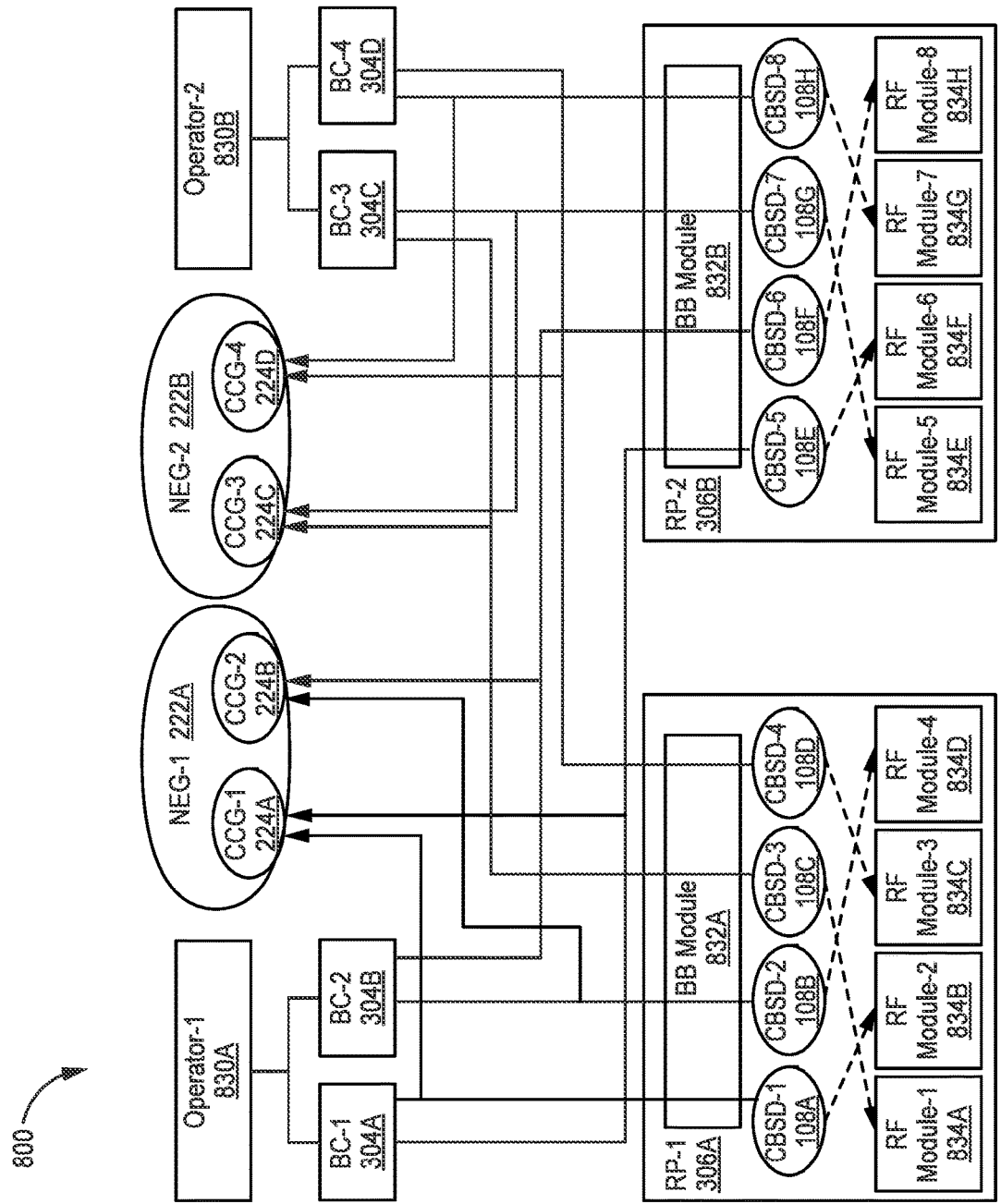
Figure 9A:
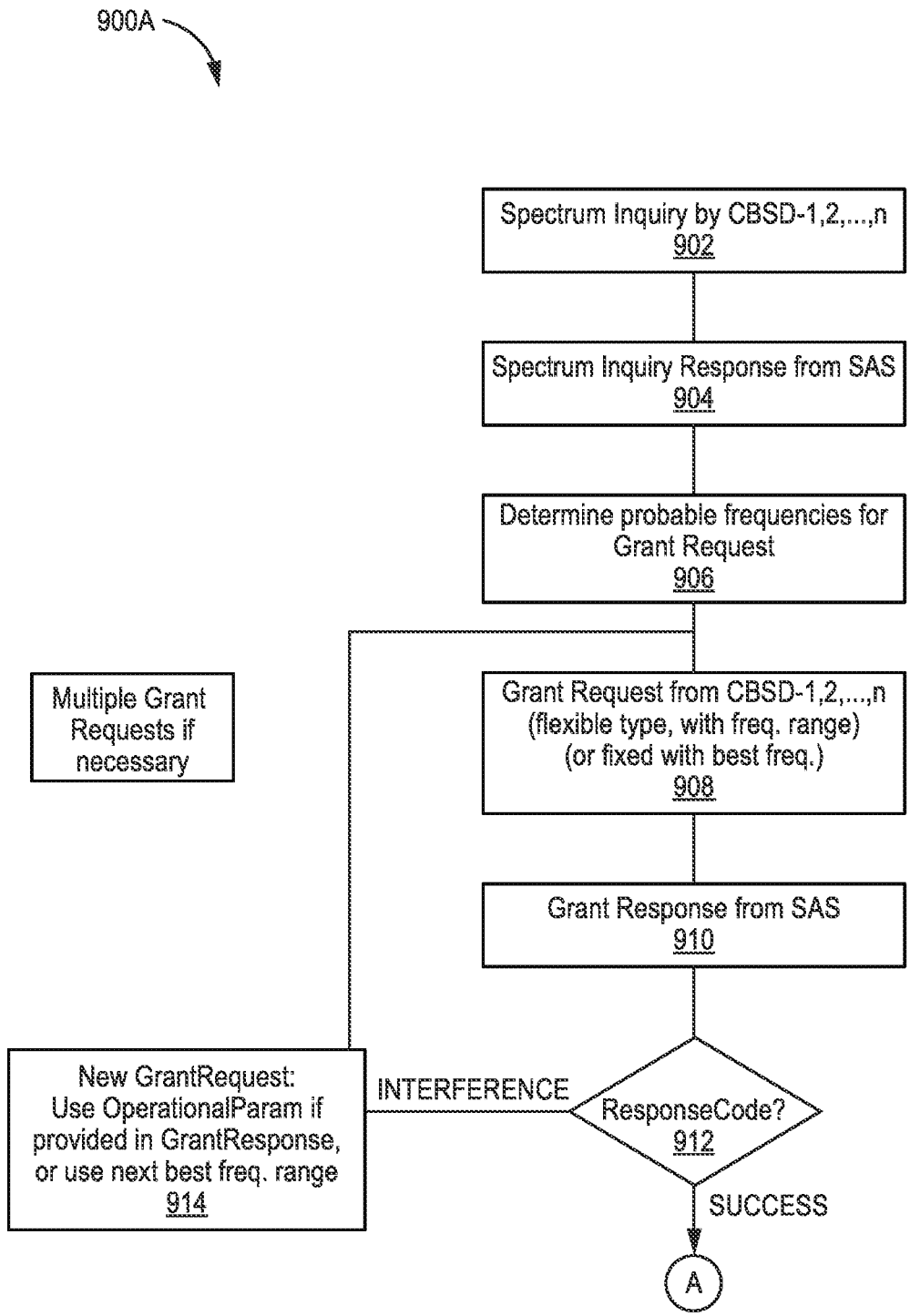
Figure 9B:
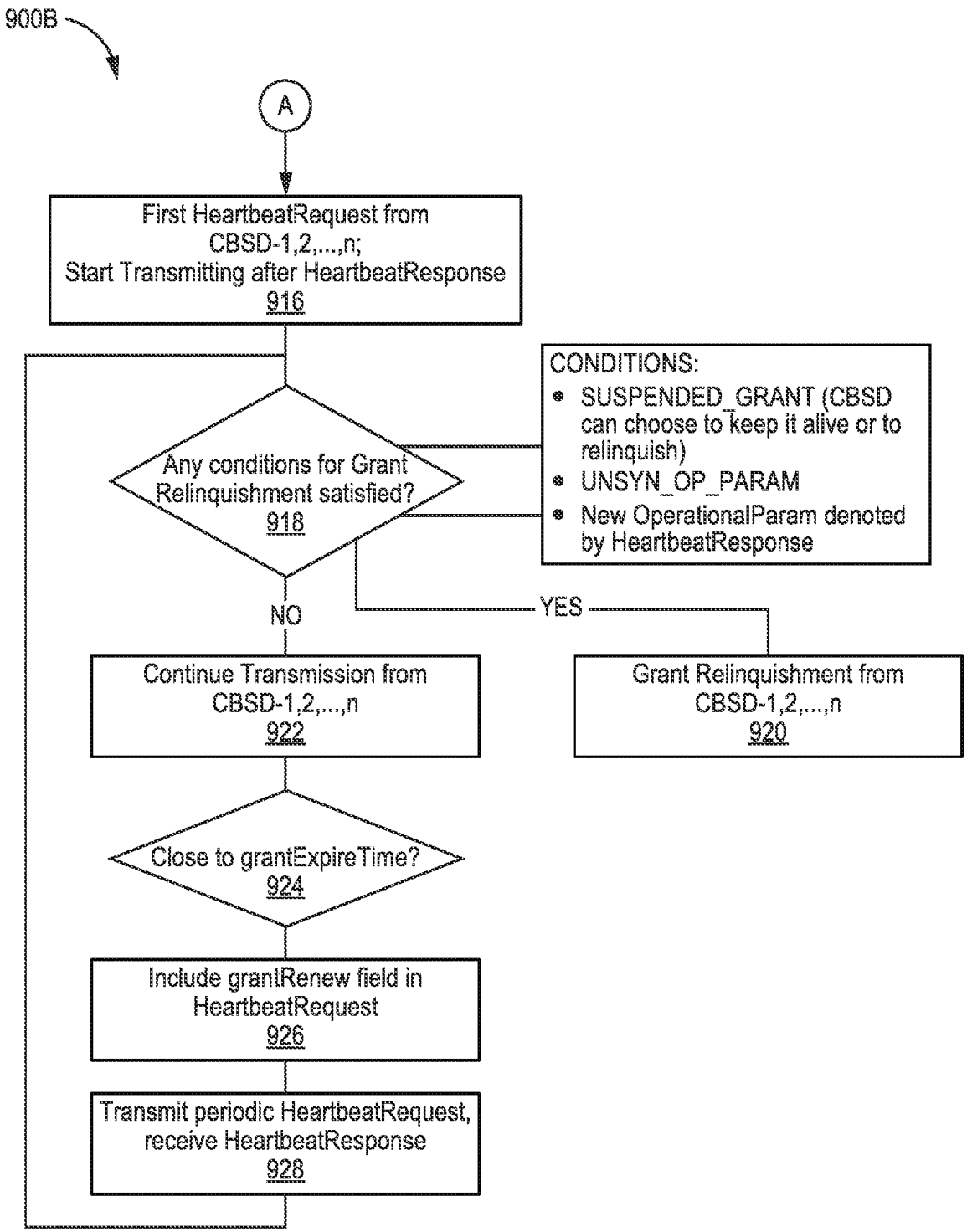
Figure 10A:
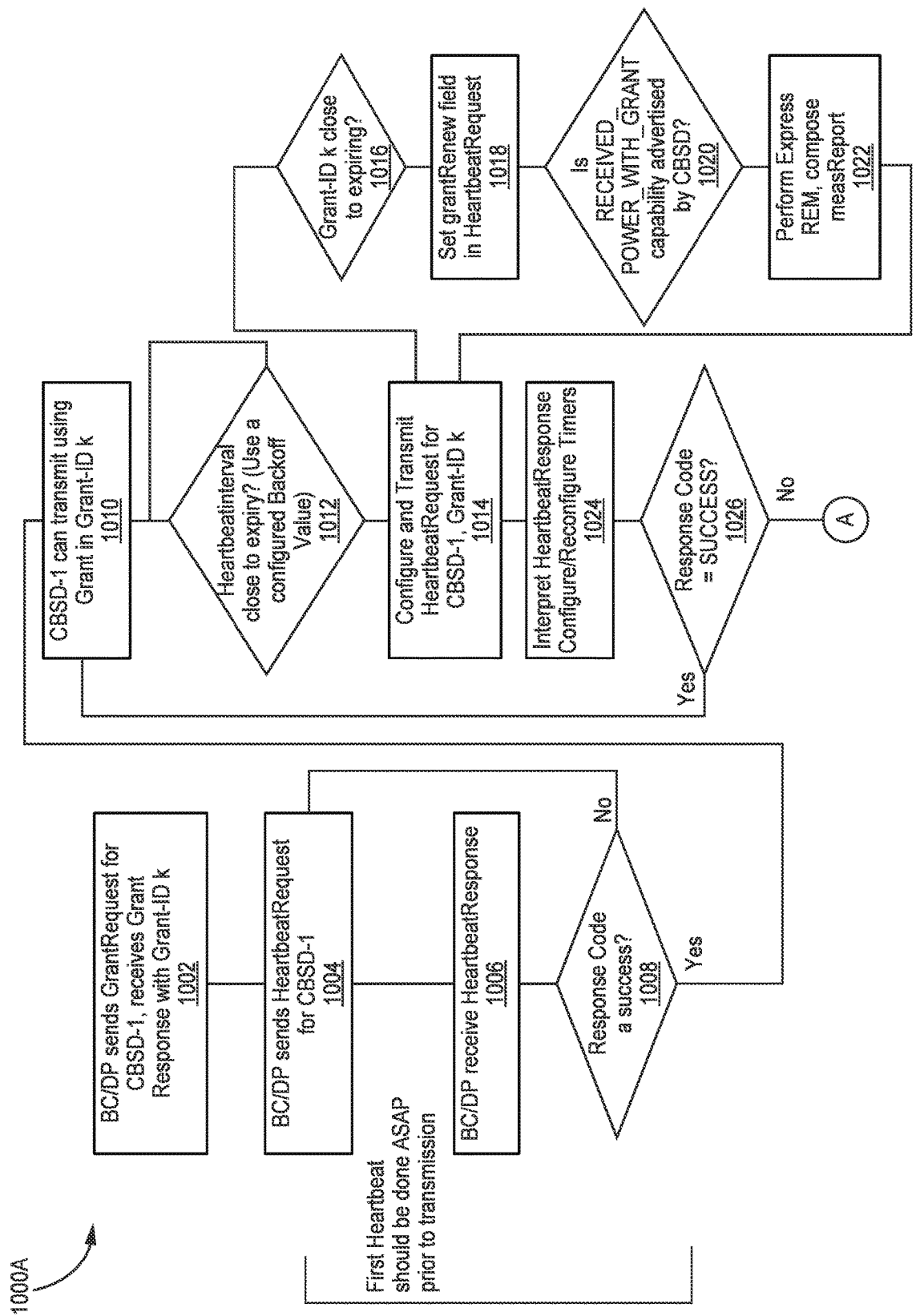
Figure 10B:
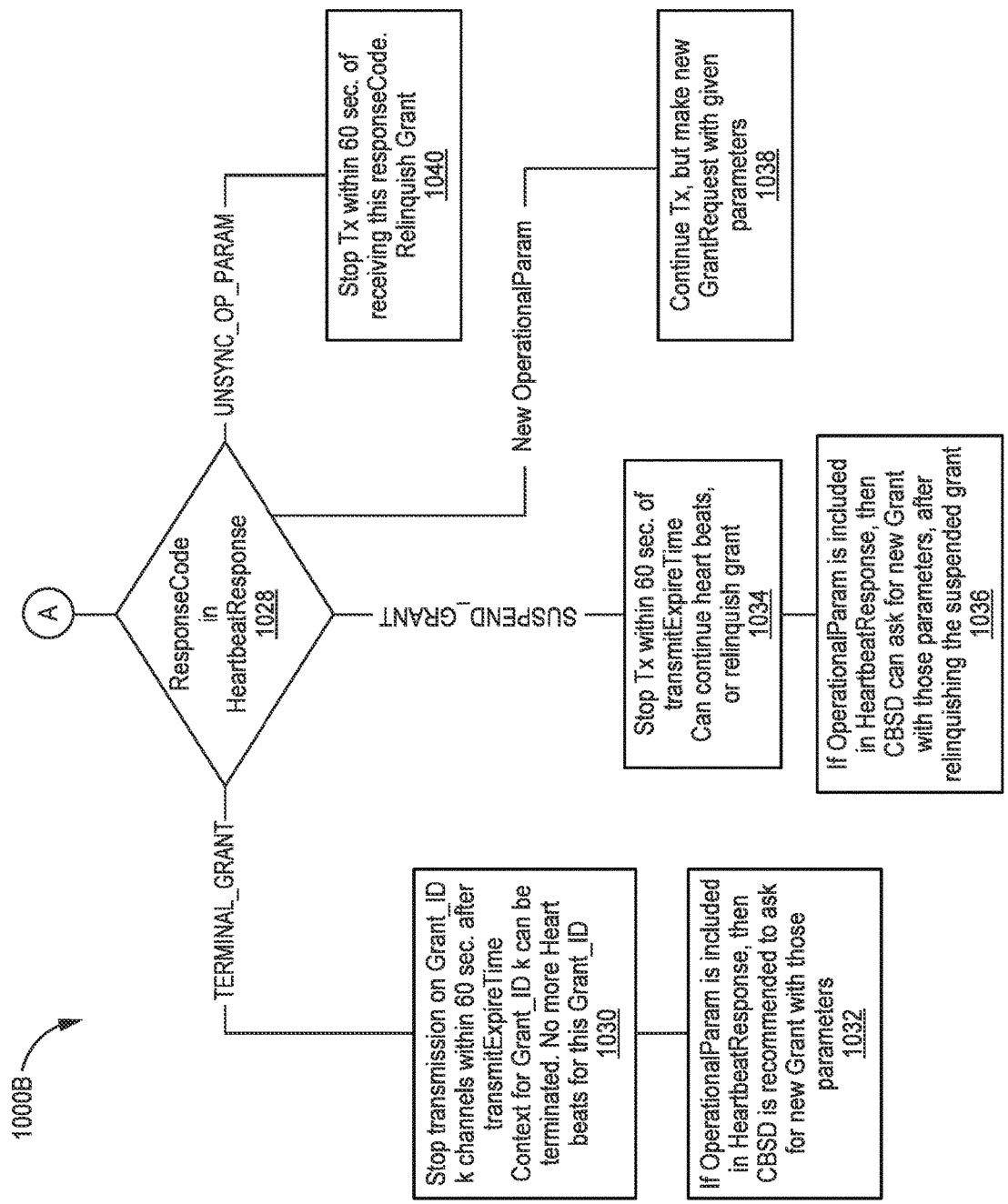
Figure 11A:
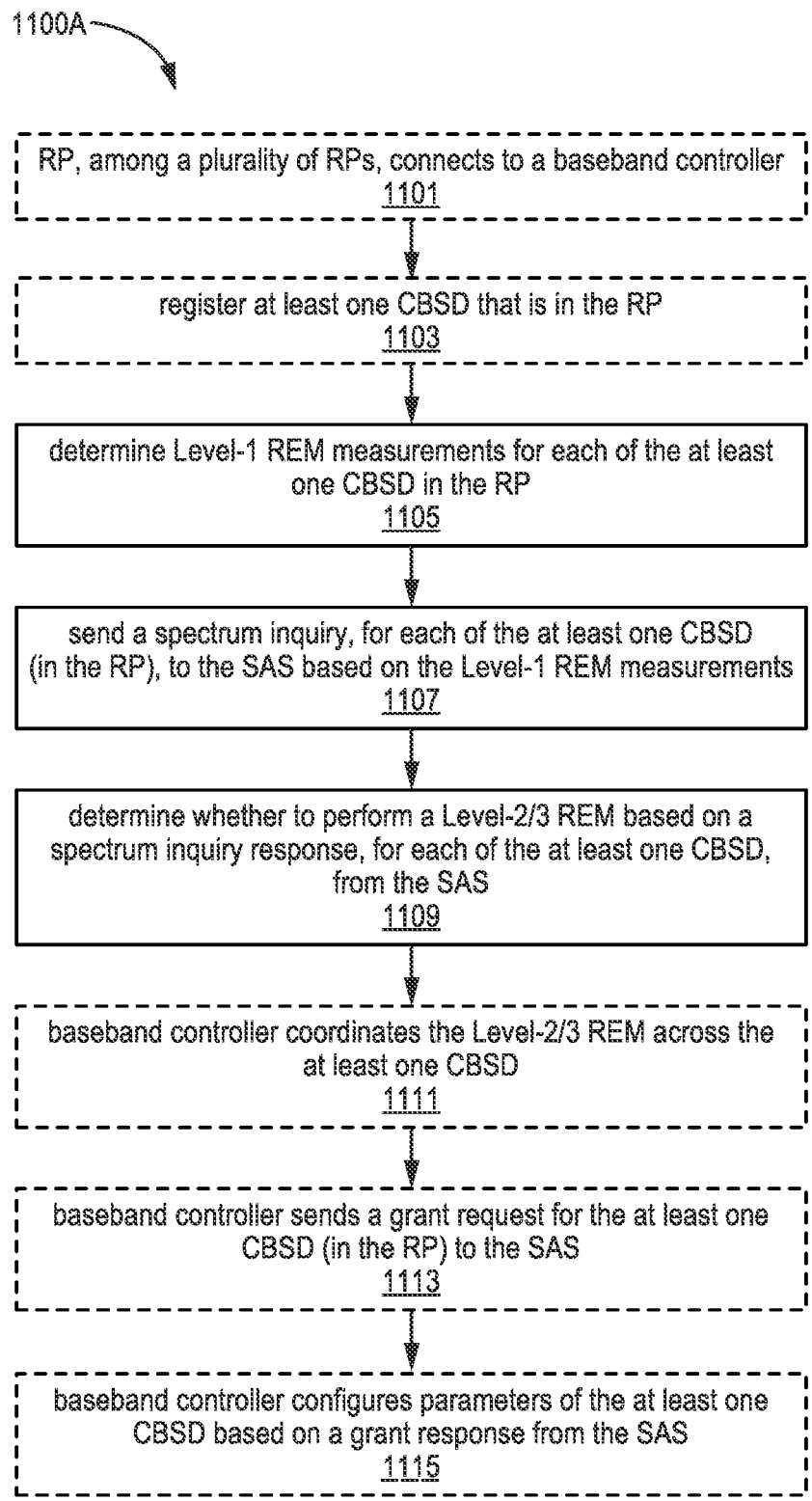
Figure 12A:
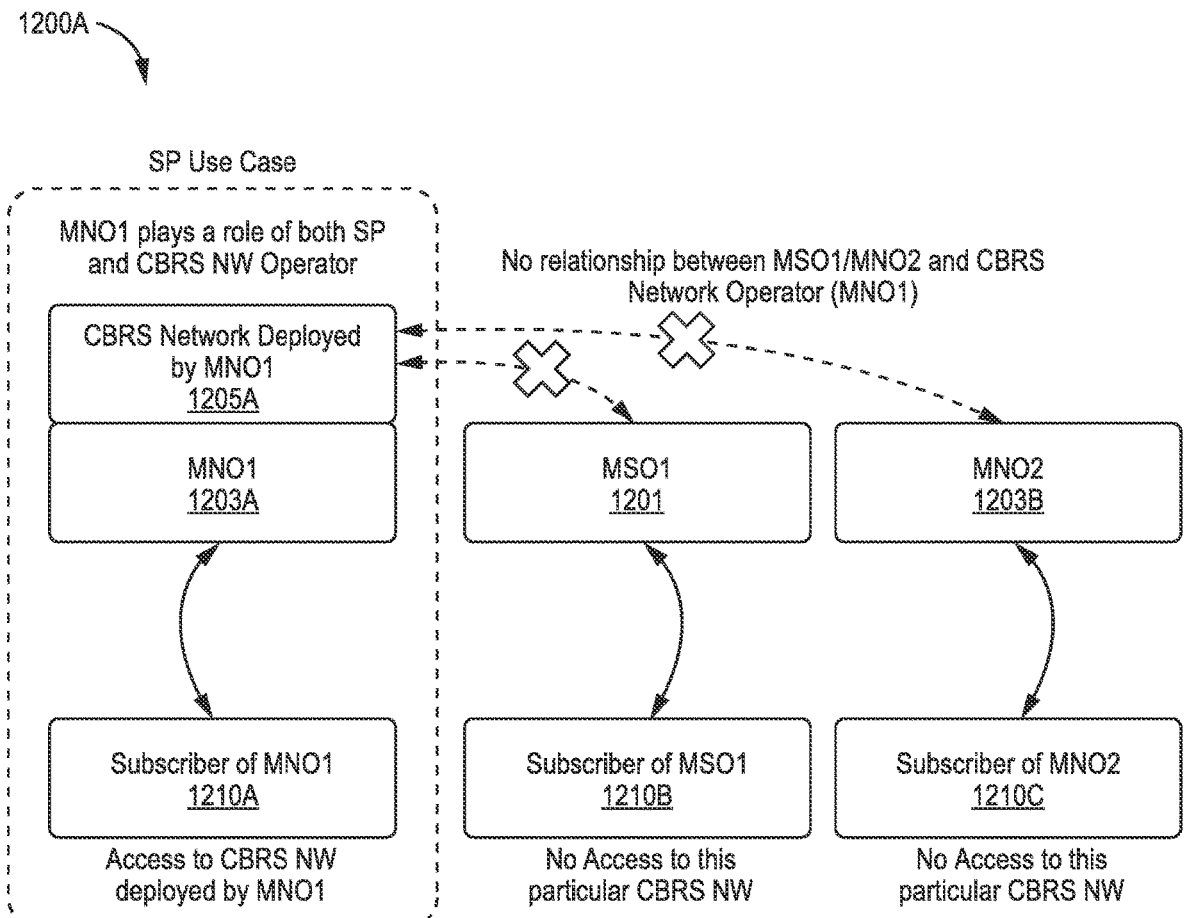
Figure 12B:
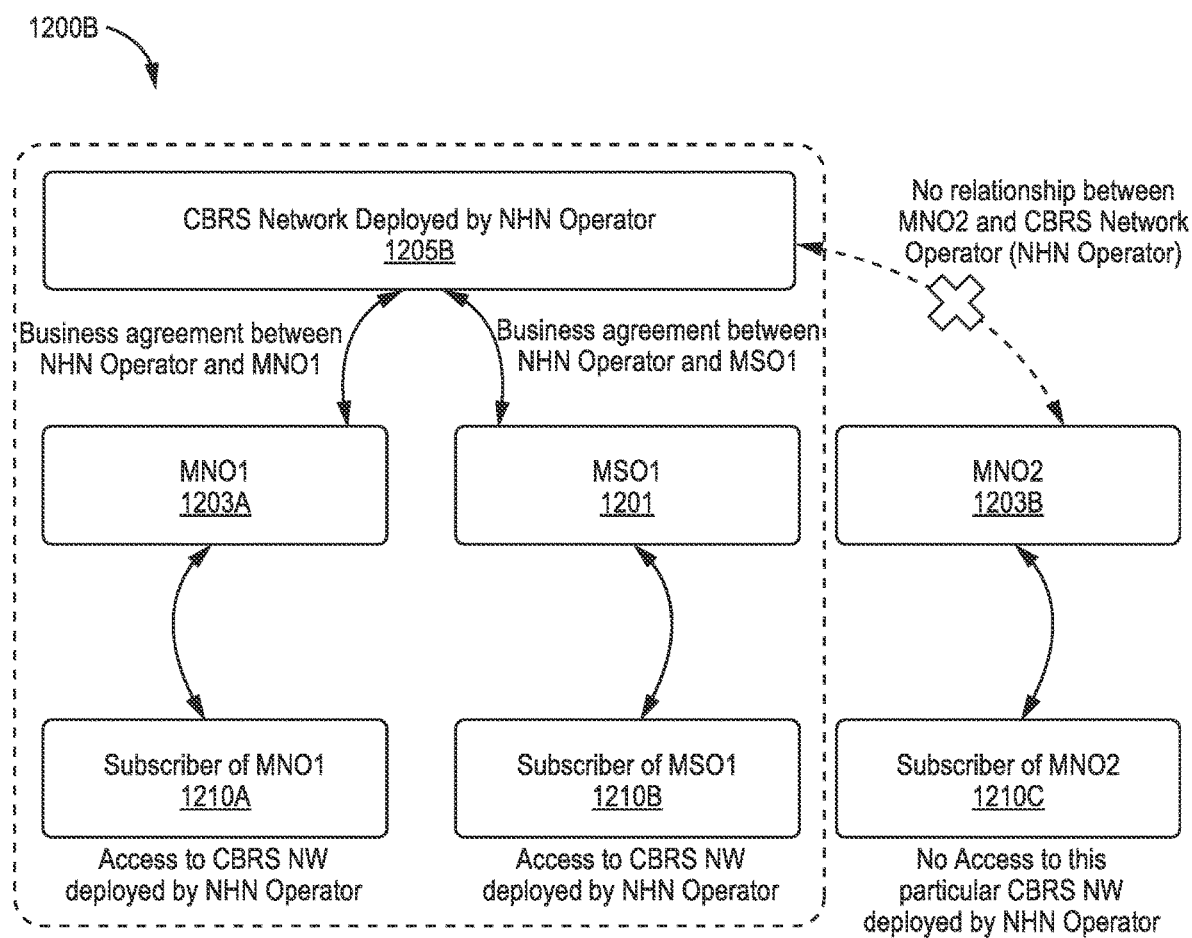
Figure 13:
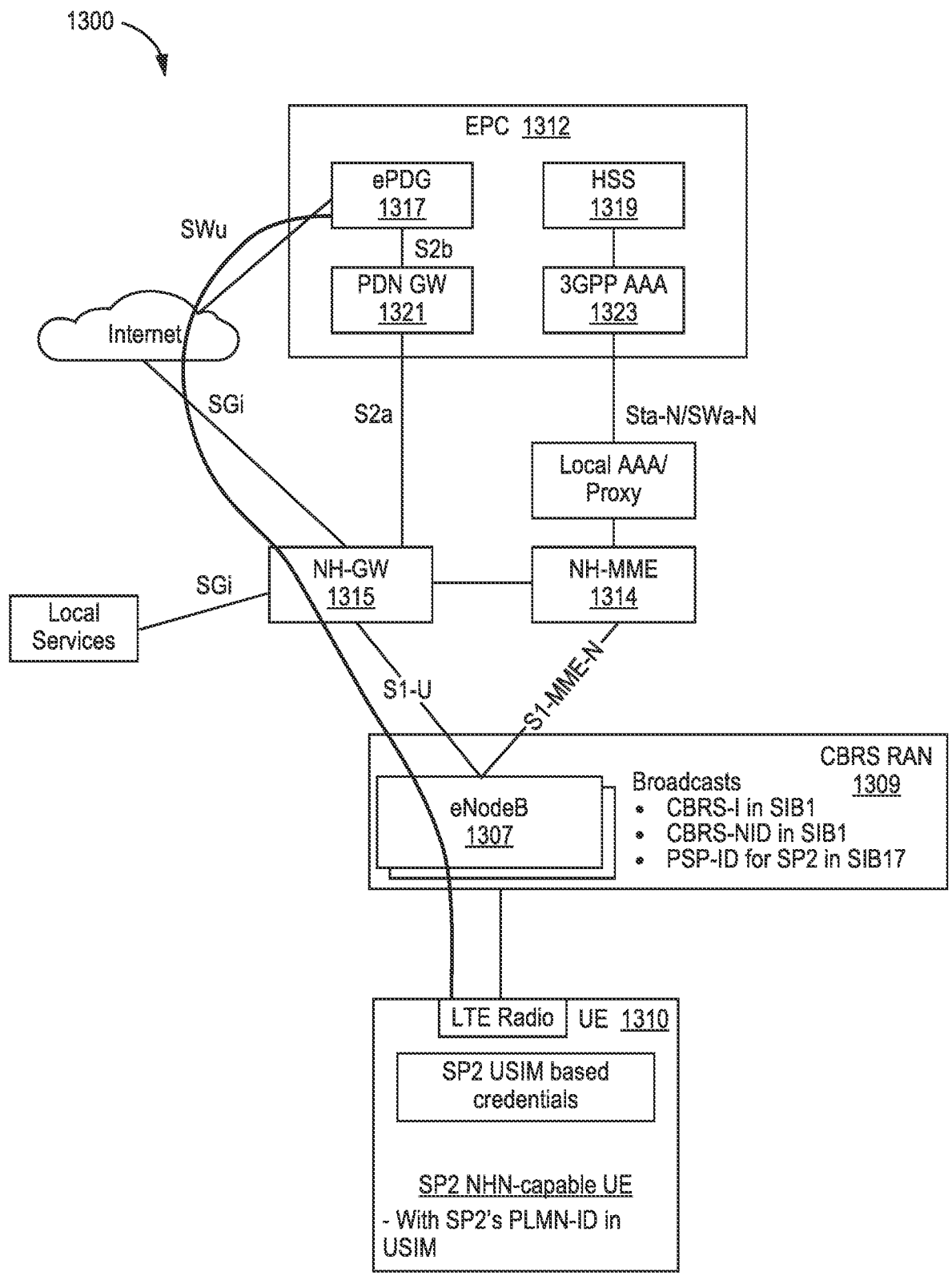
Figure 14:
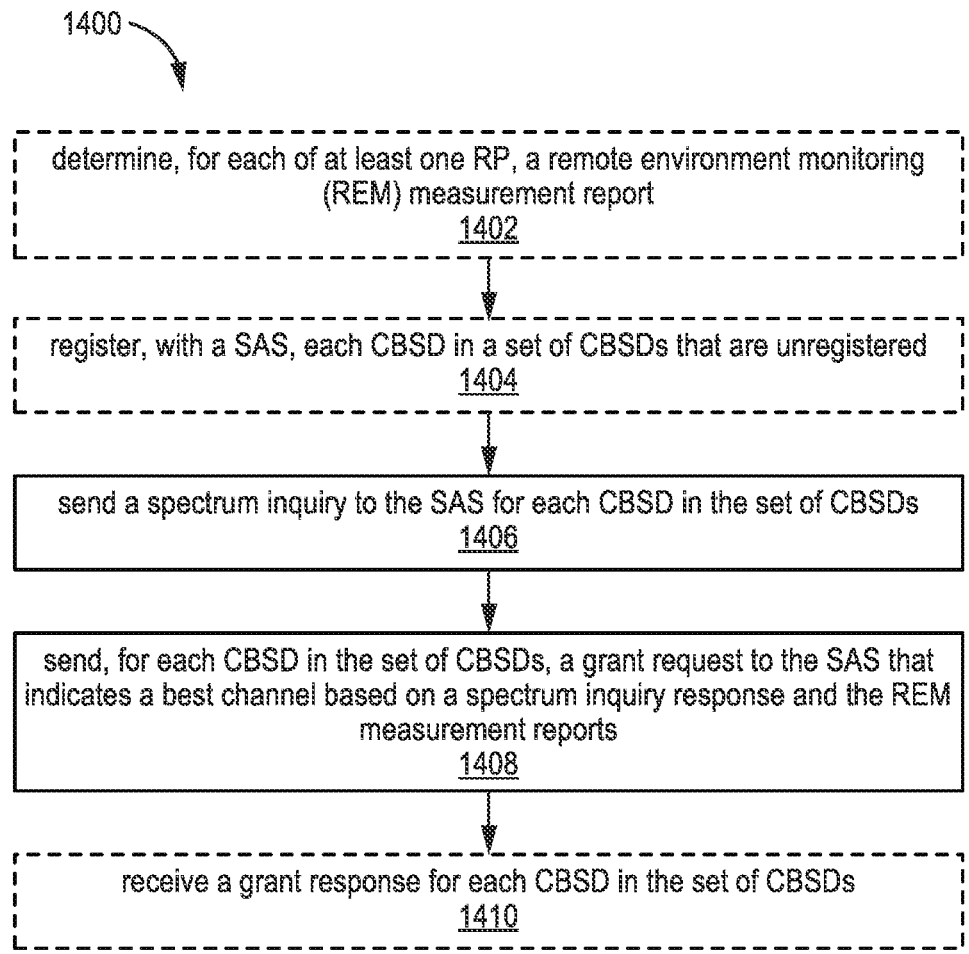
Figure 15A:
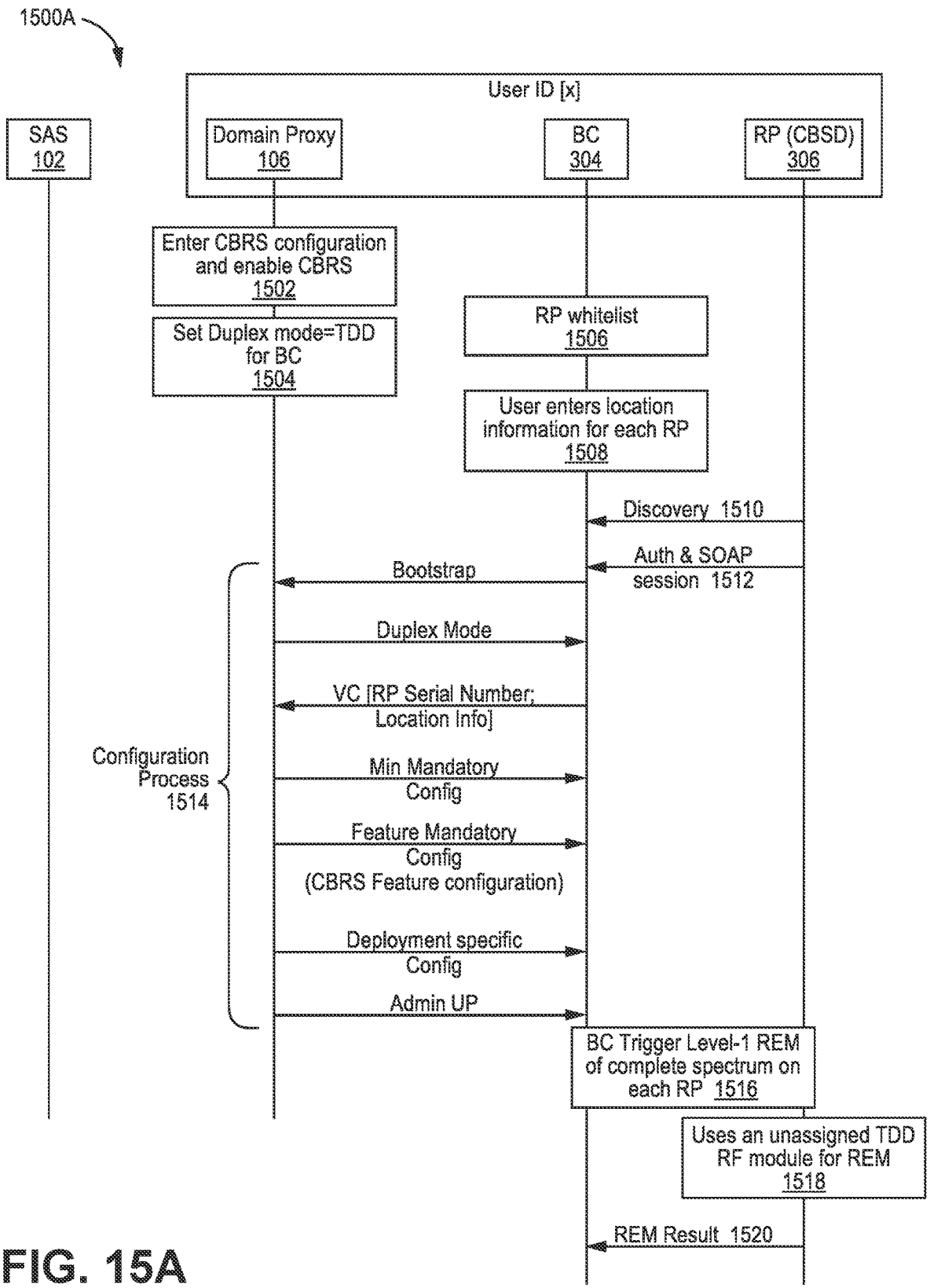
Figure 15B:
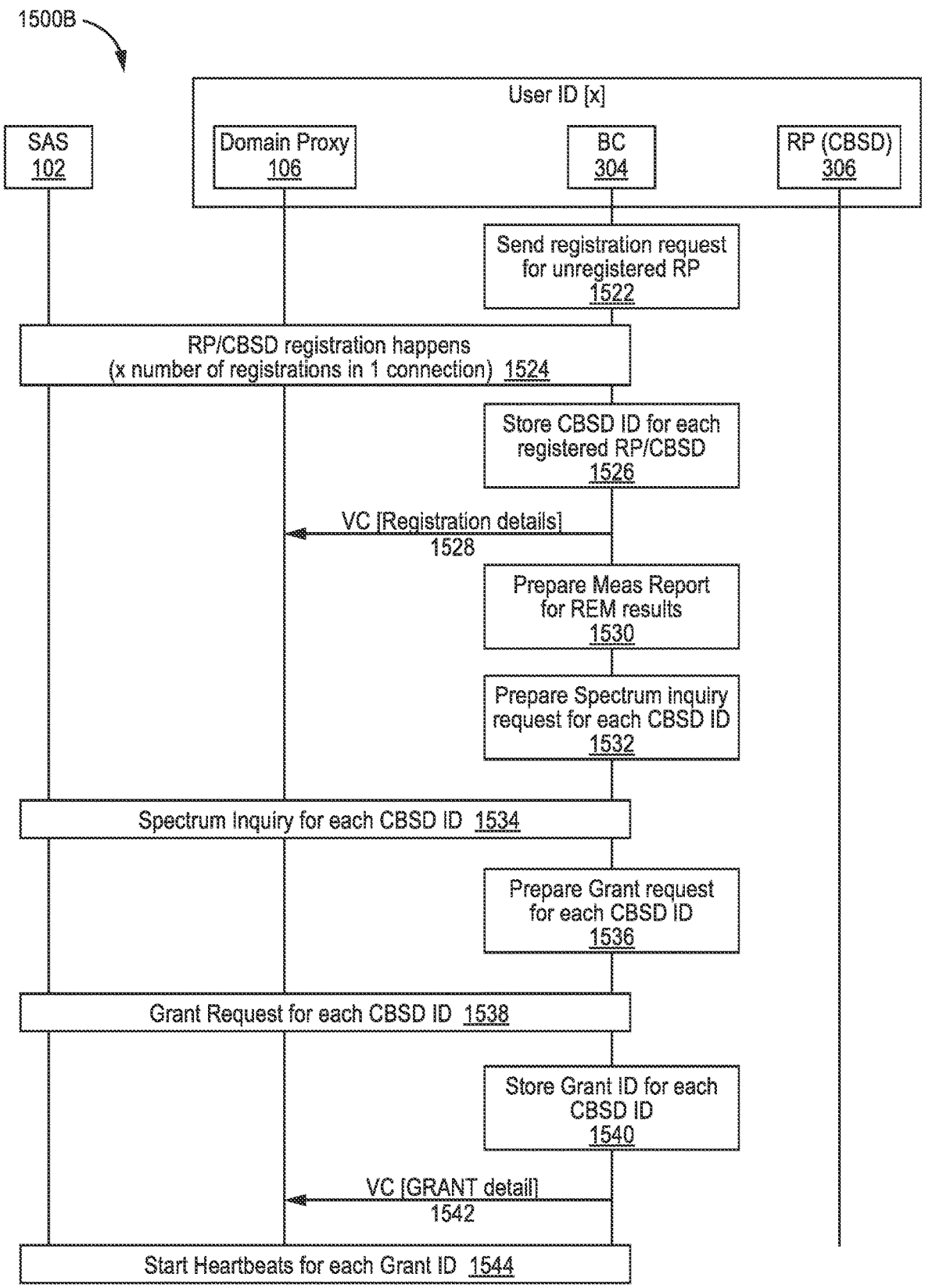
Figure 15C:
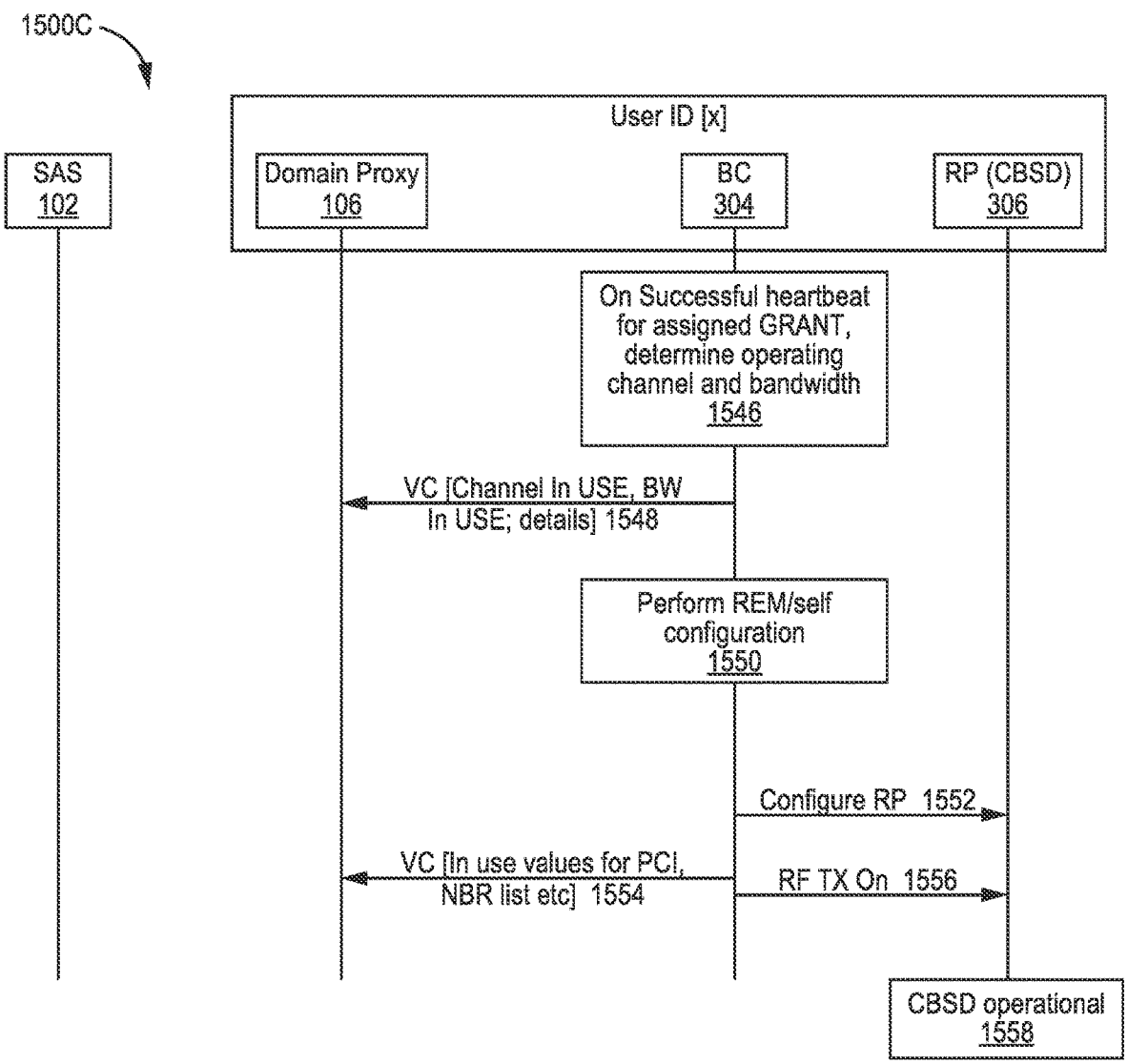
Figure 16:
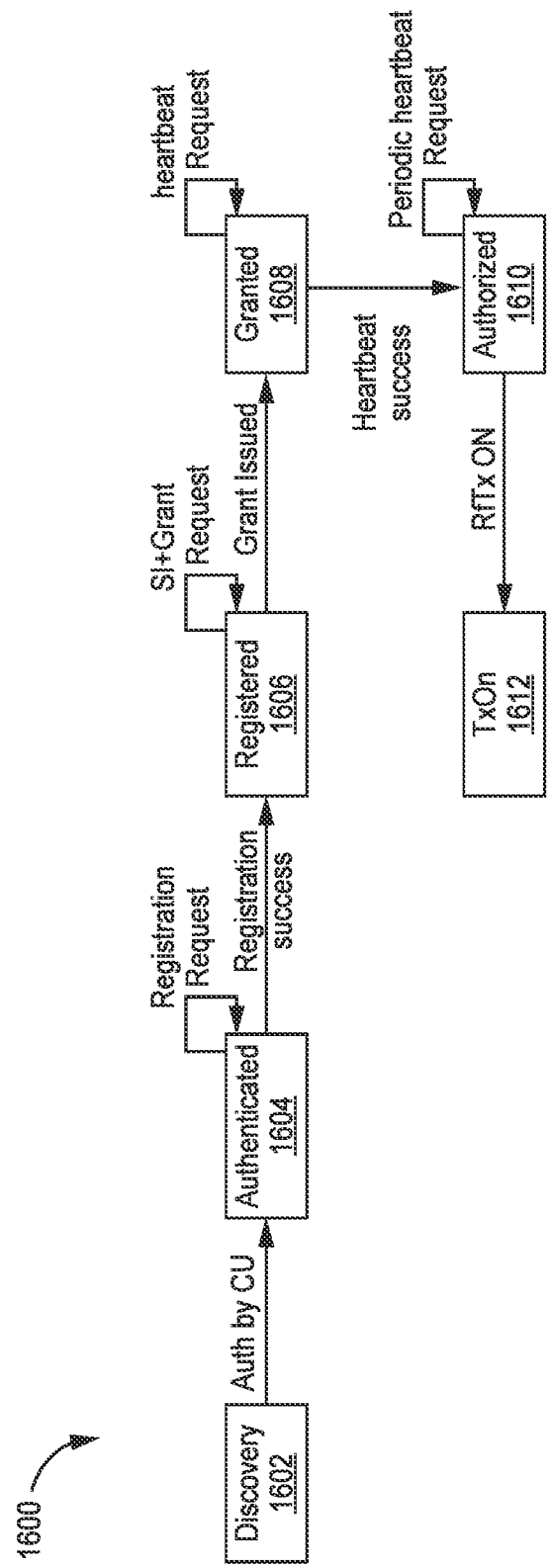

FIGS. 6A-C illustrate three different scenarios for a C-RAN CBRS deployment;

FIG. 7 is a block diagram illustrating CBSD mapping;

FIG. 8 is a block diagram illustrating a CBRS system implemented using CBSDs within RPs of a C-RAN;

FIGS. 9A-9B are flow diagrams illustrating methods for establishing and maintaining a CBSD 108 grant at a SAS;

FIGS. 10A-10B are flow diagrams illustrating methods for a HeartbeatRequest and subsequent HeartbeatResponse;

FIG. 11A is a flow diagram illustrating an example method for remote environment monitoring (REM) in a CBRS system implemented using a C-RAN;

FIG. 11B is a flow diagram illustrating another method for remote environment monitoring (REM) in a CBRS system implemented using a C-RAN;

FIG. 12A is a block diagram illustrating an example communication system implementing a service provider use case of CBRS;

FIG. 12B is a block diagram illustrating an example communication system implementing a neutral host use case of CBRS;

FIG. 13 is a block diagram illustrating an example communication system with a UE that connects to an evolved packet core (EPC);

FIG. 14 is a flow diagram illustrating an example method for a plug and play sequence by which a CBSD 108 becomes operational in a CBRS system;

FIG. 15A is a sequence diagram illustrating an example method for a plug and play sequence by which at least one CBSD is discovered, authenticated, and/or configured in a CBRS system;

FIG. 15B is a sequence diagram illustrating an example method for a plug and play sequence by which a spectrum grant is made to at least one CBSD in a CBRS system;

FIG. 15C is a sequence diagram illustrating an example method for a plug and play sequence by which a at least one CBSD becomes operational in a CBRS system after receiving a grant from a SAS; and FIG. 16 is a block diagram illustrating a state diagram for a CBSD in a radio point (RP).

In accordance with common practice, the various described features are not drawn to scale but are drawn to emphasize specific features relevant to the exemplary configurations.

DETAILED DESCRIPTION

Citizens Broadband Radio Service (CBRS) is a tiered commercial radio service in the 3.5 GHz frequency band in the U.S. This spectrum is still used by radar and some fixed satellite, both of which are referred to as "incumbents." CBRS implements rules that protect incumbent transmissions from interference, while still allowing other licensees (Priority Access License (PAL) and General Authorized Access (GAA) operators) to use the spectrum when it is not being used by incumbents.

The term Radio Access Network (RAN) refers to the part of a mobile communication network that connects wireless devices to the fixed network infrastructure through wireless radio channels, over specific radio frequencies. A cloud radio access network (C-RAN) is a point-to-multipoint distributed base station with one or more baseband controllers that are physically separated from, and communicatively coupled to, multiple radio points (RPs).

The present systems and methods enable a C-RAN to operate in a CBRS system. Specifically, and without limitation, the present systems and methods enable a C-RAN to provide wireless service to user equipment (UE) in the CBRS band using Time Division Duplex (TDD).

CBRS Overview

Figure 1A:
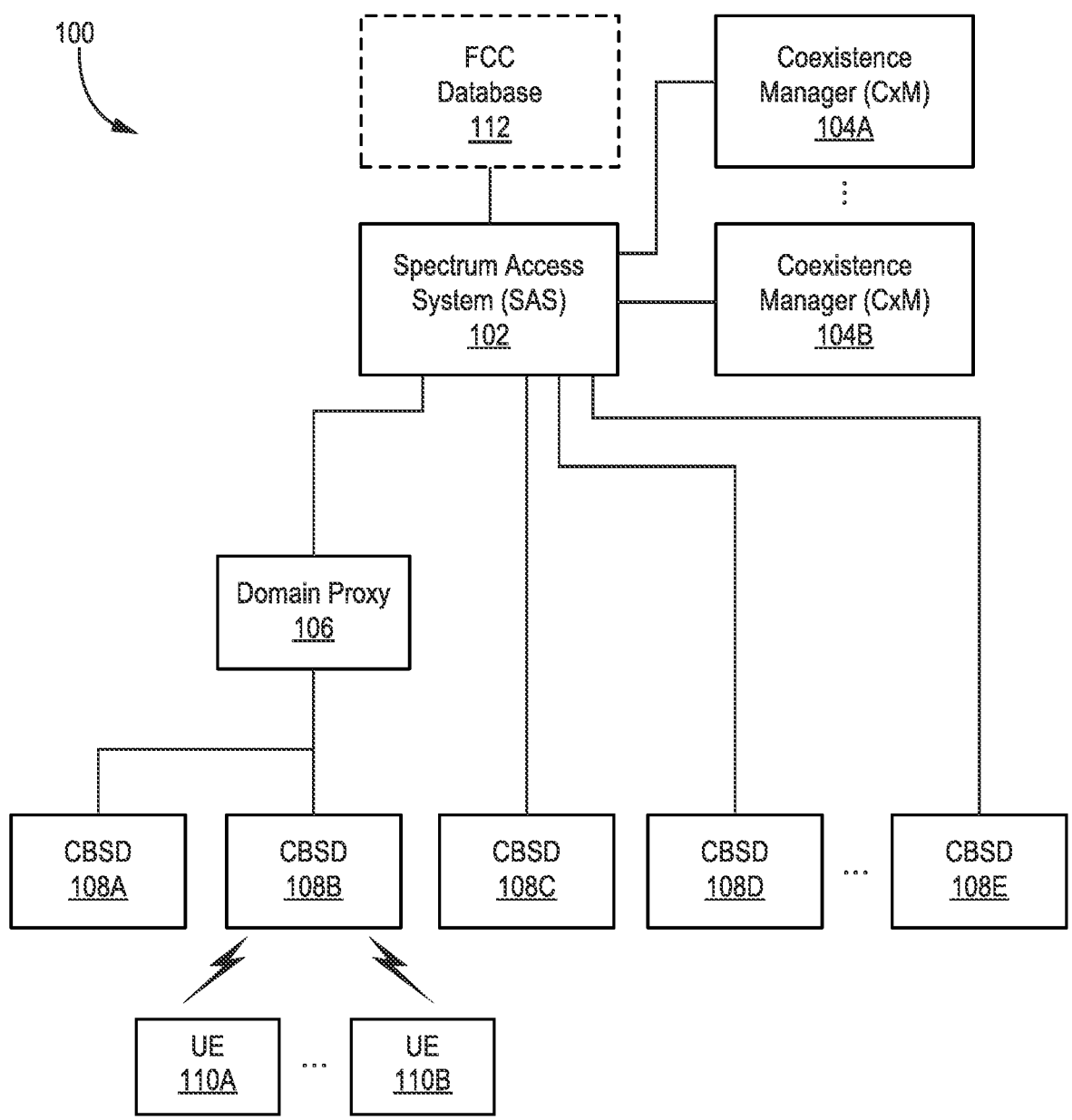
FIG. 1A is a block diagram illustrating one exemplary configuration of a Citizens Broadband Radio Service (CBRS) system.

FIG. 1A is a block diagram illustrating one exemplary configuration of a Citizens Broadband Radio Service (CBRS) system 100. The system 100 may include a spectrum access system (SAS) 102, a CBRS coexistence manager (CxM) 104, one or more Citizens Broadband Radio Service devices (CBSDs) 108A-E, and one or more user equipment terminals (UEs) 110A-B. The various connections illustrated in FIG. 1A may be implemented using one or more ETHERNET connections.

All devices (e.g., CBSDs 108) transmitting in the CBRS band are required to be able to transmit and receive in the entire 3.5 GHz band, even if they are not deployed in that manner. Devices operating in the CBRS band may also be required to transmit according to FCC guidelines.

Figure 1B:
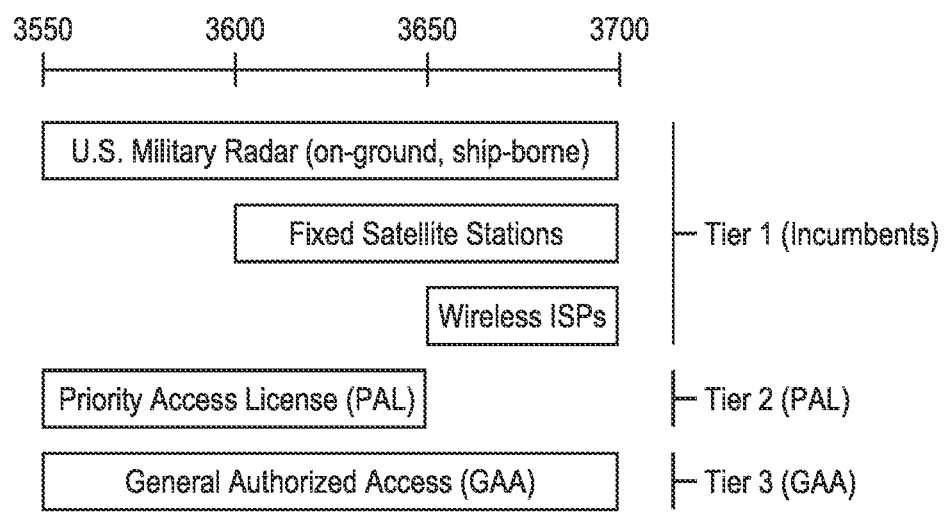
FIG. 1B is a diagram illustrating tiered spectrum usage within a CBRS system.

FIG. 1B is a diagram illustrating tiered spectrum usage within a CBRS system 100. CBRS is a tiered radio service in which channels are allocated within and across tiers. These tiers can include, in order of priority, (1) incumbent licensees; (2) Priority Access License (PAL) operators; and (3) General Authorized Access (GAA) operators. Portions of spectrum that are not continuously used by an incumbent licensee can be allocated to the secondary users—that is, PAL licensees and GAA operators.

Incumbent (Tier 1) licensees include RADAR and some fixed satellites. Existing wireless internet service providers (ISPs) using the CBRS band may be transitioned to PAL and/or GAA over time. Incumbent licensees typically operate in coastal areas but may also operate inland. Incumbent (Tier 1) users may operate anywhere in the 3550-3700 MHz spectrum (e.g., RADAR), from 3600-3700 MHz (e.g., fixed satellite stations), or from 3650-3700 MHz (e.g., wireless ISPs), as shown in FIG. 1B.

A PAL (Tier 2) is an authorization to use a channel (e.g., an unpaired 10 MHz channel) in the 3.5 GHz range in a geographic service area for a period (e.g., 3 years or longer). The PAL geographic service area may be census tracts, which typically align with the borders of political boundaries such as cities or counties. PAL licensees can aggregate up to four PAL channels in any census tract at any given time and may obtain licenses in any available census tract. PAL licensees may be authorized to use up to seven 10 MHz channels in total. PAL licensees may provide interference protection for Tier 1 incumbent licensees and accept interference from them. However, PAL operators may be entitled to interference protection from GAA operators. PAL (Tier 2) users may operate from 3550-3650 MHz, depending on their grant, as shown in FIG. 1B.

A GAA (Tier 3) permits access to bandwidth (e.g., 80 MHz) of the 3.5 GHz band that is not assigned to a higher tier (i.e., incumbent licensees or PAL licensees). GAA operators may be licensed "by rule," meaning that entities that qualify to be FCC licensees may use FCC-authorized telecommunications equipment in the GAA band without having to obtain an individual spectrum license. GAA operators may receive no interference protection from PAL licensees or Tier 1 operators and may accept interference from them. GAA (Tier 3) users may operate anywhere in the 3550-3700 MHz spectrum, depending on their grant, as shown in FIG. 1B.

CBRS census tracts (areas of individual licenses) may be much smaller than that for a typical licensed band channel. There are expected to be about 70,000 census tracts in the U.S. As shown in FIG. 1B, PAL license holders have priority over the GAA users.

Returning again to FIG. 1A, each radio transceiver using the spectrum is referred to as a CBRS Device (CBSD) 108. The Spectrum Access System (SAS) 102 is an FCC-mandated function that is responsible for managing CBSDs' 108 spectrum usage and allocating channels to CBSDs 108 upon request. The SAS 102 is also the primary entity that ensures FCC compliance of all devices (e.g., CBSDs 108) operating in the CBRS spectrum. The SAS 102 may be implemented with one or more processors in one or more physical devices. The SAS 102 may optionally be coupled to an FCC database 112 that includes data used by the SAS 102 during spectrum allocation.

Since the CBRS band is open spectrum, it can be used by different devices operating according to different wireless protocols, e.g., CBSD devices, Wireless Internet Service Providers Association (WISPA) devices, Wi-Fi devices, etc. In addition to authorizing and managing the use of the CBRS spectrum, the SAS 102 may protect higher-tier operators from interference. This type of interference protection may include two aspects.

First, the SAS 102 is legally obligated (and licensed by the FCC) to determine if an incumbent (e.g., radar transmissions) requires the use of the CBRS spectrum in any geographical area. If so, the SAS 102 may mute any potentially-interfering CBSDs 108. For this purpose, a SAS 102 deployment may be accompanied by a deployment of radio frequency (RF) sensors near all locations where incumbent transmissions are expected, e.g., where the locations are designated by FCC.

Second, the SAS 102 may also protect PAL CBSDs 108 from GAA CBSDs 108. The SAS 102 does this by either (a) preventing GAA devices from operating in the same spectrum as PAL devices in an area, or (b) reducing the power of the GAA CBSDs 108 (e.g., those inside a building), such that their co-channel interference to PAL CBSDs 108 is below a configured threshold.

The SAS 102 is aware of the nature of each CBSD's 108 license, e.g., PAL or GAA. The SAS 102 will also have current information regarding the presence of absence of incumbent transmissions in each geographical area (gathered via the RF sensors).

CBSDs 108 operating in the CBRS band may be required to register with the SAS 102 and provide their location and other details to the SAS 102. The SAS 102 may then allocate a set of RF channels that the PAL and GAA users can access. The SAS 102 may also limit the maximum power of CBSDs 108 to perform interference mitigation between tiers.

The CBRS Alliance is a group of companies that promulgates rules/specifications for its members when using the CBRS band. In addition to FCC Guidelines, devices certified by the CBRS Alliance (e.g., CBSDs 108, CxM 104, and/or UEs 110) must also comply with the rules/specifications promulgated by the CBRS Alliance. Any type of transmission is allowed in the CBRS band, subject only to power and spectral-leakage-related requirements. The CBRS Alliance, however, is advocating the use of LTE TDD as the technology of choice. The 1st phase of CBRS Alliance specifications specify the use of traditional LTE, while the 2nd phase will focus on listen before talk (LBT)-based solution, such as LTE-LAA.

The CBRS Alliance is responsible for the LTE technology-related specifications for the CBSD, including: (1) certification procedures for CBRS-A CBSDs 108; (2) procedures in the CBRS-A Coexistence Manager (CxM 104), which may exist as a module inside the SAS 102, for LTE-specific functions; and/or (3) specification of tunneled messages between CBRS-A CBSDs 108 and the CBRS-A Coexistence Manager (CxM) 104.

While the CBRS Alliance is responsible for standardizing LTE aspects of CBSDs, the ownership for the overall standardization belongs to WInnForum (Wireless Innovation Forum). The WInnForum is responsible for the SAS-related specifications, as well as the primary CBSD 108 specifications that are non-technology-specific. The WInnForum responsibilities include: (1) SAS-to-CBSD communication protocols; and (2) the SAS and CBSD 108 test and certification (from the point of view of FCC compliance).

Each CBSD 108 may provide wireless (e.g., Long Term Evolution (LTE), 5G) service to one or more user equipment terminals (UEs) 110 in a surrounding geographical area. Each CBSD 108 may be a PAL and/or a GAA user. There are at least two classes of CBSDs: class A and class B. A CBSD's 108 class may be distinguished by their maximum conducted powers, e.g., 24 dBm for class A and 30 dBm for class B.

The UEs 110 may be mobile end user terminals, and may also referred to as handsets, smartphones, cell phones, access terminals, wireless communication devices, mobile devices, etc. The UEs 110 may be LTE UEs that are additionally certified by the CBRS Alliance. The UEs 110 may wait for authorization from a nearby CBSD 108 before transmitting in the CBRS band.

A CxM 104 may manage the interference between the deployed devices (e.g., the CBSDs 108) by advising the SAS 102 about channel allocation. The CxM 104 may be implemented as a component of the SAS 102 or a separate physical device that is coupled to the SAS 102, e.g., by an ETHERNET connection. In one configuration, the SAS 102 may allocate a chunk of spectrum (i.e., a set of radio frequency (RF) channels) to the CxM 104. The CxM 104 may then sub-allocate the spectrum among the CBSDs 108. Therefore, the CBSDs 108 may provide wireless service to the UEs 110 using one or more of the RF channels allocated thereto by the CxM 104. The system 100 may include more than one CxM 104. For example, a first CxM 104A may be a CBRS Alliance CxM 104A serving CBSDs 108A-C certified by the CBRS Alliance, while a second CxM 104 may certified by a different alliance (or no alliance) and may serve a different set of CBSDs 108D-E that haven't been certified by the CBRS Alliance. As stated above, the CxM(s) 104 may optionally be module(s) within the SAS 102.

Each CBSD 108 may provide location information (e.g., GPS) to the SAS 102 and/or the CxM 104. Additionally, the SAS 102 and/or the CxM 104 may have access to terrain/building data, i.e., data that describes the physical propagation environment. The SAS 102 and CxM 104 together may form a propagation map (i.e., map) that indicates levels of interference each device (e.g., each CBSD 108) will cause another device. Using the map, the SAS 102 and CxM 104 may allocate/grant spectrum to the various CBSDs 108 in the system 100.

Optionally, the CBSDs 108A-B may be coupled to the SAS 102 via a domain proxy 106. The domain proxy 106 (also referred to as a device management system (DMS)) may aggregate messages between a group of CBSDs 108A-B and the SAS 102. For example, the domain proxy 106 may concatenate northbound messages to the SAS 102 and distribute southbound messages to CBSDs 108. It should be noted that SAS-CBSD protocol messages are formed in the same manner, irrespective of whether they are transmitted directly or through a domain proxy 106.

Coexistence Manager (CxM)

Figure 2:
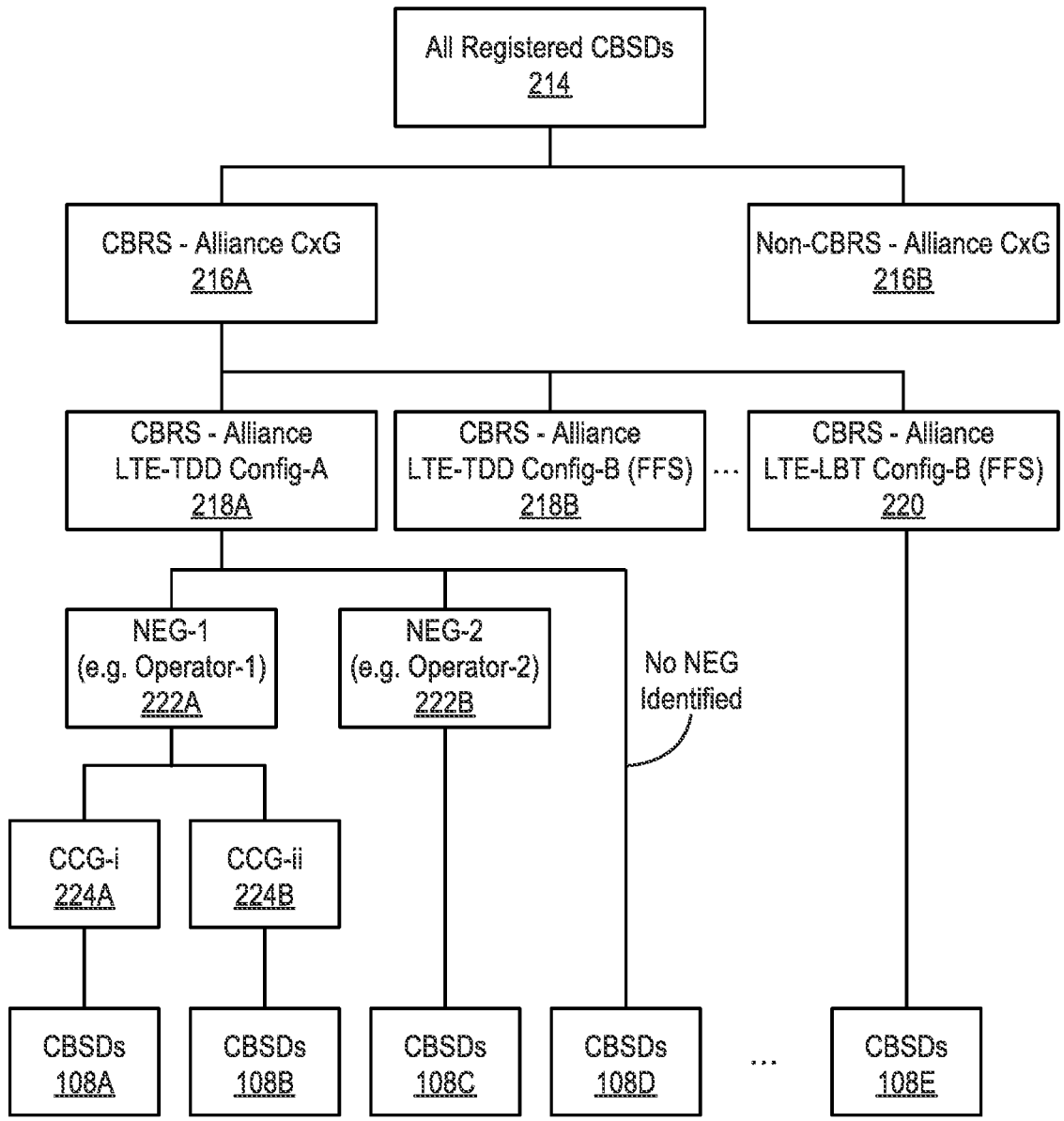
FIG. 2 is a block diagram illustrating for CBRS device (CBSD) management.

FIG. 2 is a block diagram illustrating for CBRS device (CBSD) 108 management. WInnForum and the CBRS Alliance have defined the hierarchy (in FIG. 2) for CBRS device (CBSD) 108 management. A Coexistence Group (CxG) is a group of CBSDs 108 that abide by a common interference management policy, which is used to coordinate their interference within the group.

Among all registered CBSDs 214, most will belong to a CBSD Coexistence group (CxG) 216A-B with limited exceptions. A Coexistence group (CxG) 216 may or may not be a CBRS-Alliance defined group. For example, there may be other Coexistence groups (CxGs) 216 that use other technologies that are not defined in the CBRS Alliance. Each Coexistence group (CxG) 216 of CBSDs 108 is managed by a Coexistence Manager (CxM) 104.

Within a Coexistence group (CxG) 216, there may be multiple Time Division Duplex (TDD) configurations 218A-B and/or LTE-LBT 220 configurations, and all devices using a particular configuration are further grouped together for management. Furthermore, additional LTE-TDD configurations 218 and/or LTE-LBT configurations 220 are possible under the CBRS-Alliance CxG. Underneath this, there are multiple No Edge Groups (NEGs) 222A-B (also referred to as Interference Coordination groups (ICGs)).

Each NEG 222 is a collection of devices (CBSDs 108) belonging to a single operator/entity. Within an NEG 222, further granular management of the CBSDs 108 is undertaken by the operator/entity through their aggregation and self-organizing network (SON)-like functions. Accordingly, the Coexistence Manager (CxM) 104 for an NEG 222 can limit its micromanagement of CBSDs 108 within an NEG 222. Furthermore, a subset of the NEG 222 may declare themselves to belong to a Common Channel Group (CCG)

224A-B. CBSDs 108 in the same CCG 224 are allotted the exact same channel at all times. This is for the purpose of devices (CBSDs 108), which may take a variety of forms, e.g., remote radio heads (RRHs), distributed antenna system (DAS) antennas, C-RAN RPs, etc. Note that each RRH, each DAS antenna (or antenna group at one location), and each radio point (RP) may correspond to a single CBSD 108 from a CxM 104 point-of-view.

Overview of C-RAN Architecture

Figure 3:
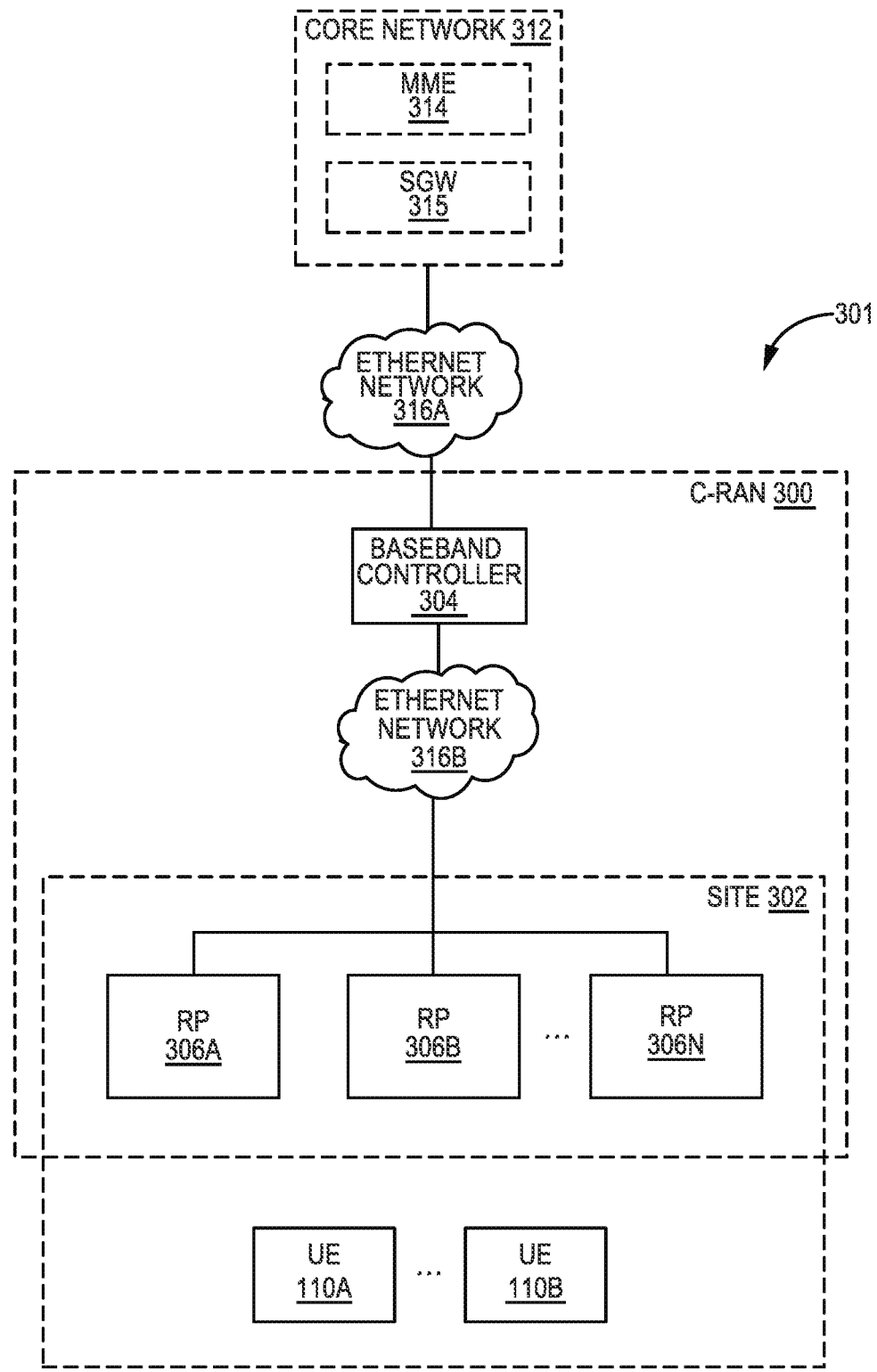
FIG. 3 is a block diagram illustrating an exemplary configuration of a system implementing a C-RAN.

FIG. 3 is a block diagram illustrating an exemplary configuration of a system 301 implementing a C-RAN 300. The system 301 may provide wireless service/coverage and capacity for one or more wireless network operators.

In the exemplary configuration shown in FIG. 3, the C-RAN 300 may utilize a point-to-multipoint distributed base station architecture that employs at least one (and optionally multiple) baseband unit 304 and multiple radio points (RPs) 306A-N that serve at least one cell. The C-RAN 300 may also be referred to herein as a "C-RAN system," and/or an "eNodeB" (or "eNodeB"). The baseband unit 304 is also referred to herein as a "baseband controller", "controller", "BC", or "CU". Each RP 306 may include or be coupled to at least one (e.g., two) antennas via which downlink RF signals are radiated to UEs 110A-B and via which uplink RF signals transmitted by UEs 110 are received. Where an action is described herein as being performed by an eNodeB or a C-RAN 300, it may be performed in the baseband controller 304 and/or at least one RP 306.

The RPs 306 and UEs 110 connected to (e.g., provided wireless service by) the C-RAN 300 may be located at a site 302. The site 302 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 302 may be at least partially indoors, but other alternatives are possible.

It should be noted that the baseband controller 304 may or may not be located at the site 302 (with the RPs 306). For example, the baseband controller 304 may be physically located remotely from the RPs 306 (and the site 302) in a centralized bank of baseband controllers 304. Additionally, the RPs 306 are preferably physically separated from each other within the site 302, although they are each communicatively coupled to the baseband controller 304.

Each UE 110 may be a computing device with a processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., M=1-1,000) may be present at the site 302.

The C-RAN 300 may be coupled to a core network 312 of each wireless network operator over an appropriate back-haul ETHERNET network 316A. For example, the Internet may be used for back-haul between the system 301 and each core network 312. However, it is to be understood that the back-haul ETHERNET network 316A can be implemented in other ways. The ETHERNET networks 316 described herein may be implemented with one or more switches, routers, and/or other networking devices.

In some configurations, the system 301 may be implemented as a Long Term Evolution (LTE) radio access network providing wireless service using an LTE air interface. However, it should be noted that the present systems and methods may be used with other wireless protocols, e.g., 5G. LTE is a standard developed by 3GPP standards organization. An eNodeB may be used to provide UEs 110 with mobile access to the wireless network operator's core network 312 to enable UE 110 to wirelessly communicate data and voice (using, for example, Voice over LTE (VoLTE) technology).

Also, in an exemplary LTE configuration, each core network 312 may be implemented as an Evolved Packet Core (EPC) 312 comprising standard LTE EPC network elements such as, for example, a mobility management entity (MME) 314 and a Serving Gateway (SGW) 315 and, optionally, a Home eNodeB gateway (HeNodeB GW) (not shown) and a Security Gateway (SeGW) (not shown).

The baseband controller 304 and radio points 306 can be implemented so as to use an air interface that supports one or more of frequency-division duplexing (FDD) and/or time-division duplexing (TDD). Also, the baseband controller 304 and the radio points 306 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 304 and the radio points 306 can implement one or more of the LTE transmission modes. Moreover, the baseband controller 304 and the radio points 306 can be configured to support multiple air interfaces and/or to support multiple wireless operators.

In the exemplary configurations shown in FIG. 3, the front-haul that communicatively couples each baseband controller 304 to the one or more RPs 306 is implemented using a standard ETHERNET network 316B. However, it is to be understood that the front-haul between the baseband controller 304 and RPs 306 can be implemented in other ways.

Data can be front-hauled between the baseband controller 304 and RPs 306 in any suitable way (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 304 and RPs 306, for example, via the ETHERNET network 316A and the ETHERNET network 316B (in the case of the RPs 306). The management system may send and receive management communications to and from the baseband controller 304, which in turn forwards relevant management communications to and from the RPs 306.

Spectrum Allocation Mechanism

Figure 4A:
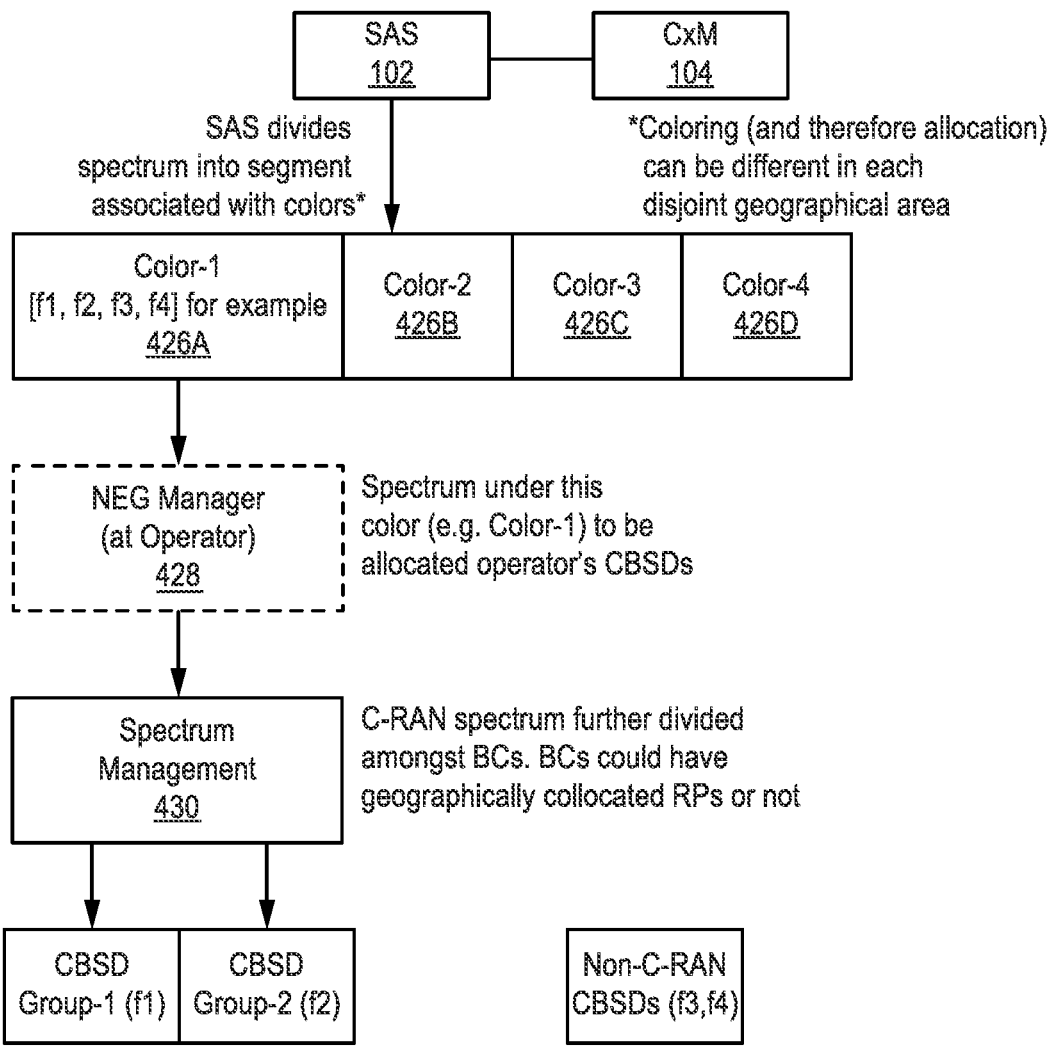
FIG. 4A is a block diagram illustrating graph coloring and spectrum allocation by a spectrum access system (SAS) and optionally a coexistence manager (CxM)
Figure 4B:
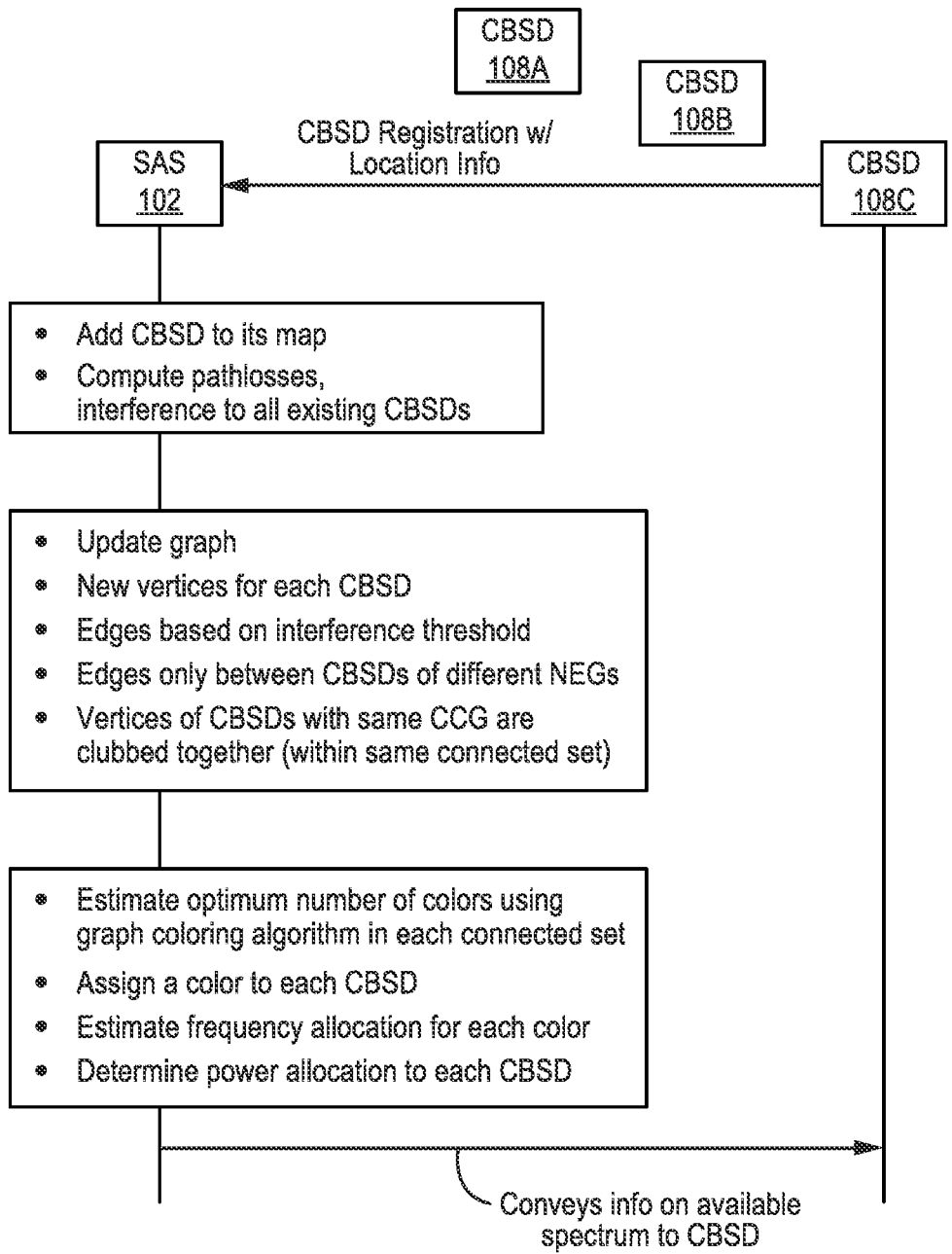
FIG. 4B illustrates a spectrum management flow in a SAS and optionally a CxM.

FIG. 4A is a block diagram illustrating graph coloring and spectrum allocation by a SAS 102 and optionally a CxM 104. FIG. 4B illustrates a spectrum management flow in a SAS 102 and optionally a CxM 104. In other words, FIGS. 4A-4B illustrate the spectrum allocation approach taken by the SAS 102.

As each CBSD 108 registers with the SAS 102, it also provides its location information. Based on locations of all CBSDs 108 in the system 100, the SAS 102 computes pathlosses between CBSDs 108 using agreed-upon formulae. These formulae are based on distance between CBSDs 108 and may also consider indoor/outdoor, antenna height/tilt, direction and beamwidth in both azimuth and elevation, and other such installation details.

Based on determined pathloss(es), the SAS 102 can estimate interference between CBSDs 108 with transmit power assumptions. The SAS 102 may create and update a graph, where each vertex in the graph is a CBSD 108 (or collection of CBSDs 108 with a common channel group (CCG) designation). Edges between vertices/CBSDs 108 are created if the mutual interference between vertices/CBSDs 108 rises above a certain threshold.

No edges are created between CBSDs 108 belonging to the same NEG 222 (same operator), the assumption being that each operator will have rules in place to manage interference amongst their own devices (CBSDs 108). For example, an NEG manager 428 may use spectrum management 430 to divide CBSDs 108 in the same NEG 222 into different groups, e.g., CBSD Group-1 and CBSD Group-2 using frequencies f1 and f2 while non-C-RAN CBSDs 108 may use f3 and f4.

All these simplifications are intended to reduce the burden on the SAS 102. Otherwise complexity explodes quickly. Another simplification that arises naturally is the formation of "Connected Sets". A Connected Set is defined as a set of vertices/CBSDs 108 in which some path can be traced from each vertex to any other vertex through the edges. Each connected set is like a radio frequency (RF) island, where frequency planning can be performed independent of other such connected sets.

Once a graph is created/updated, coloring is performed where each vertex/CBSD 108 is assigned a color 426A-D. The color 426 is later substituted by channel assignment. The objective of the coloring is to minimize the number of colors 426 assigned while at the same time avoiding assigning the same color 426 to neighbors that share the same edge. The optimal graph coloring is nondeterministic polynomial time (NP)-complete, and hence cannot be implemented by SAS 102. A sub-optimal approach is used instead, known as "greedy coloring".

Once colors 426 are created and vertices/CBSDs 108 mapped to colors, the SAS 102 may assign frequencies to each color 426. The goal of the frequency assignment exercise is to (1) perform fair assignment of frequencies amongst the colors 426; and (2) maximize contiguous assignments for each color 426. If there is trouble in achieving these two goals, the SAS 102 may repeat the whole exercise by changing the threshold for creating edges, e.g., using a higher threshold, which creates fewer edges and thus makes the coloring easier. The tradeoff is that there is a higher level of interference in which the CBSDs 108 will operate. It should be noted that a coloring and frequency assignment for each CBSD 108 is only a nominal starting point—each CBSD is allowed to request and operate on any of the frequencies within their allowed set.

CBSD State Machine

Figure 5A:
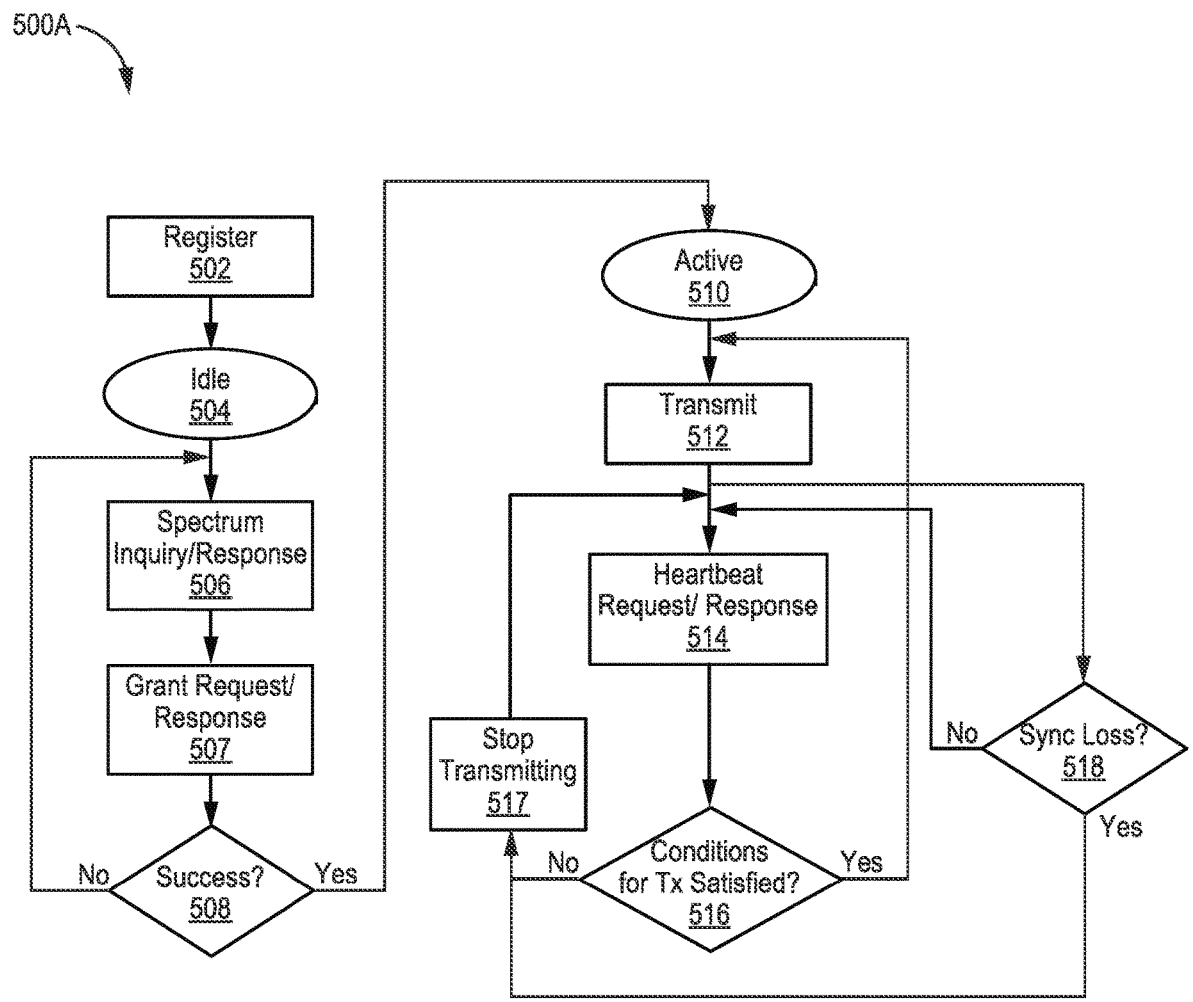
FIG. 5A is a flow diagram illustrating an example method of CBSD operation.

FIG. 5A is a flow diagram illustrating an example method 500A of CBSD 108 operation. The method 500A may be performed by a CBSD 108 in a CBRS system 100.

Each CBSD 108 needs to register with the SAS 102 using a defined procedure (step 502). After registration, the CBSD 108 will still be in IDLE state (step 504). After a spectrum inquiry/response (step 506) and a grant request/response (step 507), the CBSD 108 can determine whether the grant was successful (step 508). If successful and after the first HeartbeatRequest and HeartbeatResponse is exchanged (not shown), the CBSD 108 can enter the ACTIVE state (step 510). The heartbeat request/response is performed to maintain the CBSD's 108 operational grant and will be discussed in greater detail below. If the grant is unsuccessful, the CBSD 108 may again perform a spectrum inquiry/response (step 506) and a new grant request/response (step 507).

In the ACTIVE state, the CBSD 108 may begin transmitting in its assigned frequency resources and within its assigned power limits (step 512). In the ACTIVE state, the CBSD 108 may send HeartbeatRequests to the SAS 102 at specified intervals and continue operation only upon successful reception of HeartbeatResponses with the appropriate response code(s) (step 514). All of these processes are discussed in more detail below. The SAS 102 may terminate the CBSD's 108 grant at any time (which is checked at step 516), using its Heartbeat Response mechanism, and at such termination the CBSD 108 is obligated to shut off its transmitter (step 517). Similarly, if the CBSDs 108 autonomously detects a loss in timing (step 518), it is required to shut off its transmitter within specified time limits. Sync loss may occur when the CBSD 108 loses timing synchronization. Otherwise (e.g., if conditions for Tx are satisfied and synchronization is maintained), the CBSD 108 may continue to transmit 512 until the next heartbeat interval.

Figure 5B:
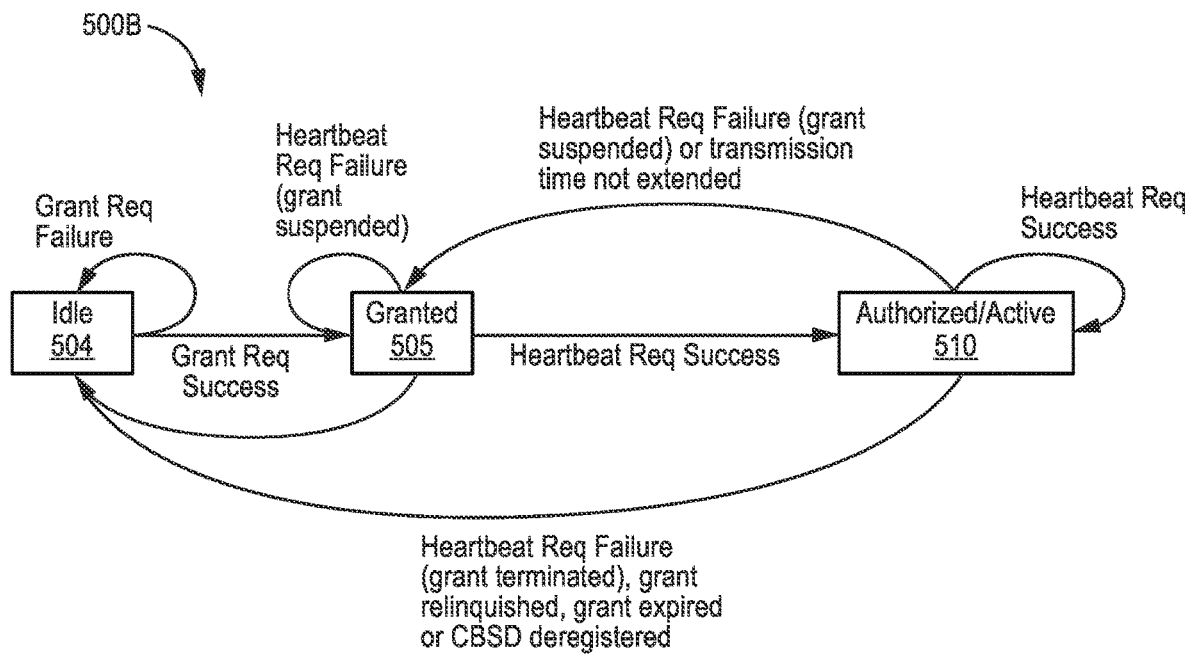
FIG. 5B is a state transition diagram illustrating a CBSD state machine.

FIG. 5B is a state transition diagram 500B illustrating a CBSD 108 state machine. The state transition diagram 500B illustrates conditions under which a CBSD 108 may transition between an IDLE state 504, GRANTED state 505, and an AUTHORIZED/ACTIVE state 510.

The CBSD 108 may begin in IDLE state 504. When the CBSD's 108 grant request is unsuccessful, the CBSD 108 may remain in IDLE state 504. However, when the CBSD's 108 grant request is successful, the CBSD 108 may transition to the GRANTED state 108.

While in the GRANTED state 505, the CBSD 108 may remain in the GRANTED state 505 in response to an unsuccessful Heartbeat Request/Response (e.g., grant suspended). However, if the Heartbeat Request/Response is successful, the CBSD 108 may transition to the AUTHORIZED/ACTIVE state 510.

While in the AUTHORIZED/ACTIVE state 510, the CBSD 108 may remain in the AUTHORIZED/ACTIVE state 510 in response to a successful heartbeat request/response. However, if the heartbeat request/response is unsuccessful (e.g., the grant is suspended or the transmission time is not extended), the CBSD 108 may transition back to the GRANTED state 505. Alternatively, if the heartbeat request/response is unsuccessful (e.g., the grant is terminated, relinquished, or expired (or the CBSD 108 is deregistered), the CBSD 108 may transition back to the IDLE state 504.

C-RAN Using TDD-CBRS Deployment Scenarios

FIGS. 6A-C illustrate three different scenarios for a C-RAN 300 CBRS deployment. Each scenario includes a respective CxM 104A-C, SAS 102A-C, plurality of CBSDs 108A-D, and optionally, a domain proxy 106A-B.

CBRS deployments are likely to be a mixture of CBSDs 108 from different vendors, e.g., Vendor A, Vendor B, Vendor C, etc. Therefore, the CBSDs 108 may be from different vendors within the same scenario/deployment. Furthermore, the optional domain proxies 106 may be from different vendors between different scenarios.

Specifically, FIG. 6A includes a Vendor A domain proxy 106A through which the Vendor A CBSDs 108A-B and the Vendor B CBSD 108C connect to the SAS 102A. However, the Vendor C CBSD 108D may connect to the SAS 102A without the intermediate Vendor A domain proxy 106A.

FIG. 6B includes a Vendor B domain proxy 106B through which the Vendor A CBSDs 108A-B and the Vendor B CBSD 108C connect to the SAS 102B. However, the Vendor C CBSD 108D may connect to the SAS 102B without the intermediate Vendor B domain proxy 106B.

Unlike FIGS. 6A-B, however, FIG. 6C does not include a domain proxy 106. Instead, CBSDs 108 across all vendors may connect to the SAS 102C without an intermediate domain proxy 106.

It should be noted that additional devices and/or modules used in a C-RAN 300 may be present in the scenarios of FIGS. 6A-C, although they are not shown. For example, the CBSDs 108 may connect to the domain proxy 108 or SAS 102 via one or more baseband controllers 304 in a C-RAN 300.

It is also possible that there are multiple SAS 102 within the same geographical area. However, the examples herein assume that a CBSD 108 will be registered to/controlled by only one SAS 102 at a time.

CBSD in the Context of a C-RAN

FIG. 7 is a block diagram illustrating CBSD 108 mapping. Specifically, FIG. 7 illustrates CBSD 108A-L to baseband controller 304A-E mapping. FIG. 7 also illustrates CBSD 108A-L to RP 306A-L mapping where each set of contiguous CBSD(s) 108 in FIG. 7 are in a different RP 306, e.g., CBSD-1 108A is in a first RP 306 while CBSD-4 108D and CBSD-5 108E are in a different RP 306.

From an FCC-compliance and SAS-compliance point of view, each over-the-air transceiver at a unique location (based on a specified location granularity) is a CBSD 108. This enables the FCC/SAS 102 to regulate radio emissions in any geographical area. However, there is some flexibility in this definition, as illustrated in FIG. 7.

A baseband controller 304 may have one or more CBSDs 108 under it, e.g., a single baseband controller 304 in a C-RAN 300 may serve multiple RPs 306, some of which include CBSDs 108. Furthermore, multiple CBSDs 108 may be co-located in a single RP 306, in which case, each CBSD 108 in the RP 306 will be served by a different baseband controller 304. It should be noted that the same baseband controller 304 may alternatively serve an RP 306 having multiple co-located CBSDs 108. As mentioned above, multiple baseband controllers 304 may optionally be co-located, e.g., in a centralized location.

In one configuration, as discussed below, each CBSD 108 may be implemented as a module within an RP 306, e.g., with a corresponding module residing on the baseband controller 304.

FIG. 8 is a block diagram illustrating a CBRS system 800 implemented using CBSDs 108A-D within RPs 306A-B of a C-RAN 300. In addition to showing CBSD 108A-H to baseband controller 304A-D mapping and CBSD 108A-H to RP 306A-B mapping, FIG. 8 also illustrates CBSD 108A-H to NEG 222A-B mapping and CBSD 108A-H to CCG 224A-D mapping.

It should be noted that any number of RPs 306, baseband controllers 304, CBSDs 108 within an RP 306, RF modules 834A-H within an RP 306, NEGs 222A-B, CCGs 224A-D, and/or operators 830 may be used in the system 800.

Each RP 306 may optionally include more than one CBSD 108. The underlying assumption is that each baseband controller 304 will utilize a maximum of one channel module (e.g., about 20 MHz worth of capacity) from an RP 306. Each channel module worth of capacity in each RP 306 may be instantiated as a separate CBSD 108. Therefore, the CBSD 108 may include a module in the RP 306 (also referred to as an "RP module" portion of the CBSD 108), which encompasses an RF channel as well as L1 resources (for the air interface used in the system 800) in the RP 306 and baseband controller 304. The RP module portion of the CBSD 108 may perform CBSD 108 functions associated with the physical resources for transmitting and receiving, e.g., using a respective RF module 834.

In some configurations, in addition to an RP module portion, each CBSD 108 may also include logical entity instantiated in the BC 304 (also referred to as a "BC module" portion of the CBSD 108) that communicates with the SAS 102. The BC module portion of the CBSD 108 may perform functions involving the SAS 102, e.g., at least a portion of the registration process between the CBSD 108 and the SAS, requesting a grant, etc.

In one implementation, each CBSD 108 may be implemented using instructions stored in memory and executed on at least one processor in an RP 306 and/or a BC 304. Therefore, when a CBSD 108 is described herein as performing an action, this may include the RP module portion of the CBSD 108 and/or the BC module portion of the CBSD 108 performing at least one action.

Each RP 306 may include multiple RF modules 834, each of which may be communicatively coupled to at least one antenna (not shown). The RF modules 834 may include transmit and receive circuitry configured to transmit RF signals to and receive RF signals from UEs 110. In one configuration, each CBSD 108 is not hard-mapped to a specific RF module 834 (in the case of a modular RF hardware approach shown in FIG. 8). Rather, the actual RF module 834 that is used for transmitting a particular CBSD's 108 signal can be decided based on availability and other considerations and may also be changed dynamically.

The dotted lines between CBSDs 108 and RF modules 834 in FIG. 8 illustrate example mapping of CBSDs 108 to RF modules 834 at a moment in time. For example, CBSD-1 108A may use RF Module-2 834B to transmit and receive RF signals, CBSD-2 108B may use RF Module-4 834D to transmit and receive RF signals, etc. However this mapping may change based on CBSD 108A-D load in the RP 306A (e.g., packet load and/or number of UEs 110 served by one of the CBSDs 108A-D), system performance metrics of the CBSDs 108A-D (e.g., latency, error rates, etc.), or any other consideration.

Each baseband controller 304 may be responsible for creating and maintaining the CBSDs 108 that are attached to it. Each baseband controller 304 may serve only one CBSD 108 in a given RP 306 (although a single baseband controller 304 may serve more than one CBSD 108 in total). The baseband controller 304 may also be responsible for creating all messages sent to the SAS 102, and interpreting all messages from the SAS 102. Accordingly, although not shown in FIG. 8, the baseband controller 304 is communicatively coupled to the SAS 102, optionally via a domain proxy 106.

In some configurations, a domain proxy 106 may optionally be situated between an operator 830 and at least one baseband controller 304, e.g., the domain proxy 106 may act as an interface between the baseband controller(s) 306 and the operator 830. The optional domain proxy 106 may aggregate messages from all relevant CBSDs 108. Additionally, an operator 830 may optionally configure the C-RAN 300 using the domain proxy 106.

As described above, a No Edge Group (NEG) 222A-B may be a group of CBSDs 108 that belong to a single wireless network operator 830. A single RP 306 may include CBSDs 108 belonging to different NEGs 222. Accordingly, CBSDs 108 from multiple operators 830 may be located within the same RP 306. In other words, multiple operators 830 may be supported in the same RP 306. For example, RP-1 306A may include CBSD-1 108A belonging to BC-1

304A (and Operator-1 830A) as well as CBSD-3 108C belonging to BC-3 304C (and Operator-2 830B).

Additionally, multiple CBSDs 108 belonging to the same operator 830 (and different baseband controllers 304/C-RANs 300) may be located within the same RP 306. For example, RP-1 306A may include CBSD-1 108A belonging to BC-1 304A (and Operator-1 830A) as well as CBSD-2 108B belonging to BC-2 304B (and also Operator-1 830A).

Furthermore, in the context of the system 800 in FIG. 8, a Common Channel Group (CCG) 224A-D may be a group of CBSDs 108 that belong to the same baseband controller 304/C-RAN 300 (assuming the C-RAN 300 has a single baseband controller 304). In examples, only one CBSD 108 in an RP 306 can belong to any one CCG 224 (and therefore baseband controller 304/C-RAN 300), e.g., two CBSDs 108 in a single RP 306 can't both belong to the same CCG 224. However, a single RP 306 may include CBSDs 108 belonging to multiple CCGs 224. For example, RP-1 306A may include CBSD-1 108A belonging to BC-1 304A (and CCG-1 224A) as well as CBSD-2 108B belonging to BC-2 304B (and CCG-2 224B).

Furthermore, each RP 306 may include a baseband module 832A-B that is shared by multiple CBSDs 108 in the RP 306. Alternatively, an RP 306 may include multiple unshared baseband modules 832. The baseband module 832 may convert signals to and from baseband frequency to communicate with the baseband controller(s) 304.

CBSD Serial Number

Each CBSD 108 is required to advertise a serial number during registration, e.g., CBSD 108 registration with the SAS 102. This serial number needs to be unique amongst all other CBSDs 108 that are using hardware with the same FCC-ID (where each RP 306 in a C-RAN 300 may share the same FCC-ID. In other words, the combination of (FCC-ID, CBSD Serial Number) should be globally unique.

In the C-RAN 300 context, this uniqueness requirement means that the serial number of each channel module/CBSD 108 of an RP 306 must be unique across all RPs 306 with the same FCC certification number. For example, the serial number of each CBSD 108 must be unique amongst all other CBSDs 108 in the same CCG 224A, or in other words, amongst all CBSDs 108 in RPs 306 of the same C-RAN 300.

There are simple ways to achieve this uniqueness. In one example, this uniqueness may be achieved using the operator's userID (this is an ID that the operator registers with the SAS 102), the BC's 304 identification or the RP's 306 identification, and a nominal channel index within an RP 306. The CBSD 108 serial number creation will be described in more detail below in association with the plug and play (PnP) method performed for CBSDs 108. In one configuration, the domain proxy 106 may assign CBSD 108 serial numbers.

Channel Management

Multiple CBSDs 108 within the same RP 306 (as well as nearby RPs 306) that are assigned to the same operator 830 may obtain the same color assignment from the SAS 102 and/or CxM 104 since they all belong to the same NEG 222. Accordingly, it may be desirable to have a mechanism to (1) identify the channels used by other CBSDs 108 that are either co-located with a particular CBSD 108 or in the same vicinity; and (2) decide on the appropriate usable channel for making the Grant Request for the CBSD 108.

CBSD Registration Procedures

The procedure by which a CBSD 108 registers with the SAS 102 may be performed via HTTPS (HyperText Transfer Protocol over Transport Layer Security (TLS). One or more SAS 102 uniform resource locators (URLs) may be provisioned to the CBSDs 108 and/or the domain proxy 106. TLS mutual authentication may be performed between the SAS 102 and each CBSD 108 or domain proxy 106. If the domain proxy 106 is utilized, then it sends multiple registration requests (one for each CBSD 108).

The SAS requires the registering CBSD 108 to provide several information elements as part of the registration request. The domain proxy 106, baseband controller 304, and/or the RP 306 (housing the registering CBSD 108) may provide information to the baseband controller 304 (e.g., a CBSD module in the baseband controller 304) in order to facilitate creation of the RegistrationRequest message.

Once a RegistrationRequest message is sent, the SAS 102 may provide a RegistrationResponse message that, if the registration was successful, includes a CBSD-ID. The RegistrationRequest message may be sent to the SAS 102 by the domain proxy 106, the BC 304 and/or an RP 306 housing the CBSD 108. The CBSD-ID is a primary identifier used by the CBSD 108 for all future messages to the SAS 102.

Spectrum Inquiry

Once a CBSD 108 is registered with the SAS 102, a baseband controller 304 (on behalf of the CBSD 108) can then send a SpectrumInquiry message at any time to inquire about available frequencies. The SpectrumInquiry message may specify a desired one or more channels (each of which may be a contiguous chunk), each specified by a starting frequency and a bandwidth. A SpectrumInquiry message may also include a measurement report (from remote environmental monitoring (REM) performed at the RP(s) 306/CBSD(s) 108). The SAS 102 may evaluate the request (sent on behalf of the CBSD 108) and reply with a SpectrumInquiryResponse that includes a set of available frequencies along with a possible power allocation for each. The SpectrumInquiryResponse may then be used (e.g., by the CBSD 108 and/or baseband controller 304) as a basis for making a Grant Request, e.g., along with REM results. It is understood (though not rigidly specified) by the SAS 102, that if the CBSD 108 makes a grant request for a channel that was indicated by the SAS 102 as available in a prior SpectrumInquiryResponse, then the SAS 102 will grant the channel to the CBSD 108.

Grant Mechanism and Heartbeat Maintenance

FIGS. 9A-9B are flow diagrams illustrating methods 900A-B for establishing and maintaining a CBSD 108 grant at a SAS 102. Specifically, the method 900B in FIG. 9B may be performed on its own or sequentially to the method 900A in FIG. 9A. The methods 900A-B may be performed by entities in a CBRS system 100 implemented with a C-RAN 300, e.g., SAS 102, CBSD 108 (e.g., implemented in an RP 306), baseband controller 304, and/or domain proxy 106.

Following the exchange of a SpectrumInquiry message (step 902) and a SpectrumInquiryResponse message (step 904), each CBSD 108 can request one or more grants from the SAS 102. This may include the baseband controller 304 and/or domain proxy 106 determining likely-available frequency or frequencies for a grant request (step 906) and sending the grant request to the SAS 102 (step 908).

The SAS 102 may respond to each grant request (step 910) with a grant response that includes a response code (step 912). When a grant request for a CBSD 108 is unsuccessful (e.g., the response code indicates interference), the baseband controller 304 and/or domain proxy 106 may send the SAS 102 a new grant request for the CBSD 108 (step 914). The new grant request may include operational parameters (OperationalParam) from the grant response (if present in the grant response) or the next best frequency range (determined in step 906). When a grant request is successful (e.g., the response code indicates success), the SAS 102 may include a Grant-ID, operational parameters, and an expiry time for the grant in the grant response.

Each operational grant may be maintained by a corresponding HeartbeatRequest/HeartbeatResponse sequence between the SAS 102 and each CBSD 108 (e.g., between the CBSD's 108 baseband controller 304 and/or domain proxy 106). The first HeartbeatRequest from (or on behalf of) the CBSD 108 (step 916) immediately follows a successful GrantResponse from the SAS 102 because the CBSD 108 can start transmitting only after the first successful exchange of a HeartbeatRequest and HeartbeatResponse. Upon receiving a HeartbeatResponse (e.g., at the baseband controller 304), the CBSD 108 may determine whether any conditions for grant relinquishment are satisfied (step 918). Possible conditions include: (1) the grant being suspended (e.g., as indicated in the HeartbeatResponse) at which point the CBSD 108 (or baseband controller 304) may choose to keep the grant alive or relinquish it; (2) the CBSD 108 has lost synchronization with the SAS 102 (e.g., based on a response code UNSYNC_OP_PARAM in the HeartbeatResponse); and/or (3) new operational parameter(s) is/are indicated in the HeartbeatResponse. If at least one of the conditions for grant relinquishment is satisfied, the at least one CBSD 108 may relinquish its respective grant (step 920). If, however, none of the conditions are satisfied for a CBSD 108, the CBSD 108 may continue transmitting on the grant (step 922).

During operation, the CBSD 108, baseband controller 304, and/or domain proxy 106 may determine whether the grant expiry time is close to ending (step 924). The grant expiry time (in the grant response from the SAS 102) may be altered by the SAS 102 during the HeartbeatRequest and HeartbeatResponse process, but the operational parameters cannot be changed. If the SAS 102 needs to change the operational parameters of the CBSD 108, such as frequency and power, the SAS 102 may provide feedback during the HeartbeatResponse, e.g., by suspending the grant or by providing a recommendation regarding new operational parameters, or both. At that point, the CBSD 108, baseband controller 304, and/or domain proxy 106 may request a new grant with the new operational parameters before it can transmit on them.

If the grant expiry time is close to ending, the CBSD 108, the baseband controller 304, and/or domain proxy 106 may include a GrantRenew field in the subsequent HeartbeatRequest messages to the SAS 102 in order to request that the grant be renewed (step 926). In some examples, the SAS 102 may suspend the grant of a CBSD 108 if it does not receive a HeartbeatRequest a GrantRenew field from the CBSD 108 for a threshold period of time. Each CBSD 108 and/or baseband controller 304 may (on behalf of each CBSD 108) periodically transmit HeartbeatRequest messages to and receive HeartbeatResponse messages from the SAS 102 (step 928). The interval (e.g., HeartbeatInterval) for repeating the heartbeat process may be included in the initial GrantResponse from the SAS 102 and may be updated in each HeartbeatResponse.

FIGS. 10A-10B are flow diagrams illustrating methods 1000A-B for a HeartbeatRequest and subsequent HeartbeatResponse (e.g., successful or otherwise). Specifically, the method 1000B in FIG. 10B may be performed on its own or sequentially to the method 1000A in FIG. 10A. The methods 1000A-B may be performed by entities in a CBRS system 100 implemented with a C-RAN 300, e.g., SAS 102, CBSD 108 (e.g., implemented in an RP 306), baseband controller 304, and/or domain proxy 106.

In step 1002, a baseband controller 304 and/or domain proxy 106 ("BC/DP") may send a grant request (GrantRequest) for CBSD-1 108, and receive a GrantResponse with Grant-ID k. The BC/DP may then send a HeartbeatRequest for CBSD-1 108 to the SAS 102 (step 1004). As noted above, the first HeartbeatRequest should be sent shortly after receiving the GrantResponse because a CBSD 108 can start transmitting only after the first successful exchange of a HeartbeatRequest and HeartbeatResponse. The BC/DP may receive a HeartbeatResponse from the SAS 102 (step 1006) and determine whether a response code in the HeartbeatResponse indicates success (step 1008).

If the response code does not indicate success, BC/DP may then send another HeartbeatRequest for CBSD-1 108 to the SAS 102 (step 1004). If the response code indicates success, the CBSD-1 108 may begin transmitting using the grant associated with Grant-ID k (step 1010).

Once the CBSD-1 108 has begun transmitting using the grant, the BC/DP may determine (e.g., periodically) whether the HeartbeatInterval is expired or close to expiry (step 1012), e.g., using a configured backoff value. The HeartbeatInterval may be included in the initial GrantResponse from the SAS 102 and may be updated in each HeartbeatResponse. If the HeartbeatInterval is not close to expiry (e.g., not within a threshold time), the BC/DP may wait to configure and transmit another HeartbeatRequest to the SAS 102.

However, if the HeartbeatInterval is close to expiry (e.g., within a threshold time), the BC/DP may configure (and send to the SAS 102) another HeartbeatRequest for CBSD-1 108 and Grant-ID k. At that point, the BC/DP may determine whether the grant expiry time is close to ending (step 1016). If the grant expiry time is close to ending, the BC/DP may include a GrantRenew field in the HeartbeatRequest message, before sending to the SAS 102, in order to request that the grant be renewed (step 1018).

The BC/DP may determine whether the CBSD-1 108 advertised a RECEIVED_POWER_WITH_GRANT capability (step 1020), which indicates that the CBSD-1 108 is able to measure and report the received power at the CBSD-1 108 while it has a spectrum grant from the SAS 102. In one example, the CBSD 108 may advertise a RECEIVED_POWER_WITH_GRANT capability, if at all, during the registration process with the SAS 102 (e.g., via the BC/DP). If the CBSD-1 108 advertised a RECEIVED_POWER_WITH_GRANT capability, the CBSD-1 108 may perform remote environment monitoring (REM) and compose a measurement report (step 1022), which is described in more detail below.

In step 1024, the BC/DP may receive an interpret a HeartbeatResponse from the SAS 102, including configuring or re-configuring any timers specified in the HeartbeatResponse, e.g., HeartbeatInterval, grant expiry time, etc. If the response code in the HeartbeatResponse indicates success (step 1026), the CBSD-1 108 may again transmit using the grant associated with Grant-ID k (step 1010).

If the response code in the HeartbeatResponse does not indicate a successful Heartbeat exchange, the BC/DP and/or CBSD-1 108 may determine the response code (step 1028). If the response code in the HeartbeatResponse indicates TERMINATE GRANT (e.g., grant is terminated), (1) the CBSD-1 108 (e.g., at the instruction of the BC/DP) may stop transmitting on channels associated with Grant-ID k within a period of time (e.g., 60 seconds) after transmitExpireTime in the HeartbeatResponse; and (2) no more HeartbeatRequests are transmitted to the SAS on behalf of the CBSD-1 108 for Grant-ID k (step 1030). Furthermore, the context for Grant-ID k may be terminated (step 1030). Additionally, if operational parameters (OperationalParam) are included in the HeartbeatResponse, the CBSD-1 108 may request a new grant with those parameters (step 1032). For example, the BC/DP may send a new GrantRequest to the SAS 102 on behalf of the CBSD-1 108.

If the response code in the HeartbeatResponse indicates SUSPEND GRANT (e.g., grant is suspended), the CBSD-1 108 (e.g., at the instruction of the BC/DP) may stop transmitting on channels associated with Grant-ID k within a period of time (e.g., 60 seconds) after transmitExpireTime in the HeartbeatResponse (step 1034). The HeartbeatRequests may continue to be sent to the SAS 102 for Grant-ID k or the CBSD-1 108 may relinquish the grant, after which HeartbeatRequests would no longer be sent to the SAS 102 for Grant-ID k (step 1034). Furthermore, the context for Grant-ID k may be terminated (step 1030). Additionally, if operational parameters (OperationalParam) are included in the HeartbeatResponse, the CBSD-1 108 may request a new grant with those parameters after relinquishing the suspended grant (step 1036). For example, the BC/DP may send a new GrantRequest to the SAS 102 on behalf of the CBSD-1 108.

If the HeartbeatResponse indicates (e.g., not in the response code) new OperationalParams, the CBSD-1 108 may continue to transmit using the grant associated with Grant-ID k (step 1038). At the same time, however, the BC/DP may send, on behalf of the CBSD-1 108, a new GrantRequest to the SAS 102 with the new OperationalParams.

If the response code in the HeartbeatResponse indicates UNSYNC_OP_PARAM (e.g., the CBSD-1 108 has lost synchronization with the SAS 102), the CBSD-1 108 may stop transmitting on channels associated with Grant-ID k within a period of time (e.g., 60 seconds) of receiving (at the CBSD-1 108 or the BC/DP) the HeartbeatResponse (step 1040). The CBSD-1 108 may also relinquish the grant, after which HeartbeatRequests would no longer be sent to the SAS 102 for Grant-ID k (step 1040).

Network Listening Mode (NLM)/Remote Environment Monitoring (REM) for CBRS

CBRS provides a mechanism for measurement reports to be sent from a CBSD 108 to the SAS 102 and/or CxM 104. CBSDs 108 may advertise their measurement capabilities as part of the registration process with the SAS 102. The following measurement capabilities are currently defined in the WinnForum specification: MEASUREMENT_BEFORE_GRANT (CBSD 108 measures received power before it has a grant) and MEASUREMENT_AFTER_GRANT (CBSD 108 measures received power after/while it has a grant). In one configuration, MEASUREMENT_BEFORE_GRANT and MEASUREMENT_AFTER_GRANT may be mapped to RECEIVED_POWER_WITHOUT_GRANT and RECEIVED_POWER_WITH_GRANT, respectively.

In each case, the CBSD 108 may send a report with an RSSI measurement over one or more contiguous channels. The CBSD 108 may choose the channels, bandwidths of each, etc. Note that these measurements (1) are required by the SAS; (2) are for FCC compliance; and (3) are not specific to LTE technology. Furthermore, the RSSI measurements may or may not be made during a TDD downlink subframe. However, the CBRS Coexistence Manger (CxM) 104, which is tasked with LTE-specific optimization functions, may expect such LTE-specific measurements. Hence, some sort of system information block (SIB)-decoding may optionally be required as part of NLM (also referred to as REM).

FIG. 11A is a flow diagram illustrating an example method 1100A for remote environment monitoring (REM) in a CBRS system 100 implemented using a C-RAN 300. The method 1100A may be performed by a SAS 102, at least one CBSD 108 (e.g., implemented in at least one RP 306), a baseband controller 304, and/or a domain proxy 106. Many of the steps in the method 1100A may be performed on a per-RP basis and/or a per-CBSD basis. Accordingly, where the description (or FIG. 11A itself) refers to an action being performed on, by, or for a CBSD 108 or CBSDs 108, it may alternatively or additionally be performed for an RP 306 or RPs 306, and vice versa.

The method 1100A may begin in optional step 1101 where an RP 306, among a plurality of RPs 306, connects to a baseband controller 304, e.g., following initial installation, maintenance, repair, reset, or upgrade.

The method 1100A may proceed to step 1103 where at least one CBSD 108 that is in the RP 306 is registered with the SAS 102. Specifically, the domain proxy 106 or baseband controller 304 may register the CBSD 108 with the SAS 102 on behalf of the RP 306. During registration, the domain proxy 106 or baseband controller 304 may communicate with the SAS 102 and optionally indicate the physical location of the RP 306 to the SAS 102. The physical location may be manually entered at the domain proxy 106 or the baseband controller 304. As mentioned before, one or more of the CBSDs 108 may be implemented as a module inside of an RP 306, e.g., a set of instructions stored in memory and executed by a processor. In some configurations, each CBSD 108 may include an RP module portion residing on the RP 306 and a BC module portion residing on the BC 304.

The method 1100A may proceed to step 1105 where the domain proxy 106 or baseband controller 304 determines Level 1 REM measurements for each of the at least one CBSD 108 in the RP 306. For example, if a CBSD 108 (e.g., RP module portion of the CBSD 108) is the first in an RP 306 to be activated, or if an REM timer has elapsed for the RP 306, the domain proxy 106 or baseband controller 304 may instruct the CBSD 108 (e.g., RP module portion of the CBSD 108) to undergo Level-1 REM and report the Level-1 REM measurements to the domain proxy 106 or baseband controller 304. These Level-1 REM measurements may optionally be used for subsequently-activated CBSD 108 (e.g., RP module portion of the CBSD 108) in the same RP 306, assuming they are not stale. Therefore, if a CBSD 108 (e.g., RP module portion of the CBSD 108) is not the first to be activated, the domain proxy 106 or baseband controller 304 may use stored Level-1 REM measurements for the other CBSD 108 (e.g., RP module portion of the CBSD 108) in the RP 306. In other words, the Level-1 REM results for a single CBSD 108 (e.g., the RP module portion of a CBSD 108) may be used as representative Level-1 REM results for all CBSDs 108 (e.g., the RP module portions of CBSDs 108) in the same RP 306, e.g., to reduce duplication of Level-1 REM function calls. Level-1 REM (also referred to as "express REM") will be discussed below.

The method 1100A may proceed to step 1107 where the domain proxy 106 or baseband controller 304 may send a spectrum inquiry, for each of the at least one CBSD 108 (in the RP 306), to the SAS 102 based on the Level-1 REM measurements. The spectrum inquiry may be sent to inquire about available frequencies at the SAS 102 and may indicate one or more desired channels, e.g., contiguous chunk(s) of 10 MHz bandwidth.

The method 1100A may proceed to step 1109 where the domain proxy 106 or baseband controller 304 may determine whether to perform a Level-2/3 REM based on a spectrum inquiry response, for each of the at least one CBSD 108, from the SAS 102. For example, the spectrum inquiry response may include a set of available frequencies along with a possible power allocation for each. Level-2/3 REM (also referred to as "full REM") will be discussed below. As used herein, the term "Level-2/3 REM" refers to Level-2 REM and/or Level-3 REM.

The method 1100A may proceed to optional step 1111 where the baseband controller 304 (or domain proxy 106) coordinates the Level-2/3 REM across the at least one CBSD 108. For example, the baseband controller 304 may coordinate the Level-2/3 REM based on instructions from the domain proxy 106 indicating the subchannel(s)/chunk(s) of bandwidth to measure. In one configuration, similar to Level-1 REM, the Level-2/3 REM may be performed for an individual CBSD 108 (e.g., RP module portion of the CBSD 108), and the Level-2/3 REM results stored in memory can be optionally used as representative Level-2/3 results for other CBSDs 108 (e.g., RP modules portion of the CBSD 108) in the same RP 306, e.g., as long as the results are not stale.

The method 1100A may proceed to optional step 1113 where the baseband controller 304 (or domain proxy 106) sends a grant request for the at least one CBSD 108 (in the RP 306) to the SAS 102, e.g., based on the Level-2/3 REM. The grant request may indicate a best channel that is based on the spectrum inquiry response and/or the Level-2/3 REM. For example, the baseband controller 304 (or domain proxy 106) may select the best channel from a list of channels indicated as available in the spectrum inquiry response from the SAS 102. Specifically, the baseband controller 304 (or domain proxy 106) may remove the channels in the list that are currently (1) being used by other RF modules 834/CBSDs 108 in the same RP 306 as the CBSD(s) 108 in question; or (2) determined as being in-use by neighboring RP(s) 306, e.g., based on a REM process. After this removal, the remaining channel in the list with the best metric(s) may be chosen, e.g., the highest average maxEirp.

The method 1100A may proceed to optional step 1115 where the baseband controller 304 (or domain proxy 106) configures parameters of the at least one CBSD 108 based on a grant response from the SAS 102. Generally, the SAS 102 will grant the requested frequency/channel in the grant request when the channel was indicated by the SAS 102 as available in the prior spectrum inquiry response.

FIG. 11B is a flow diagram illustrating another method 1100B for remote environment monitoring (REM) in a CBRS system 100 implemented using a C-RAN 300. The method 1100A may be performed by a SAS 102, at least one CBSD 108 (e.g., implemented in at least one RP 306), a baseband controller 304, and/or a domain proxy 106. Many of the steps in the method 1100B may be performed on a per-RP basis and/or a per-CBSD basis. Accordingly, where the description (or FIG. 11A itself) refers to an action being performed on, by, or for a CBSD 108 or CBSDs 108, it may alternatively or additionally be performed for an RP 306 or RPs 306, and vice versa.

The method 1100B may begin at step 1102 when a baseband controller (BC) 304 is activated. The baseband controller 304 may be activated following initial installation or following maintenance, repair, reset, or upgrade.

The method 1100B may proceed to step 1104 where a radio point (RP1) 306 connects to the BC 304 based on a whitelist. In one example, the whitelist may include all the RPs 306 being served by/belonging to the BC 304. RP1 306 may be one of a plurality of RPs 306.

The method 1100B may proceed to step 1106 where a domain proxy 106 and/or the BC 304 registers at least one CBSD 108 in RP1 306, on behalf of RP1 306, with the SAS 102. In one example, the domain proxy 106 and/or the BC 304 may only perform the registration if the BC 304 is using RP1 306 for operator X. In one configuration, the credentials for requesting registration at the SAS 102 are tied to a particular operator, e.g., a BC 304 may group together RPs 106 for registration if they all are for the same operator.

During registration, the domain proxy 106 and/or the BC 304 may optionally indicate the physical location of RP1 306 to the SAS 102. The physical location may be manually entered at the domain proxy 106 and/or the BC 304. As mentioned before, one or more of the CBSD(s) 108 may be module(s) implemented inside of an RP 306, e.g., a set of instructions stored in memory and executed by a processor.

The method 1100B may proceed to step 1108 where the domain proxy 106 and/or the BC 304 determines whether a CBSD 108 (e.g., an RP module portion of a CBSD 108) is the first to be activated in RP1 306 or if an REM timer for RP1 306 has elapsed.

The method 1100B may proceed to step 1110 where, if the CBSD 108 (e.g., the RP module portion of a CBSD 108) is not the first to be activated in RP1 306 or if an REM timer for RP1 306 has not elapsed, the domain proxy 106 and/or the BC 304 may identify stored Level-1 REM results from RP1 306.

The method 1100B may proceed to step 1112 where, if the CBSD 108 (e.g., the RP module portion of a CBSD 108) is the first to be activated in RP1 306 and if the REM timer for RP1 306 has elapsed, the BC 304 may instruct the RP module portion of the available CBSD 108 to perform Level-1 REM, e.g., using an RF module 834 not associated with any CBSD 108. A CBSD 108 may be considered unavailable if it is not yet paired with an RF module 834.

The method 1100B may proceed to step 1114 where the CBSD 108 (e.g., the RP module portion of a CBSD 108) undergoes Level-1 REM and reports the results (e.g., to the BC 306). As described below, during Level-1 REM, an RP 306 may measure received signal strength indication (RSSI) over the full CBRS (3.5 GHz) band (also referred to as B48 or band 48), e.g., in 10 MHz intervals. In some configurations, Level-1 REM may be performed for a single CBSD 108 (e.g., the RP module portion of a CBSD 108) in an RP 306 and the results stored. The stored Level-1 REM results for the single CBSD 108 (e.g., the RP module portion of a CBSD 108) can then be retrieved and used by any BC 304 connecting to that RP 306. In other words, the Level-1 REM results for a single CBSD 108 (e.g., the RP module portion of a CBSD 108) may be used as representative Level-1 REM results for all CBSDs 108 (e.g., the RP module portions of CBSDs 108) in the same RP 306, e.g., to reduce duplication of Level-1 REM function calls.

The method 1100B may proceed to step 1116 where the domain proxy 106 and/or the BC 304 determines REM results for each RP 306. In some configurations, the domain proxy 106 and/or the BC 304 may collect/determine REM results from at least one CBSD 108 in each of the plurality of RPs 306, e.g., the plurality of RPs 306 may belong to the same NEG 222 or CCG 224. In some configurations, step 1116 may include using stored REM results for a single CBSD 108 (e.g., the RP module portion of a CBSD 108) as representative REM results for all CBSDs 108 (e.g., the RP module portions of CBSDs 108) in the same RP 306.

The method 1100B may proceed to step 1118 where the domain proxy 106 and/or the BC 304 may send a spectrum inquiry for each RP 306. The spectrum inquiry may be sent to the SAS 102 inquire about available frequencies at the SAS 102 and may indicate one or more desired channels for each CBSD 108, each desired channel being a contiguous chunk. In some cases, the domain proxy 106 and/or the BC 304 may send a spectrum inquiry for at least one CBSD 108 in each of the plurality of RPs 306.

The method 1100B may proceed to step 1120 where, based on a spectrum inquiry response received from the SAS 102, the domain proxy 106 and/or the BC 304 may determine whether to perform Level-2/3 REM. The domain proxy 106 and/or the BC 304 may also determine how to perform Level-2/3 REM based on a spectrum inquiry response, e.g., for which 10 MHz channel subset.

The method 1100B may proceed to step 1122 where the BC 304 coordinates Level-2/3 REM for each RP 306 (e.g., at least one CBSD 108 in each of the plurality of RPs 306). In other words, the BC 304 may instruct at least some of the CBSDs 108 in RP1 306, as determined by the domain proxy 106, to estimate RSSI over the 10 MHz subchannel(s)/chunk(s) of bandwidth (also determined by the domain proxy 106). In some configurations, similar to Level-1 described above, Level-2/3 REM results for a single CBSD 108 (e.g., the RP module portion of a CBSD 108) may be used as representative Level-2/3 REM results for all CBSDs 108 (e.g., the RP module portions of CBSDs 108) in the same RP 306, e.g., to reduce duplication of Level-2/3 REM function calls.

The method 1100B may proceed to optional step 1124 where, when a CBSD (e.g., an RP module portion of a CBSD 108) is undergoing Level-2/3 REM (e.g., using an unassigned RF module 834), the other RP modules (and associated RF modules 834) in the same RP 306 may be shut-off (e.g., put in sleep or standby mode) in order to avoid leakage. Specifically, the remaining RF channels in the RP 306 may be muted in order to prevent excessive transmit-to-receive leakage that would skew the measurements taken during the Level-2/3 REM.

The method 1100B may proceed to step 1126 where the BC 304 determines the best channel for a grant request. The grant request may indicate a best channel that is based on the spectrum inquiry response and/or the Level-2/3 REM. For example, the baseband controller 304 (or domain proxy 106) may select the best channel from a list of channels indicated as available in the spectrum inquiry response from the SAS 102. Specifically, the baseband controller 304 (or domain proxy 106) may remove the channels in the list that are currently (1) being used by other RF modules 834/CBSDs 108 in the same RP 306 as the CBSD(s) 108 in question; or (2) determined as being in-use by neighboring RP(s) 306, e.g., based on a REM process. After this removal, the remaining channel in the list with the best metric(s) may be chosen, e.g., the highest average maxEirp.

The method 1100B may proceed to step 1128 where the BC 304 initiates a grant request. This may include sending a grant request to the SAS 102 that indicates the best channel that was determined by the BC 304.

The method 1100B may proceed to step 1130 where the BC 304, upon receiving a successful grant response from the SAS 102, configures the parameters of RP1 306 (or CBSD(s) 108 in RP1 306). Examples of parameters that may be configured for an RP 306 (or CBSD 108 in an RP 306) include, without limitation, the frequency of operation, operational bandwidth, transmit power, TDD configuration, etc.

The method 1100B may proceed to step 1132 where the BC 304 (on behalf of RP1 306) exchanges a first HeartbeatRequest and HeartbeatResponse with the SAS 102. In some examples, a CBSD 108 can start transmitting only after the first successful exchange of a HeartbeatRequest and HeartbeatResponse between the BC 304 and the SAS 102.

The method 1100B may proceed to step 1134 where all RF modules 834 (e.g., associated with CBSDs 108 with a grant) under the BC 304 can begin transmitting.

The method 1100B may proceed to optional step 1136 where Level-1 REM and Level-2/3 REM may be performed on-demand for SAS 102 requirement and CxM 104 requirements, respectively.

Level-1 REM

All RPs 306 may be capable of performing Level-1 REM, which is defined as the measurement of received signal strength indication (RSSI) over the full CBRS (3.5 GHz) band (or frequency range specified by the BC 304) in 10 MHz intervals. During Level-1 REM, the RP 306 may: (1) collect I-Q data over the full CBRS bandwidth for a period of Level 1 CollectionDuration msec, which period is referred to as a Sniffing Phase; (2) process the collected I-Q data to obtain the necessary measurement information, which is referred to as the Analysis Phase; (3) segregate into bandwidth segments (as described below), e.g., using Inverse Fast Fourier Transform (IFFT); and (4) estimate RSSI in each bandwidth segment.

The RP 306 may perform RSSI estimation in increments of 10 MHz within the frequency range, with each 10 MHz bandwidth segment. However, remnant segments at the edge(s) of the frequency range may be less than 10 MHz.

It should be noted that the RSSI measurement can be performed without strict timing and LTE system knowledge. For example, knowledge of subframe boundaries, frame boundaries, and/or TDD configurations, are not required for this RSSI measurement.

Level-2 REM

All RPs 306 may be capable of performing Level-2 REM, during which an RP 306: (1) collects I-Q data over the full CBRS bandwidth (or frequency range specified by the BC 304) for a configurable period of Level2_CollectionDuration msec., which period is referred to as a Sniffing Phase; (2) performs IFFT and post-processing in order to detect any LTE signal, and then determine/estimate/measure signal attributes (e.g., Physical Cell Identifier (PCI), Reference Signal Received Power (RSRP), and/or Reference Signal Received Quality (RSRQ)) for each detected signal, which is referred to as the Analysis Phase; and (3) estimates RSSI in 10 MHz bandwidth chunks within the specified frequency range.

Level-3 REM

All RPs 306 may be capable of performing Level-3 REM, during which an RP 306: (1) collects I-Q data over the full CBRS bandwidth (or frequency range specified by the BC 304) for a period of Level2(3,4)_CollectionDuration msec., over the frequency range specified by the BC 304, which period is referred to as a Sniffing Phase; (2) performs IFFT and post-processing in order to detect any LTE signal, and then determine/estimate/measure signal attributes (e.g., Physical Cell Identifier (PCI), Reference Signal Received Power (RSRP), and/or Reference Signal Received Quality (RSRQ)) as well as decode the SIB-1 parameters for each detected signal, which is referred to as the Analysis Phase; and (3) estimates RSSI in 10 MHz bandwidth chunks within the specified frequency range.

Therefore, the duration of data collection may be different for the different levels of REM. For example, Level-1 REM may measuring RSSI include over the full CBRS (3.5 GHz) band (or frequency range specified by the BC 304) in 10 MHz intervals; Level-2 may measure RSSI as well as determine PCI, measure RSRP and/or measure RSRQ; Level-3 may measure RSSI, determine PCI, measure RSRP and/or measure RSRQ as well as decode the SIB-1 parameters for each detected signal. Additionally, the amount and/or complexity of processing performed on the I-Q data may be progressively higher in each increasing level of REM performed.

REM Results Storage

Upon completing Level-1, Level-2, and/or Level-3 REM, an RP 306 may store the results of the recently-performed REM, also referred to as REM measurement report, measurement report, or REM results. Each stored set of REM results may include an associated timestamp indicating the time the REM was performed or the time the REM results stored.

REM Trigger and Staleness

In response to a baseband controller 304 requesting that an RP 306 perform REM (Level-1, Level-2, or Level-3), the RP 306 may determine whether previously-stored REM results for the requested REM Level are stale. Previously-stored REM results may be considered stale when at least a threshold time has passed since they were stored. If the REM results at the requested REM level are not stale (e.g., based on the REM results timestamp+a configured staleness timer REM-Timer-Leveln), then those results are sent to the baseband controller 304. Otherwise, the RP 306 may perform a new REM process at the requested level.

Transmission Shut-Off for REM

While performing REM (Level-1, Level-2, or Level-3), the RP 306 may cease all its transmissions, including those in RF modules 834 other than the one being used for the listening function.

REM Level

When the CBRS feature is enabled, the baseband controller 304 will initiate, on its authenticated RPs 306, the highest level of REM that those RPs 306 are capable of and store the REM results reported by the RP 306. The baseband controller 304 may use the REM results in the Spectrum Inquiry message for the RP 306/CBSD 108.

Spectrum Inquiry

Following a successful registration of a CBSD 108, a baseband controller 304 may send a spectrum inquiry message to the SAS 102 on behalf of the CBSD 108. The spectrum inquiry message may include the entire CBRS band as its inquiredSpectrum field, and the measurement results from the last REM operation in its measReport.

Frequency Determination for Grant Request

The baseband controller 304 will determine the channel for making a grant request (also referred to as the "best channel") as follows. First, starting from availableChannels-SortedList (e.g., a sorted list based on the channels indicated as available in the spectrum inquiry response from the SAS 102), the channels from the lists InUseChannels-Self and InUseChannels-REM are removed. The InUseChannels-Self list may include channels being used by other RF modules 834/CBSDs 108 in the same RP 306 as the CBSD(s) 108 in question. The InUseChannels-REM list may include channels determined as being in-use by neighboring RP(s) 306, e.g., based on a REM process. Therefore, the baseband controller 304 may remove channels otherwise being used (e.g., by other RF modules 834/CBSDs 108 in the same RP 306 or by other RP(s) 306).

Next, of the remaining channels, the one with the best (e.g., highest) average maxEirp is selected as the channel for the grant request. The maxEirp parameter may represent an amount of power an RP 306 can transmit with on the channel, so a higher maxEirp may indicate that an RP 306 is allowed to transmit with more power (and wider coverage area).

LTE Provisioning

Based on the Level-2 and/or Level-3 REM results obtained from each constituent RP 306, the baseband controller 304 may determine its operational PCI and RSI values.

REM During Operation

The baseband controller 304 may initiate REM on a CBSD 108 and send the measurement report in its subsequent heartbeat request if the measReportConfig parameter is included in its heartbeat response message.

Maintaining REM Results in RP

Whenever an RP 306 performs a REM measurement from in one of its RP-instances, it shall update the REM results object in all the RP-Instances.

REM Timestamp

The Device.FAP.X_0005B9_RU.{i}.Device.REM.REMRESULT object shall support a new attribute for RemResultTime. This attribute may be updated with the time at which the result is generated, and it shall be present in all RP-Instances.

Service Provider Use Case

FIG. 12A is a block diagram illustrating an example communication system 1200A implementing a service provider use case of CBRS. Specifically, a communication system 1200A may include a CBRS network 1205A and a plurality of subscribers (e.g., UEs) 1210A-B that each wirelessly connect to service providers (e.g., the entity providing wireless service to the subscriber 1210): a mobile service operator (MSO) 1201 and/or a mobile network operator (MNO) 1203A-B. An MSO 1201 may be a multi-system operator, e.g., a cable operator that also provides wireless services. An MNO 1203 may be a mobile network operator.

In the service provider use case, the service provider deploys the CBRS network 1205A itself. For example, in FIG. 12A the service provider (e.g., MNO1 1203A) plays the role of a CBRS Network 1205A Operator as well as a service provider. Therefore, subscriber(s) 1210A of the service provider (e.g., MNO1 1203A) may benefit from improved user experience and/or an extended coverage through CBRS network 1205A.

In contrast, certain mobile service operator(s) (MSO) 1201 and mobile network operator (MNO) 1203B may not have a relationship with the service provider (e.g., MNO1 1203A) deploying the CBRS network 1205. Accordingly, the subscribers of these MSO(s) 1201 and MNO(s) 1203B without relationships may not have access to the CBRS network 1205A deployed by the service provider (e.g., MNO1 1203A).

Neutral Host Use Case

FIG. 12B is a block diagram illustrating an example communication system 1200B implementing a neutral host use case of CBRS. Specifically, a communication system 1200B may include a CBRS network 1205B that is deployed by a neutral host network (NHN) operator, e.g., with the intention of providing service to the subscribers (e.g., UEs) 1210A-C of one or more participating service providers through CBRS Network 1205B while the subscribers 1210 are on the CBRS Network 1205B.

In contrast to the subscriber use case, the subscribers 1210 in the neutral host case have no direct association with NHN Operator. For example, a mobile service operator (MSO) 1201 and a first mobile network operator (MNO1) 1203A may have business arrangements with the neutral host network that deploys the CBRS network 1205B, while a second mobile network operator (MNO2) 1203B may not have a business arrangement with the neutral host network that deploys the CBRS network 1205B. This business arrangement, to the extent it exists, may stipulate that the NHN operator provide service to participating service providers' subscribers 1210A-B while they are on the CBRS Network 1205B.

All subscriber management functions (e.g., billing and payment, customer care, provision of SIMs or certificates) are performed by the service provider (e.g., MNO1 1203A or MSO1 1201).

CBRS-Related Identifiers

FIG. 13 is a block diagram illustrating an example communication system 1300 with a UE 1310 that connects to an evolved packet core (EPC) 1312. The EPC 1312 may be implemented by a particular service provider (SP2). The UE 1310 may connect to an eNodeB 1307, which communicates with the SP2 EPC 1312 via a neutral host gateway 1315 (e.g., rather than a neutral host mobility management entity (MME) 1314).

Specifically, the UE 1310 connect to an evolved packet data gateway (ePDG) 1317 in the EPC 1312. The ePDG 1317 may provide security mechanisms such as IPsec tunneling of connections with the UE 1310 over an untrusted non-3GPP access. The EPC may also include a packet data network gateway (PDN GW) 1321 that routes packets to and from external packet data networks (PDNs). The EPC 1312 may also include a home subscriber server (HSS) 1319, e.g., a database that contains user-related and subscriber-related information and may assist in mobility management, call and session setup, user authentication and access authorization. The EPC 1312 may also include a 3GPP authentication, authorization and accounting (AAA) server 1323 that provides support for non-3GPP Access users with services like authentication, authorization, and location management services in order to get access to EPS.

The eNodeB 1307 may be part of a larger CBRS radio access network (RAN) 1309. The term Radio Access Network (RAN) refers to the part of a mobile communication network that connects UEs 1310 to the fixed network infrastructure through wireless radio channels, over specific radio frequencies.

The eNodeB 1307 may broadcast one or more parameters. The parameters may include CBRS-I, which is a CBRS-specific public land mobile network (PLMN) ID. This can either be a PLMN-ID carved out by the CBRS Alliance for this purpose, or it could be operator-specific (in which case it would be termed a Supplemental CBRS-I). The length and function of this ID will be identical to that of the PLMN ID.

The broadcast parameters may also include CBRS-NID, which is a network identifier for the CBRS neutral host network (NHN) or private network. CBRS-NID may be transmitted over the air using the closed subscriber group ID (CSG-ID) field of SIB 1. A CBRS-capable UE 1310 that recognizes that the PLMN is a CBRS-I, will then be able to interpret the CBRS-NID value accordingly.

The broadcast parameters may also include PSP-ID, which is a Participating Service Provider ID. PSP-ID may be transmitted over the air in an SIB17 message, e.g., using the wlan-OffloadInfoPerPlmn-List-r12 field.

Plug and Play (PnP) Configurations

FIG. 14 is a flow diagram illustrating an example method 1400 for a plug and play sequence by which a CBSD 108 becomes operational in a CBRS system 100. The CBRS system 100 may be implemented using a C-RAN 300. For example, the method 1400 may be performed by a SAS 102, at least one CBSD 108 (e.g., implemented in at least one RP 306), a baseband controller 304, and/or a domain proxy 106. The CBRS system 100 (and particularly the baseband controller 304) may be configured to use at least TDD as the duplex mode.

The method 1400 may begin at optional step 1402 where a remote environment monitoring (REM) measurement report is determined for each of at least one RP 306. The REM may include Level-1, Level-2, and/or Level-3 REM, described above. As described above, REM may include an RP 306 estimating received signal strength (e.g., RSSI) for at least a portion (optionally all) of the CBRS spectrum (3.5 GHz band). At least one RP 306 may perform REM in response to an instruction from the baseband controller 304 following discovery, authentication, and/or configuration of the at least one RP 306 in the CBRS system 100. At each RP 306, the REM may utilize an unassigned RF module 834 in the respective RP 306 and, optionally, all other RF modules 834 in the respective RP 306 may be silent. Alternatively or additionally, the baseband controller 304 may determine previously-stored, non-stale REM measurement report(s) for at least one RP 306.

The method 1400 may proceed at optional step 1404 where each CBSD 108, in a set of the CBSDs 108 that are unregistered, is registered with the SAS 102. The registration process may be performed between the SAS 102 and the baseband controller 304 (or domain proxy 106) on behalf of the CBSD 108. The set of CBSDs 108 may include one or more CBSDs 108.

The baseband controller 304 (or domain proxy 106) may assemble a registration request message for the unregistered CBSDs 108. The baseband controller 304 (or domain proxy 106) may assemble a different registration request message for each unregistered CBSD 108 or a single registration request message for multiple (e.g., all) of the unregistered CBSDs 108. Each registration request may include any information, e.g., gathered from the RPs 306 implementing the unregistered CBSDs 108, the domain proxy 106, and/or the baseband controller 304 itself.

The registration request message for a CBSD 108 may include location information for an RP 306 that implements the CBSD 108. This location information may be: (1) entered manually at the baseband controller 304; or (2) entered manually at the domain proxy 106 and transmitted to the baseband controller 304. The SAS 104 may use the location information to calculate the interference the CBSD 108 will cause, determine the CBSD's 108 coverage area, etc.

After receiving the registration request message(s), the SAS 102 may transmit a registration response message (or registration response messages) to the baseband controller 304 (or domain proxy 106), each registration response message including a CBSD-ID for each newly-registered CBSD 108.

The registration procedure may be performed via HTTPS (HyperText Transfer Protocol over Transport Layer Security (TLS). One or more SAS 102 uniform resource locators (URLs) may be provisioned to the CBSDs 108 and/or the domain proxy 106. TLS mutual authentication may be performed between the SAS 102 and each CBSD 108/ domain proxy 106. If the domain proxy 106 is utilized, then it sends multiple registration requests (one for each CBSD 108).

The method 1400 may proceed at step 1406 where a spectrum inquiry is sent to the SAS 102 for each CBSD 108 in the set of CBSDs 108. The baseband controller 304 may assemble and send a different spectrum inquiry for each CBSD 108 or a single spectrum inquiry for multiple (e.g., all) of the CBSDs 108. The spectrum inquiry may specify a desired one or more channels (each of which may be a contiguous chunk) for each CBSD 108, each channel being specified by a starting frequency and a bandwidth of the channel. The baseband controller 304 may include a REM measurement report (from the REM performed at the RP(s) 306/CBSDs 108) in the spectrum inquiry.

The method 1400 may proceed at step 1408 where a grant request is sent to the SAS 104 (e.g., from the baseband controller 304) that indicates a best channel for each CBSD 108 in the set of CBSDs 108. Optionally, a different grant request may be sent for each CBSD 108 in the set of CBSDs 108.

The best channel may be based on a spectrum inquiry response (from the SAS 102) and the REM 306 performed by the RP 306 (that implements each CBSD 108). The SAS 102 may evaluate the spectrum inquiry or inquiries (sent on behalf of the CBSD(s) 108) and reply with a spectrum inquiry response that includes a set of available channels/frequencies along with a possible power allocation for each.

For example, the baseband controller 304 (or domain proxy 106) may select the best channel from a list of channels indicated as available in the spectrum inquiry response from the SAS 102. Specifically, the baseband controller 304 may remove the channels in the list that are currently (1) being used by other RF modules 834/CBSDs 108 in the same RP 306 as the CBSD(s) 108 in question; or (2) determined as being in-use by neighboring RP(s) 306, e.g., based on a REM process. After this removal, the remaining channel in the list with the best metric(s) may be chosen, e.g., the highest average maxEirp.

The method 1400 may proceed at optional step 1410 where a grant response is received for each CBSD 108 in the set of CBSDs 108. Optionally, a different grant response may be received for each CBSD 108 in the set of CBSDs 108. Each grant response may include a response code, e.g., indicating success or interference. When a grant request for a CBSD 108 is unsuccessful (e.g., the response code indicates interference), the baseband controller 304 may send the SAS 102 a new grant request for the CBSD 108. When a grant request is successful (e.g., the response code indicates success), the SAS 102 may include a Grant-ID, operational parameters, and an expiry time for the grant in the grant response.

If a grant request indicates a best channel that was indicated (by the SAS 102) as available in a prior spectrum inquiry response, then the SAS 102 will generally grant the channel to the CBSD 108. Each operational grant may be maintained thereafter by a respective HeartbeatRequest/HeartbeatResponse sequence described above.

FIGS. 15A-C are flow diagrams illustrating other example methods 1500A-C for a plug and play sequence by which a CBSD 108 becomes operational in a CBRS system 100. The methods 1500A-C may be performed sequential to or independent of each other. For the methods 1500A-C, the CBRS system 100 may be implemented using a C-RAN 300.

For example, the methods 1500A-C may be performed by a SAS 102, at least one CBSD 108 (e.g., implemented in at least one RP 306), a baseband controller 304, and/or a domain proxy 106. Since each CBSD 108 is implemented in an RP 306, the device performing parts of the methods 1500A-C is illustrated as an RP/CBSD, though it is understood that an RP 306 may implement more than one CBSD 108.

FIG. 15A is a sequence diagram illustrating an example method 1500A for a plug and play sequence by which at least one CBSD 108 is discovered, authenticated, and/or configured in a CBRS system 100.

The method 1500A may begin at step 1502 where a CBRS configuration is entered and CBRS is enabled at the domain proxy 106. The CBRS-related configuration may specify parameters used by the BC 304 and/or DP 106 to bring up and configure an RP 306, e.g., the frequency, bandwidth, transmit power, TDD config etc. The method 1500A may proceed at step 1504 where a duplex mode is set to TDD for the baseband controller 304, e.g., set at the domain proxy 106 for the baseband controller 304.

The method 1500A may proceed at step 1506 where a whitelist of RPs 306 may be determined by the baseband controller 304. The whitelist of RPs 306 may include all the RPs 306 that belong to the same NEG 222 (and therefore the same operator 830) or CCG 224 (and therefore the same baseband controller 304/C-RAN 300). In one configuration, the whitelist is a list configured at the BC 304 (e.g., by an operator), that indicates the list of RPs 306 that are allowed to connect to the BC 304. This may be done to prevent (1) unauthorized UEs 110 connecting to the BC 304; and/or (2) RPs 306 planned to be part of other BCs 304 connecting to the BC 304 accidentally.

The method 1500A may proceed at step 1508 where location information may be: (1) entered manually at the baseband controller 304; or (2) entered manually at the domain proxy 106 and transmitted to the baseband controller 304. The SAS 104 may use the location information later to calculate the interference the CBSD 108 will cause, determine the CBSD's 108 coverage area, etc.

The method 1500A may proceed at step 1510 where a discovery message is sent from each new RP 306/CBSD 108 to the baseband controller 304, e.g., to indicate it would like to begin an authentication process. The method 1500A may proceed at step 1512 where an authentication process may begin between the RP(s) 306/CBSD(s) 108 and the baseband controller 304, e.g., using a Simple Object Access Protocol (SOAP) session.

The method 1500A may proceed at step 1514 where a configuration process is performed between the baseband controller 304 and the domain proxy 106 (on behalf of the RP(s) 306/CBSD(s) 108). During the configuration process in step 1514, the RP 306 (e.g., via the BC 304) may be configured with many (e.g., hundreds of) parameters that enable its operation. Some of these may be the CBRS-related parameters, but others may relate to underlying LTE operation for timing, backhaul, etc.

The configuration process may include: (1) a bootstrap message from the baseband controller 304 to the domain proxy 106; (2) a duplex mode message from the domain proxy 106 to the baseband controller 304; (3) a value change message from the baseband controller 304 to the domain proxy 106, e.g., indicating the RP 306 serial numbers, their associated location information, and their antenna information; (4) a minimum mandatory configuration message from the domain proxy 106 to the baseband controller 304; (5) a feature mandatory configuration message from the domain proxy 106 to the baseband controller 304 (CBRS-related configurations may be treated as feature mandatory configurations); (6) a deployment-specific configuration message from the domain proxy 106 to the baseband controller 304; (7) an Admin UP message from the domain proxy 106 to the baseband controller 304.

The method 1500A may proceed at step 1516 where the baseband controller 304 triggers Level-1 REM of the complete CBRS spectrum (3.5 GHz band) for each RP 306. The method 1500A may proceed at step 1518 where each RP 306 performs Level-1 REM using an unassigned TDD RF module 834 or determines a set of previous REM results from an unexpired REM, e.g., non-stale REM results. The method 1500A may proceed at step 1520 where each RP 306 may transmit REM results (either performed on-demand or from a previous REM process) to the baseband controller 304.

FIG. 15B is a sequence diagram illustrating an example method 1500B for a plug and play sequence by which a spectrum grant is made to at least one CBSD 108 in a CBRS system 100.

The method 1500B may begin at step 1522 where the baseband controller sends a registration request for the unregistered and authenticated RP(s) 306/CBSD(s) 108 to the SAS 102. Each registration request may include any information, e.g., gathered from the RPs 306 implementing the unregistered CBSDs 108, the domain proxy 106, and/or the baseband controller 304 itself. The registration request message for a CBSD 108 may include location information (for the CBSD 108), e.g., location information that was manually entered at the baseband controller 304 and/or the domain proxy 106.

The method 1500B may proceed at step 1524 where, after receiving the registration request message, the SAS 102 may register the CBSD(s) 108 in the registration request, e.g., x number of registrations in one connection. The SAS 102 may transmit, to the baseband controller 304, a registration response message (or registration response messages) that includes a CBSD-ID for each newly-registered CBSD 108.

The method 1500B may proceed at step 1526 where the baseband controller 304 stores the CBSD-ID for each newly-registered RP 306/CBSD 108. The method 1500B may proceed at step 1528 where the baseband controller 304 transmits a value change message to the domain proxy 106 indicating the registration details, e.g., including the CBSD-ID from the registration response message.

The method 1500B may proceed at step 1530 where the baseband controller 304 prepares a measurement report for REM results from the RP(s) 306/CBSDs 108, e.g., aggregated measurement reports from the RP(s) 306/CBSDs 108.

The method 1500B may proceed at step 1532 where the baseband controller assembles/prepares a spectrum inquiry for each CBSD 108. The baseband controller 304 may assemble and send a different spectrum inquiry for each CBSD 108. The spectrum inquiry may specify a desired one or more channels (each of which may be a contiguous chunk), each specified by a starting frequency and a bandwidth. The baseband controller 304 may include the measurement report (from the REM performed at the RP(s) 306/CBSDs 108) in the spectrum inquiry.

The method 1500B may proceed at step 1534 where the baseband controller 304 sends the spectrum inquiry (for each CBSD 108) to the SAS 102.

The method 1500B may proceed at step 1536 where the baseband controller 304 assembles/prepares a grant request for each CBSD 108. The best channel may be based on a spectrum inquiry response (not shown) from the SAS 102 and the REM 306 performed by the RP 306 (that implements each CBSD 108). In response to receiving and evaluating the spectrum inquiry (sent on behalf of the CBSD(s) 108), the SAS 102 may reply with a spectrum inquiry response that includes a set of available channels/frequencies along with a possible power allocation for each. The grant request may be based on information in the spectrum inquiry response. The grant request may indicate a best channel for each CBSD 108.

For example, the baseband controller 304 may select the best channel for a CBSD 108 from a list of channels indicated as available in the spectrum inquiry response from the SAS 102. Specifically, the baseband controller 304 may remove the channels in the list that are currently (1) being used by other RF modules 834/CBSDs 108 in the same RP 306 as the CBSD(s) 108 in question; or (2) determined as being in-use by neighboring RP(s) 306, e.g., based on a REM process. After this removal, the remaining channel in the list with the best metric(s) may be chosen, e.g., the highest average maxEirp.

The method 1500B may proceed at step 1538 where the baseband controller 304 transmits the grant request for each CBSD 108 to the SAS 102.

The method 1500B may proceed at step 1540 where the baseband controller may store the Grant-ID for each CBSD 108. The Grant-ID may be included in a grant response (not shown) from the SAS 102. Each grant response may include a response code, e.g., indicating success or interference. When a grant request for a CBSD 108 is unsuccessful (e.g., the response code indicates interference), the baseband controller 304 may send the SAS 102 a new grant request for the CBSD 108.

The method 1500B may proceed at step 1542 where the baseband controller 304 transmits a value change message to the domain proxy 106 indicating the details of the grant from the SAS 102. When the received grant request was successful (e.g., the response code indicates success), the SAS 102 may include a Grant-ID, operational parameters, and an expiry time for the grant in the grant response. These parameters from the grant response may be included in the value change message to the domain proxy 106.

The method 1500B may proceed at step 1544 where the baseband controller 304 begins a HeartbeatRequest/HeartbeatResponse sequence with the SAS 102 for each Grant-ID stored on the baseband controller 304. In other words, the baseband controller 304 may begin send a HeartbeatRequest message to the SAS 102 for each CBSD 108 that has a grant from the SAS 102. Maintaining a grant via a Heartbeat sequence is described above.

FIG. 15C is a sequence diagram illustrating an example method 1500C for a plug and play sequence by which a at least one CBSD 108 becomes operational in a CBRS system 100 after receiving a grant from a SAS 102.

The method 1500C may begin at step 1546 where, after receiving a successful heartbeat (e.g., the code in a received HeartbeatResponse indicates success), the baseband controller 304 may determine an operating channel and operating bandwidth. In one example, the operating channel and/or operating bandwidth may be based on the grant response from the SAS 102, e.g., parameter(s) in the grant response.

The method 1500C may proceed at step 1548 where the baseband controller 304 sends a value change message to the domain proxy 106. The value change message may include operating channel, operating bandwidth and/or other parameters in the grant response from the SAS 102.

The method 1500C may begin at step 1550 where the baseband controller 304 performs REM and/or self-configuration. Self-configuration may include the BC 304 using the results of an REM process to autonomously determine a Physical Cell Identifier (PCI) and/or other parameters of operation.

The method 1500C may proceed at step 1552 where the baseband controller 304 configures at least one RPs 306 housing at least one CBSD 108, e.g., using control messages. During this configuration, an RP 306 may assign an RF module 834 for the configured channel and band.

The method 1500C may proceed at step 1554 where the baseband controller 304 sends a value change message with the configured values (e.g., channel and band) for at least one RP 306/CBSD 108 to the domain proxy 106.

The method 1500C may proceed at step 1556 where the baseband controller 304 sends an RF Tx On message instructing at least one CBSD 108 that it can begin transmitting on the grant.

The method 1500C may proceed at step 1558 where the CBSD 108 is operational and transmits, e.g., to UEs 110.

CBSD State Machine

FIG. 16 is a block diagram illustrating a state diagram 1600 for a CBSD 108 in a radio point (RP) 306. The CBSD 108 in the RP 306 begins in a discovery state 1602, e.g., during which the CBSD 108 in the RP 306 transmits a discovery message to a baseband controller 304 to begin an authentication process. The CBSD 108 transitions to an authenticated state 1604 when authentication is complete with the baseband controller 304.

The CBSD 108 transitions to a registered state 1606 following a registration process with the SAS 102 and after the CBSD 108 receives a CBSD-ID from the SAS 102. The CBSD-ID may be received in a registration response message from the SAS 102 after a registration request message is sent to the SAS 102.

The CBSD 108 transitions to the granted state 1608 after a grant is issued for the CBSD 108. For example, a grant may be issued after (1) a spectrum inquiry is sent to the SAS 102 and a response is received from the SAS 102; and/or (2) a grant request is sent to the SAS 102 and a grant response is received from the SAS 102 (e.g., indicating success and including a Grant-ID).

The CBSD 108 transitions to the authorized state 1610 after a HeartbeatRequest is sent to the SAS 102 and a HeartbeatResponse is received from the SAS 102. The CBSD 108 transitions to the TxOn state 1612 (where the CBSD 108 can transmit on the grant) if the HeartbeatResponse includes a response code that indicates success. Otherwise (e.g., if the HeartbeatResponse includes a response code that indicates something other than success), the CBSD 108 stays in the authorized state 1610 until a successful heartbeat procedure is performed with the SAS 102.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" may include calculating, extracting, generating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computerreadable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements of a C-RAN implementing a CBRS system. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a Citizens Broadband Radio Service (CBRS) communication system, comprising: at least one baseband controller communicatively coupled to a spectrum access system (SAS) that allocates radio frequency (RF) channels in the CBRS communication system, wherein the at least one baseband controller is communicatively coupled to at least one radio point (RP) using a switched ETHERNET network; and the at least one RP, each implementing at least one Citizens Broadband Radio Service device (CBSD) communicatively coupled to the SAS and configured to provide wireless service to user equipment (UEs) using one or more of the RF channels allocated by the SAS.

Example 2 includes the CBRS communication system of Example 1, wherein each of the at least one CBSD in a respective RP is implemented as a module in the respective RP using instructions stored in a memory and executed on at least one processor in the respective RP.

Example 3 includes the CBRS communication system of any of Examples 1-2, wherein each of the at least one RP comprises at least one RF module, wherein each CBSD in a respective RP utilizes a different RF module in the respective RP to transmit and receive RF signals.

Example 4 includes the CBRS communication system of any of Examples 1-3, wherein each CBSD in a respective RP is assigned a respective set of Layer-1 resources for an air interface used in the CBRS communication system.

Example 5 includes the CBRS communication system of any of Examples 1-4, wherein a particular RP implements at least one CBSD belonging to a first wireless network operator and at least one CBSD belonging to a second wireless network operator.

Example 6 includes the CBRS communication system of Example 5, wherein all CBSDs belonging to the first wireless network operator also belong to a first No Edge Group (NEG), and all CBSDs belonging to the second wireless network operator also belong to a second NEG.

Example 7 includes the CBRS communication system of any of Examples 1-6, wherein a particular RP implements only a single CBSD belonging to a particular baseband controller.

Example 8 includes the CBRS communication system of Example 7, wherein all CBSDs belonging to a particular baseband controller also belong to the same common channel group (CCG), wherein all CBSDs in the same CCG are allocated the same RF channel.

Example 9 includes the CBRS communication system of any of Examples 1-8, further comprising a domain proxy communicatively coupled to the baseband controller, wherein the domain proxy is configured to act as an interface enabling a wireless network operator to configure the baseband controller and the at least one RP.

Example 10 includes the CBRS communication system of any of Examples 1-9, wherein the SAS is communicatively coupled to a coexistence manager (CxM), wherein the CxM manages interference between CBSDs by advising the SAS about RF channel allocation.

Example 11 includes a Citizens Broadband Radio Service (CBRS) communication system, comprising at least one cloud radio access network (C-RAN), each C-RAN comprising: at least one baseband controller communicatively coupled to a spectrum access system (SAS) that allocates radio frequency (RF) channels in the CBRS communication system, wherein the at least one baseband controller is communicatively coupled to at least one radio point (RP) using a switched ETHERNET network; and the at least one RP, each implementing at least one Citizens Broadband Radio Service device (CBSD) communicatively coupled to the SAS and configured to provide wireless service to user equipment (UEs) using one or more of the RF channels allocated by the SAS.

Example 12 includes the CBRS communication system of Example 11, wherein each of the at least one CBSD in a respective RP is implemented as a module in the respective RP using instructions stored in a memory and executed on at least one processor in the respective RP.

Example 13 includes the CBRS communication system of any of Examples 11-12, wherein each of the at least one RP comprises at least one RF module, wherein each CBSD in a respective RP utilizes a different RF module in the respective RP to transmit and receive RF signals.

Example 14 includes the CBRS communication system of any of Examples 11-13, wherein each CBSD in a respective RP is assigned a respective set of Layer-1 resources for an air interface used in the CBRS communication system.

Example 15 includes the CBRS communication system of any of Examples 11-14, wherein a particular RP implements at least one CBSD belonging to a first wireless network operator and at least one CBSD belonging to a second wireless network operator.

Example 16 includes the CBRS communication system of Example 15, wherein all CBSDs belonging to the first wireless network operator also belong to a first No Edge Group (NEG), and all CBSDs belonging to the second wireless network operator also belong to a second NEG.

Example 17 includes the CBRS communication system of any of Examples 11-16, wherein a particular RP implements only a single CBSD belonging to a particular baseband controller and C-RAN.

Example 18 includes the CBRS communication system of Example 17, wherein all CBSDs belonging to a particular baseband controller also belong to the same common channel group (CCG), wherein all CBSDs in the same CCG are allocated the same RF channel.

Example 19 includes the CBRS communication system of any of Examples 11-18, further comprising a domain proxy communicatively coupled to the baseband controller, wherein the domain proxy is configured to act as an interface enabling a wireless network operator to configure the baseband controller and the at least one RP.

Example 20 includes the CBRS communication system of any of Examples 11-19, wherein the SAS is communicatively coupled to a coexistence manager (CxM), wherein the CxM manages interference between CBSDs by advising the SAS about RF channel allocation.

Example 21 includes a Citizens Broadband Radio Service (CBRS) communication system, comprising: a spectrum access system (SAS) configured to allocate radio frequency (RF) channels in the CBRS communication system; a radio point (RP) implementing at least one Citizens Broadband Radio Service device (CBSD); a baseband controller communicatively coupled to the SAS and the RPs, wherein the baseband controller is configured to: determine Level-1 remote environment monitoring (REM) measurements for each of the CBSDs; send a spectrum inquiry, for each of the at least one CBSD, to the SAS based on the Level-1 REM measurements; and determine whether to perform Level-2 REM or Level-3 REM based on a spectrum inquiry response, for each of the at least one CBSD, from the SAS.

Example 22 includes the CBRS communication system of Example 21, wherein the baseband controller is further configured to coordinate the Level-2 REM across the at least one CBSD.

Example 23 includes the CBRS communication system of any of Examples 21-22, wherein the baseband controller is further configured to coordinate the Level-3 REM across the at least one CBSD.

Example 24 includes the CBRS communication system of any of Examples 21-23, wherein the baseband controller is further configured to send a grant request for each of the at least one CBSD to the SAS, wherein each grant request is based on the Level-1 REM, Level-2 REM, or Level-3 REM for the respective CBSD.

Example 25 includes the CBRS communication system of any of Examples 21-24, wherein the baseband controller is further configured to configure parameters of the at least one CBSD based on a grant response from the SAS.

Example 26 includes the CBRS communication system of any of Examples 21-25, wherein Level-1 REM comprises a CBSD estimating a Received Signal Strength Indicator (RSSI) in each of a plurality of bandwidth segments in the CBRS spectrum, wherein each RSSI is estimated based on in-phase and quadrature-phase (I-Q) data collected at the CBSD during a first duration.

Example 27 includes the CBRS communication system of any of Examples 21-26, wherein Level-2 REM comprises a CBSD estimating an RSSI, determining a Physical Cell Identifier (PCI), and estimating a Reference Signal Received Quality (RSRQ) in each of a plurality of bandwidth segments in the CBRS spectrum, wherein each RSSI is estimated based on I-Q data collected at the CBSD during a second duration.

Example 28 includes the CBRS communication system of any of Examples 21-27, wherein Level-3 REM comprises a CBSD estimating an RSSI, determining a Physical Cell Identifier (PCI), estimating a Reference Signal Received Quality (RSRQ), and decoding System Information Block 1 (SIB-1) parameters in each of a plurality of bandwidth segments in the CBRS spectrum, wherein each RSSI is estimated based on I-Q data collected at the CBSD during a third duration Example 29 includes the CBRS communication system of any of Examples 21-28, wherein all RF modules in the RP, which are not listening for I-Q data during Level-1 REM, Level-2 REM, or Level-3 REM, cease transmitting during Level-1 REM, Level-2 REM, or Level-3 REM.

Example 30 includes the CBRS communication system of any of Examples 21-29, wherein the Level-1 REM measurements for at least one of the at least one CBSD are from received from the at least one CBSD.

Example 31 includes the CBRS communication system of any of Examples 21-30, wherein the Level-1 REM measurements for at least one of the at least one CBSD are from a previous Level-1 REM and are stored at the baseband controller.

Example 32 includes the CBRS communication system of any of Examples 21-31, wherein the baseband controller is further configured to send at least the Level-1 REM measurements, in a spectrum inquiry, to the SAS.

Example 33 includes a method for remote environment monitoring (REM) in a Citizens Broadband Radio Service (CBRS) communication system, wherein the CBRS communication system is implemented with a C-RAN comprising a baseband controller and a plurality of radio points (RPs), the method comprising: determining Level-1 remote environment monitoring (REM) measurements for each of the CBSDs; sending a spectrum inquiry, for each of the at least one CBSD, to the SAS based on the Level-1 REM measurements; and determining whether to perform Level-2 REM or Level-3 REM based on a spectrum inquiry response, for each of the at least one CBSD, from the SAS.

Example 34 includes the method of Example 33, further comprising coordinating the Level-2 REM across the at least one CBSD.

Example 35 includes the method of any of Examples 33-34, further comprising coordinating the Level-3 REM across the at least one CBSD.

Example 36 includes the method of any of Examples 33-35, further comprising sending a grant request for each of the at least one CBSD to the SAS, wherein each grant request is based on the Level-1 REM, Level-2 REM, or Level-3 REM for the respective CBSD.

Example 37 includes the method of any of Examples 33-36, further comprising configuring parameters of the at least one CBSD based on a grant response from the SAS.

Example 38 includes the method of any of Examples 33-37, wherein Level-1 REM comprises a CBSD estimating a Received Signal Strength Indicator (RSSI) in each of a plurality of bandwidth segments in the CBRS spectrum, wherein each RSSI is estimated based on in-phase and quadrature-phase (I-Q) data collected at the CBSD during a first duration.

Example 39 includes the method of any of Examples 33-38, wherein Level-2 REM comprises a CBSD estimating an RSSI, determining a Physical Cell Identifier (PCI), and estimating a Reference Signal Received Quality (RSRQ) in each of a plurality of bandwidth segments in the CBRS spectrum, wherein each RSSI is estimated based on I-Q data collected at the CBSD during a second duration.

Example 40 includes the method of any of Examples 33-39, wherein Level-3 REM comprises a CBSD estimating an RSSI, determining a Physical Cell Identifier (PCI), estimating a Reference Signal Received Quality (RSRQ), and decoding System Information Block 1 (SIB-1) parameters in each of a plurality of bandwidth segments in the CBRS spectrum, wherein each RSSI is estimated based on I-Q data collected at the CBSD during a third duration Example 41 includes the method of any of Examples 33-40, wherein all RF modules in the RP, which are not listening for I-Q data during Level-1 REM, Level-2 REM, or Level-3 REM, cease transmitting during Level-1 REM, Level-2 REM, or Level-3 REM.

Example 42 includes the method of any of Examples 33-41, wherein the Level-1 REM measurements for at least one of the at least one CBSD are from received from the at least one CBSD.

Example 43 includes the method of any of Examples 33-42, wherein the Level-1 REM measurements for at least one of the at least one CBSD are from a previous Level-1 REM and are stored at the baseband controller.

Example 44 includes the method of any of Examples 33-43, further comprising sending at least the Level-1 REM measurements, in a spectrum inquiry, to the SAS.

Example 45 includes a Citizens Broadband Radio Service (CBRS) communication system, comprising: a spectrum access system (SAS) configured to allocate radio frequency (RF) channels in the CBRS communication system; a plurality of radio points (RPs), each implementing at least one Citizens Broadband Radio Service device (CBSD); a baseband controller communicatively coupled to the SAS and the RPs, wherein the baseband controller is configured to: send a spectrum inquiry to the SAS for each CBSD in a set of the CBSDs; and send, for each CBSD in the set of the CBSDs, a grant request to the SAS that indicates a best channel based on a spectrum inquiry response and an REM measurement report for each CBSD in the set of the CBSDs.

Example 46 includes the CBRS communication system of Example 45, wherein the baseband controller is further configured to: determine, for each of at least one RP, a remote environment monitoring (REM) measurement report; and register, with the SAS, each CBSD in the set of the CBSDs that are unregistered.

Example 47 includes the CBRS communication system of any of Examples 45-46, wherein the spectrum inquiry comprises REM measurement reports for each of the CBSDs in the set of the CBSDs.

Example 48 includes the CBRS communication system of any of Examples 45-47, wherein the spectrum inquiry indicates a desired one or more channels for each CBSD in the set of the CBSDs, wherein each desired channel is identified by a starting frequency and a bandwidth of the desired channel.

Example 49 includes the CBRS communication system of Example 48, wherein the baseband controller is further configured to determine the best channel for each CBSD based on the spectrum inquiry response and the REM measurement report for each CBSD in the set of the CBSDs.

Example 50 includes the CBRS communication system of any of Examples 45-49, wherein the baseband controller is further configured to receive a grant response for each CBSD in the set of the CBSDs.

Example 51 includes the CBRS communication system of Example 50, wherein the baseband controller is configured to, when a grant request for a CBSD is unsuccessful, send a new grant request for the CBSD.

Example 52 includes the CBRS communication system of any of Examples 50-51, wherein the baseband controller is configured to, when a grant request for a CBSD is successful, the grant response comprises a Grant-ID, operational parameters, and an expiry time for the grant for the CBSD.

Example 53 includes the CBRS communication system of any of Examples 46-52, wherein the baseband controller is configured to register each CBSD in the set of the CBSDs by: sending a registration request message, to the SAS, indicating a CBSD identification (CBSD-ID) for each CBSD in the set of the CBSDs; and receiving a registration response message from SAS.

Example 54 includes the CBRS communication system of Example 53, wherein the registration request message comprises location information for each CBSD, wherein the location information is manually entered at the baseband controller or a domain proxy in the CBRS communication system.

Example 55 includes a method for remote environment monitoring (REM) in a Citizens Broadband Radio Service (CBRS) communication system, wherein the CBRS communication system is implemented with a C-RAN comprising a baseband controller and a plurality of radio points (RPs), the method comprising: sending a spectrum inquiry to the SAS for each CBSD in a set of the CBSDs; and sending a grant request to the SAS that indicates a best channel for each CBSD in the set of the CBSDs based on a spectrum inquiry response and an REM measurement report for each CBSD in the set of the CBSDs.

Example 56 includes the method of Example 55, further comprising: determining, for each of at least one RP, a remote environment monitoring (REM) measurement report; registering, with the SAS, each CBSD in the set of the CBSDs that are unregistered;

Example 57 includes the method of any of Examples 55-56, wherein the spectrum inquiry comprises REM measurement reports for each of the CBSDs in the set of the CBSDs.

Example 58 includes the method of any of Examples 55-57, wherein the spectrum inquiry indicates a desired one or more channels for each CBSD in the set of the CBSDs, wherein each desired channel is identified by a starting frequency and a bandwidth of the desired channel.

Example 59 includes the method of any of Examples 57-58, further comprising determining the best channel for each CBSD based on the spectrum inquiry response and the REM measurement report for each CBSD in the set of the CBSDs.

Example 60 includes the method of any of Examples 55-59, further comprising receiving a grant response for each CBSD in the set of the CBSDs.

Example 61 includes the method of Example 60, further comprising, when a grant request for a CBSD is unsuccessful, send a new grant request for the CBSD.

Example 62 includes the method of any of Examples 60-61, wherein, when a grant request for a CBSD is successful, the grant response comprises a Grant-ID, operational parameters, and an expiry time for the grant for the CBSD.

Example 63 includes the method of any of Examples 56-62, wherein the registering each CBSD in the set of the CBSDs comprises: sending a registration request message, to the SAS, indicating a CBSD identification (CBSD-ID) for each CBSD in the set of the CBSDs; and receiving a registration response message from SAS.

Example 64 includes the method of Example 63, wherein the registration request message comprises location information for each CBSD, wherein the location information is manually entered at the baseband controller or a domain proxy in the CBRS communication system.

The invention claimed is:

1. A Citizens Broadband Radio Service (CBRS) communication system, comprising: at least one baseband controller communicatively coupled to a spectrum access system (SAS) that allocates radio frequency (RF) channels in the CBRS communication system, wherein the at least one baseband controller is communicatively coupled to at least one radio point (RP) using a switched ETHERNET network; and the at least one RP, each implementing at least one Citizens Broadband Radio Service device (CBSD) communicatively coupled to the SAS and configured to provide wireless service to user equipment (UEs) using one or more of the RF channels allocated by the SAS, wherein each CBSD in a respective RP is assigned a respective set of Layer-1 resources for an air interface used in the CBRS communication system.

2. The CBRS communication system of claim 1, wherein each of the at least one CBSD in a respective RP is implemented as a module in the respective RP using instructions stored in a memory and executed on at least one processor in the respective RP.

3. The CBRS communication system of claim 1, wherein each of the at least one RP comprises at least one RF module, wherein each CBSD in a respective RP utilizes a different RF module in the respective RP to transmit and receive RF signals.

4. The CBRS communication system of claim 1, wherein a particular RP implements at least one CBSD belonging to a first wireless network operator and at least one CBSD belonging to a second wireless network operator.

5. The CBRS communication system of claim 4, wherein all CBSDs belonging to the first wireless network operator also belong to a first No Edge Group (NEG), and all CBSDs belonging to the second wireless network operator also belong to a second NEG.

6. The CBRS communication system of claim 1, wherein a particular RP implements only a single CBSD belonging to a particular baseband controller.

7. The CBRS communication system of claim 6, wherein all CBSDs belonging to a particular baseband controller also belong to the same common channel group (CCG), wherein all CBSDs in the same CCG are allocated the same RF channel.

8. The CBRS communication system of claim 1, further comprising a domain proxy communicatively coupled to the baseband controller, wherein the domain proxy is configured to act as an interface enabling a wireless network operator to configure the baseband controller and the at least one RP.

9. The CBRS communication system of claim 1, wherein the SAS is communicatively coupled to a coexistence manager (CxM), wherein the CxM manages interference between CBSDs by advising the SAS about RF channel allocation.

10. A Citizens Broadband Radio Service (CBRS) communication system, comprising at least one cloud radio access network (C-RAN), each C-RAN comprising: at least one baseband controller communicatively coupled to a spectrum access system (SAS) that allocates radio frequency (RF) channels in the CBRS communication system, wherein the at least one baseband controller is communicatively coupled to at least one radio point (RP) using a switched ETHERNET network; the at least one RP, each implementing at least one Citizens Broadband Radio Service device (CBSD) communicatively coupled to the SAS and configured to provide wireless service to user equipment (UEs) using one or more of the RF channels allocated by the SAS, wherein each CBSD in a respective RP is assigned a respective set of Layer-1 resources for an air interface used in the CBRS communication system.

11. The CBRS communication system of claim 10, wherein each of the at least one CBSD in a respective RP is implemented as a module in the respective RP using instructions stored in a memory and executed on at least one processor in the respective RP.

12. The CBRS communication system of claim 10, wherein each of the at least one RP comprises at least one RF module, wherein each CBSD in a respective RP utilizes a different RF module in the respective RP to transmit and receive RF signals.

13. The CBRS communication system of claim 10, wherein a particular RP implements at least one CBSD belonging to a first wireless network operator and at least one CBSD belonging to a second wireless network operator.

14. The CBRS communication system of claim 13, wherein all CBSDs belonging to the first wireless network operator also belong to a first No Edge Group (NEG), and all CBSDs belonging to the second wireless network operator also belong to a second NEG.

15. The CBRS communication system of claim 10, wherein a particular RP implements only a single CBSD belonging to a particular baseband controller and C-RAN.

16. The CBRS communication system of claim 15, wherein all CBSDs belonging to a particular baseband controller also belong to the same common channel group (CCG), wherein all CBSDs in the same CCG are allocated the same RF channel.

17. The CBRS communication system of claim 10, further comprising a domain proxy communicatively coupled to the baseband controller, wherein the domain proxy is configured to act as an interface enabling a wireless network operator to configure the baseband controller and the at least one RP.

18. The CBRS communication system of claim 10, wherein the SAS is communicatively coupled to a coexistence manager (CxM), wherein the CxM manages interference between CBSDs by advising the SAS about RF channel allocation.

19. A Citizens Broadband Radio Service (CBRS) communication system, comprising:
  a spectrum access system (SAS) configured to allocate radio frequency (RF) channels in the CBRS communication system;
  a radio point (RP) implementing at least one Citizens Broadband Radio Service device (CBSD);
  a baseband controller communicatively coupled to the SAS and the RPs, wherein the baseband controller is configured to:
    determine Level-1 remote environment monitoring (REM) measurements for each of the CBSDs;
    send a spectrum inquiry, for each of the at least one CBSD, to the SAS based on the Level-1 REM measurements; and
    determine whether to perform Level-2 REM or Level-3 REM based on a spectrum inquiry response, for each of the at least one CBSD, from the SAS.

20. The CBRS communication system of claim 19, wherein the baseband controller is further configured to coordinate the Level-2 REM across the at least one CBSD.

21. The CBRS communication system of claim 19, wherein the baseband controller is further configured to coordinate the Level-3 REM across the at least one CBSD.

22. The CBRS communication system of claim 19, wherein the baseband controller is further configured to send a grant request for each of the at least one CBSD to the SAS, wherein each grant request is based on the Level-1 REM, Level-2 REM, or Level-3 REM for the respective CBSD.

23. The CBRS communication system of claim 19, wherein the baseband controller is further configured to configure parameters of the at least one CBSD based on a grant response from the SAS.

24. The CBRS communication system of claim 19, wherein Level-1 REM comprises a CBSD estimating a Received Signal Strength Indicator (RSSI) in each of a plurality of bandwidth segments in the CBRS spectrum, wherein each RSSI is estimated based on in-phase and quadrature-phase (I-Q) data collected at the CBSD during a first duration.

25. The CBRS communication system of claim 19, wherein Level-2 REM comprises a CBSD estimating an RSSI, determining a Physical Cell Identifier (PCI), and estimating a Reference Signal Received Quality (RSRQ) in each of a plurality of bandwidth segments in the CBRS spectrum, wherein each RSSI is estimated based on I-Q data collected at the CBSD during a second duration.

26. The CBRS communication system of claim 19, wherein Level-3 REM comprises a CBSD estimating an RSSI, determining a Physical Cell Identifier (PCI), estimating a Reference Signal Received Quality (RSRQ), and decoding System Information Block 1 (SIB-1) parameters in each of a plurality of bandwidth segments in the CBRS spectrum, wherein each RSSI is estimated based on I-Q data collected at the CBSD during a third duration.

27. The CBRS communication system of claim 19, wherein all RF modules in the RP, which are not listening for I-Q data during Level-1 REM, Level-2 REM, or Level-3 REM, cease transmitting during Level-1 REM, Level-2 REM, or Level-3 REM.

28. The CBRS communication system of claim 19, wherein the Level-1 REM measurements for at least one of the at least one CBSD are from received from the at least one CBSD.

29. The CBRS communication system of claim 19, wherein the Level-1 REM measurements for at least one of the at least one CBSD are from a previous Level-1 REM and are stored at the baseband controller.

30. The CBRS communication system of claim 19, wherein the baseband controller is further configured to send at least the Level-1 REM measurements, in a spectrum inquiry, to the SAS.

31. A method for remote environment monitoring (REM) in a Citizens Broadband Radio Service (CBRS) communication system, wherein the CBRS communication system is implemented with a C-RAN comprising a baseband controller and a plurality of radio points (RPs), the method comprising:
    determining Level-1 remote environment monitoring (REM) measurements for each of the CBSDs;
    sending a spectrum inquiry, for each of the at least one CBSD, to the SAS based on the Level-1 REM measurements; and
    determining whether to perform Level-2 REM or Level-3 REM based on a spectrum inquiry response, for each of the at least one CBSD, from the SAS.

32. The method of claim 31, further comprising coordinating the Level-2 REM across the at least one CBSD.

33. The method of claim 31, further comprising coordinating the Level-3 REM across the at least one CBSD.

34. The method of claim 31, further comprising sending a grant request for each of the at least one CBSD to the SAS, wherein each grant request is based on the Level-1 REM, Level-2 REM, or Level-3 REM for the respective CBSD.

35. The method of claim 31, further comprising configuring parameters of the at least one CBSD based on a grant response from the SAS.

36. The method of claim 31, wherein Level-1 REM comprises a CBSD estimating a Received Signal Strength Indicator (RSSI) in each of a plurality of bandwidth segments in the CBRS spectrum, wherein each RSSI is estimated based on in-phase and quadrature-phase (I-Q) data collected at the CBSD during a first duration.

37. The method of claim 31, wherein Level-2 REM comprises a CBSD estimating an RSSI, determining a Physical Cell Identifier (PCI), and estimating a Reference Signal Received Quality (RSRQ) in each of a plurality of bandwidth segments in the CBRS spectrum, wherein each RSSI is estimated based on I-Q data collected at the CBSD during a second duration.

38. The method of claim 31, wherein Level-3 REM comprises a CBSD estimating an RSSI, determining a Physical Cell Identifier (PCI), estimating a Reference Signal Received Quality (RSRQ), and decoding System Information Block 1 (SIB-1) parameters in each of a plurality of bandwidth segments in the CBRS spectrum, wherein each RSSI is estimated based on I-Q data collected at the CBSD during a third duration.

39. The method of claim 31, wherein all RF modules in the RP, which are not listening for I-Q data during Level-1 REM, Level-2 REM, or Level-3 REM, cease transmitting during Level-1 REM, Level-2 REM, or Level-3 REM.

40. The method of claim 31, wherein the Level-1 REM measurements for at least one of the at least one CBSD are from received from the at least one CBSD.

41. The method of claim 31, wherein the Level-1 REM measurements for at least one of the at least one CBSD are from a previous Level-1 REM and are stored at the baseband controller.

42. The method of claim 31, further comprising sending at least the Level-1 REM measurements, in a spectrum inquiry, to the SAS.

43. A Citizens Broadband Radio Service (CBRS) communication system, comprising:
    a spectrum access system (SAS) configured to allocate radio frequency (RF) channels in the CBRS communication system;
    a plurality of radio points (RPs), each implementing at least one Citizens Broadband Radio Service device (CBSD);
    a baseband controller communicatively coupled to the SAS and the RPs, wherein the baseband controller is configured to:
        send a spectrum inquiry to the SAS for each CBSD in a set of the CBSDs; and
        send, for each CBSD in the set of the CBSDs, a grant request to the SAS that indicates a best channel based on a spectrum inquiry response and an REM measurement report for each CBSD in the set of the CBSDs.

44. The CBRS communication system of claim 43, wherein the baseband controller is further configured to:
    determine, for each of at least one RP, a remote environment monitoring (REM) measurement report; and
    register, with the SAS, each CBSD in the set of the CBSDs that are unregistered.

45. The CBRS communication system of claim 43, wherein the spectrum inquiry comprises REM measurement reports for each of the CBSDs in the set of the CBSDs.

46. The CBRS communication system of claim 43, wherein the spectrum inquiry indicates a desired one or more channels for each CBSD in the set of the CBSDs, wherein each desired channel is identified by a starting frequency and a bandwidth of the desired channel.

47. The CBRS communication system of claim 46, wherein the baseband controller is further configured to determine the best channel for each CBSD based on the spectrum inquiry response and the REM measurement report for each CBSD in the set of the CBSDs.

48. The CBRS communication system of claim 43, wherein the baseband controller is further configured to receive a grant response for each CBSD in the set of the CBSDs.

49. The CBRS communication system of claim 48, wherein the baseband controller is configured to, when a grant request for a CBSD is unsuccessful, send a new grant request for the CBSD.

50. The CBRS communication system of claim 48, wherein the baseband controller is configured to, when a grant request for a CBSD is successful, the grant response comprises a Grant-ID, operational parameters, and an expiry time for the grant for the CBSD.

51. The CBRS communication system of claim 44, wherein the baseband controller is configured to register each CBSD in the set of the CBSDs by:
sending a registration request message, to the SAS, indicating a CBSD identification (CBSD-ID) for each CBSD in the set of the CBSDs; and
receiving a registration response message from SAS.

52. The CBRS communication system of claim 51, wherein the registration request message comprises location information for each CBSD, wherein the location information is manually entered at the baseband controller or a domain proxy in the CBRS communication system.

53. A method for remote environment monitoring (REM) in a Citizens Broadband Radio Service (CBRS) communication system, wherein the CBRS communication system is implemented with a C-RAN comprising a baseband controller and a plurality of radio points (RPs), the method comprising:
sending a spectrum inquiry to the SAS for each CBSD in a set of the CBSDs; and
sending a grant request to the SAS that indicates a best channel for each CBSD in the set of the CBSDs based on a spectrum inquiry response and an REM measurement report for each CBSD in the set of the CBSDs.

54. The method of claim 53, further comprising:
determining, for each of at least one RP, a remote environment monitoring (REM) measurement report;
registering, with the SAS, each CBSD in the set of the CBSDs that are unregistered.

55. The method of claim 53, wherein the spectrum inquiry comprises REM measurement reports for each of the CBSDs in the set of the CBSDs.

56. The method of claim 53, wherein the spectrum inquiry indicates a desired one or more channels for each CBSD in the set of the CBSDs, wherein each desired channel is identified by a starting frequency and a bandwidth of the desired channel.

57. The method of claim 55, further comprising determining the best channel for each CBSD based on the spectrum inquiry response and the REM measurement report for each CBSD in the set of the CBSDs.

58. The method of claim 53, further comprising receiving a grant response for each CBSD in the set of the CBSDs.

59. The method of claim 58, further comprising, when a grant request for a CBSD is unsuccessful, send a new grant request for the CBSD.

60. The method of claim 58, wherein, when a grant request for a CBSD is successful, the grant response comprises a Grant-ID, operational parameters, and an expiry time for the grant for the CBSD.

61. The method of claim 54, wherein the registering each CBSD in the set of the CBSDs comprises:
sending a registration request message, to the SAS, indicating a CBSD identification (CBSD-ID) for each CBSD in the set of the CBSDs; and
receiving a registration response message from SAS.

62. The method of claim 61, wherein the registration request message comprises location information for each CBSD, wherein the location information is manually entered at the baseband controller or a domain proxy in the CBRS communication system.

* * * * *